(12) United States Patent
Miller et al.

(10) Patent No.: US 11,778,149 B2
(45) Date of Patent: *Oct. 3, 2023

(54) HEADWARE WITH COMPUTER AND OPTICAL ELEMENT FOR USE THEREWITH AND SYSTEMS UTILIZING SAME

(71) Applicant: Snap Inc., Santa Monica, CA (US)

(72) Inventors: Erick Miller, Los Angeles, CA (US); Jonathan Rodriguez, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,976

(22) Filed: Aug. 9, 2021

(65) Prior Publication Data
US 2022/0137703 A1     May 5, 2022

Related U.S. Application Data

(63) Continuation of application No. 16/667,489, filed on Oct. 29, 2019, now Pat. No. 11,099,643, which is a
(Continued)

(51) Int. Cl.
*G06T 19/00*     (2011.01)
*G06F 3/01*     (2006.01)
(Continued)

(52) U.S. Cl.
CPC ....... *H04N 9/3173* (2013.01); *G02B 27/0176* (2013.01); *G06F 3/013* (2013.01);
(Continued)

(58) Field of Classification Search
CPC . H04L 2209/80; H04L 41/083; G06K 9/6263; G06K 9/6262; G06K 9/00671;
(Continued)

(56) References Cited

U.S. PATENT DOCUMENTS 5,231,674 A    7/1993   Cleveland et al.
5,471,542 A    11/1995   Ragland
(Continued)

FOREIGN PATENT DOCUMENTS

CN     103049761 B    8/2016
EP       3707693 A1    9/2020
(Continued)

OTHER PUBLICATIONS

"U.S. Appl. No. 14/328,663, Non Final Office Action dated Oct. 20, 2014", 10 pgs.
(Continued)

*Primary Examiner* — Tize Ma
(74) *Attorney, Agent, or Firm* — Schwegman Lundberg & Woessner, P.A.

(57) ABSTRACT

An apparatus for mounting on a head including a frame, A face-wearable near-ocular optics and a micro-display for displaying data in front of the eyes is provided. A computing device is coupled to the micro-display. At least one sensor is coupled to the computing device for receiving biometric human information.

20 Claims, 27 Drawing Sheets

Related U.S. Application Data continuation of application No. 14/853,851, filed on Sep. 14, 2015, now Pat. No. 10,509,466, which is a continuation of application No. 14/328,663, filed on Jul. 10, 2014, now abandoned, which is a continuation of application No. 14/086,909, filed on Nov. 21, 2013, now abandoned, which is a continuation of application No. 13/815,492, filed on Mar. 5, 2013, now abandoned, which is a continuation-in-part of application No. 13/470,242, filed on May 11, 2012, now abandoned.

(60) Provisional application No. 61/485,120, filed on May 11, 2011.

(51) Int. Cl.

| | |
|---|---|
| *G02B 27/01* | (2006.01) |
| *G06T 7/60* | (2017.01) |
| *H04N 5/225* | (2006.01) |
| *H04N 9/31* | (2006.01) |
| *G06V 10/42* | (2022.01) |
| *G06V 40/18* | (2022.01) |
| *G06T 7/73* | (2017.01) |
| *H04N 23/51* | (2023.01) |
| *H04N 23/55* | (2023.01) |
| *G06V 10/80* | (2022.01) |
| *G06V 40/19* | (2022.01) |

(52) U.S. Cl.
CPC .................. *G06T 7/60* (2013.01); *G06T 7/73* (2017.01); *G06T 19/006* (2013.01); *G06V 10/803* (2022.01); *G06V 40/19* (2022.01); *G06V 40/193* (2022.01); *H04N 9/3185* (2013.01); *H04N 23/51* (2023.01); *H04N 23/55* (2023.01); *G02B 2027/0178* (2013.01)

(58) Field of Classification Search
CPC .......... G06K 9/00342; G06K 9/00355; G06K 9/00389; G06K 9/00805; G06K 9/3233; G06K 9/4671; G06K 9/6267; G06F 3/013; G06F 3/011; G06F 3/012; G06T 7/73; G02B 2027/0178; G02B 3/005; G06V 10/803; G06V 40/19; H04N 13/344; H04N 13/239; H04N 13/383; H04N 13/243; H04N 13/178; G02F 1/294; G02F 1/29
USPC ........................................................ 345/7–9
See application file for complete search history.

(56) References Cited

U.S. PATENT DOCUMENTS

| | | | |
|---|---|---|---|
| 5,912,721 A * | 6/1999 | Yamaguchi .......... | G06V 40/193 351/209 |
| 6,664,956 B1 | 12/2003 | Erdem | |
| 6,697,894 B1 | 2/2004 | Mitchell et al. | |
| 7,522,344 B1 | 4/2009 | Curatu et al. | |
| 7,742,011 B2 * | 6/2010 | Damera-Venkata ... | G09G 3/007 345/1.3 |
| 7,782,172 B2 | 8/2010 | Tsukada | |
| 7,862,172 B2 * | 1/2011 | Yoshinaga ........... | G06V 40/193 351/209 |
| 7,971,156 B2 | 6/2011 | Albertson et al. | |
| 7,996,793 B2 | 8/2011 | Latta et al. | |
| 8,046,408 B2 | 10/2011 | Torabi | |
| 8,284,204 B2 * | 10/2012 | Kalaiah ................ | H04N 13/275 345/422 |
| 8,487,938 B2 | 7/2013 | Latta et al. | |
| 8,856,691 B2 | 10/2014 | Geisner et al. | |
| 8,890,772 B2 | 11/2014 | Woo et al. | |
| 9,225,897 B1 | 12/2015 | Sehn et al. | |
| 9,230,160 B1 | 1/2016 | Kanter | |
| 9,276,886 B1 | 3/2016 | Samaranayake | |
| 9,705,831 B2 | 7/2017 | Spiegel | |
| 9,742,713 B2 | 8/2017 | Spiegel et al. | |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B2 | 7/2021 | Voss et al. | |
| 11,087,728 B1 | 8/2021 | Canberk et al. | |
| 11,092,998 B1 | 8/2021 | Castañeda et al. | |
| 11,099,643 B1 | 8/2021 | Miller et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2004/0051680 A1 | 3/2004 | Azuma et al. | |
| 2006/0132382 A1 | 6/2006 | Jannard | |
| 2007/0164990 A1 | 7/2007 | Bjorklund et al. | |
| 2008/0122736 A1 | 5/2008 | Ronzani et al. | |
| 2008/0219501 A1 * | 9/2008 | Matsumoto ............ | G06T 7/251 382/103 |
| 2008/0273124 A1 | 11/2008 | Ogino | |
| 2009/0012788 A1 | 1/2009 | Gilbert et al. | |
| 2010/0013739 A1 * | 1/2010 | Sako ...................... | G06F 3/0484 345/8 |
| 2010/0220037 A1 | 9/2010 | Sako et al. | |
| 2010/0225681 A1 | 9/2010 | Yoshida et al. | |
| 2010/0226535 A1 | 9/2010 | Kimchi et al. | |
| 2010/0234695 A1 | 9/2010 | Morris | |
| 2011/0047517 A1 * | 2/2011 | Lee ...................... | G06F 3/04883 715/863 |
| 2011/0096922 A1 * | 4/2011 | Oya ....................... | H04N 7/183 380/28 |
| 2011/0126192 A1 | 5/2011 | Frost et al. | |
| 2011/0213664 A1 * | 9/2011 | Osterhout ............... | G06F 3/013 705/14.58 |
| 2011/0301934 A1 | 12/2011 | Tardif | |
| 2012/0026159 A1 * | 2/2012 | Seok ...................... | G06F 3/0446 345/419 |
| 2012/0027303 A1 * | 2/2012 | Cok ...................... | G06V 20/70 382/190 |
| 2012/0033853 A1 * | 2/2012 | Kaneda ................. | G06V 40/16 382/103 |
| 2012/0062445 A1 | 3/2012 | Haddick et al. | |
| 2012/0154277 A1 | 6/2012 | Bar-zeev et al. | |
| 2012/0199852 A1 * | 8/2012 | Lowes ..................... | G09F 9/33 257/98 |
| 2013/0314303 A1 | 11/2013 | Osterhout et al. | |
| 2014/0171036 A1 | 6/2014 | Simmons | |
| 2015/0120293 A1 | 4/2015 | Wohlert et al. | |
| 2015/0370320 A1 | 12/2015 | Connor | |
| 2017/0123487 A1 | 5/2017 | Hazra et al. | |
| 2017/0277684 A1 | 9/2017 | Dharmarajan Mary | |
| 2017/0277685 A1 | 9/2017 | Takumi | |
| 2017/0337476 A1 * | 11/2017 | Gordon ............ | H04N 21/44231 |
| 2017/0351910 A1 | 12/2017 | Elwazer et al. | |
| 2018/0158370 A1 | 6/2018 | Pryor | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |

(56) References Cited

U.S. PATENT DOCUMENTS

| | | |
|---|---|---|
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |

FOREIGN PATENT DOCUMENTS

| | | |
|---|---|---|
| KR | 20220158824 A | 12/2022 |
| WO | WO-2016168591 A1 | 10/2016 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 14/328,663, Non Final Office Action dated Apr. 6, 2015", 16 pgs.

"U.S. Appl. No. 14/328,663, Final Office Action dated Mar. 4, 2015", 16 pgs.

"U.S. Appl. No. 14/328,663, Final Office Action dated Jul. 13, 2015", 18 pgs.

"U.S. Appl. No. 14/328,663, Response filed Nov. 25, 2014 to Non Final Office Action dated Oct. 20, 2014", 6 pgs.

"U.S. Appl. No. 14/328,663, Response filed Apr. 28, 2015 to Non Final Office Action dated Apr. 6, 2015", 6 pgs.

"U.S. Appl. No. 14/328,663, Response filed Mar. 12, 2015 to Final Office Action dated Mar. 4, 2015", 5 pgs.

"U.S. Appl. No. 14/853,851, Final Office Action dated Dec. 14, 2017", 14 pgs.

"U.S. Appl. No. 14/853,851, Restriction Requirement dated Jun. 15, 2017", 6 pgs.

"U.S. Appl. No. 14/853,851, Non Final Office Action dated Aug. 18, 2017", 9 pgs.

"U.S. Appl. No. 14/853,851, Response Filed Apr. 23, 2018 to Final Office Action dated Dec. 14, 2017", 10 pgs.

"U.S. Appl. No. 14/853,851, Non Final Office Action dated Apr. 30, 2018", 17 pgs.

"U.S. Appl. No. 14/853,851, Response filed Jul. 30, 2018 to Non Final Office Action dated Apr. 30, 2018", 10 pgs.

"U.S. Appl. No. 14/853,851, Final Office Action dated Nov. 6, 2018", 17 pgs.

"U.S. Appl. No. 14/853,851, Response filed Feb. 4, 2019 to Final Office Action dated Nov. 6, 2018", 10 pgs.

"U.S. Appl. No. 14/853,851, Non Final Office Action dated Apr. 15, 2019", 15 pgs.

"U.S. Appl. No. 14/853,851, Response filed Jul. 12, 2019 Non Final Office Action dated Apr. 15, 2019", 11 pgs.

"U.S. Appl. No. 14/853,851, Notice of Allowance dated Aug. 14, 2019", 10 pgs.

"U.S. Appl. No. 16/667,489, Non Final Office Action dated Sep. 3, 2020", 17 pgs.

"U.S. Appl. No. 16/667,489, Response filed Nov. 18, 2020 to Non Final Office Action dated Sep. 3, 2020", 9 pgs.

"U.S. Appl. No. 16/667,489, Final Office Action dated Feb. 5, 2021", 20 pgs.

"U.S. Appl. No. 16/667,489, Response filed Apr. 1, 2021 to Final Office Action dated Feb. 5, 2021", 8 pgs.

"U.S. Appl. No. 16/667,489, Notice of Allowance dated Apr. 26, 2021", 9 pgs.

\* cited by examiner

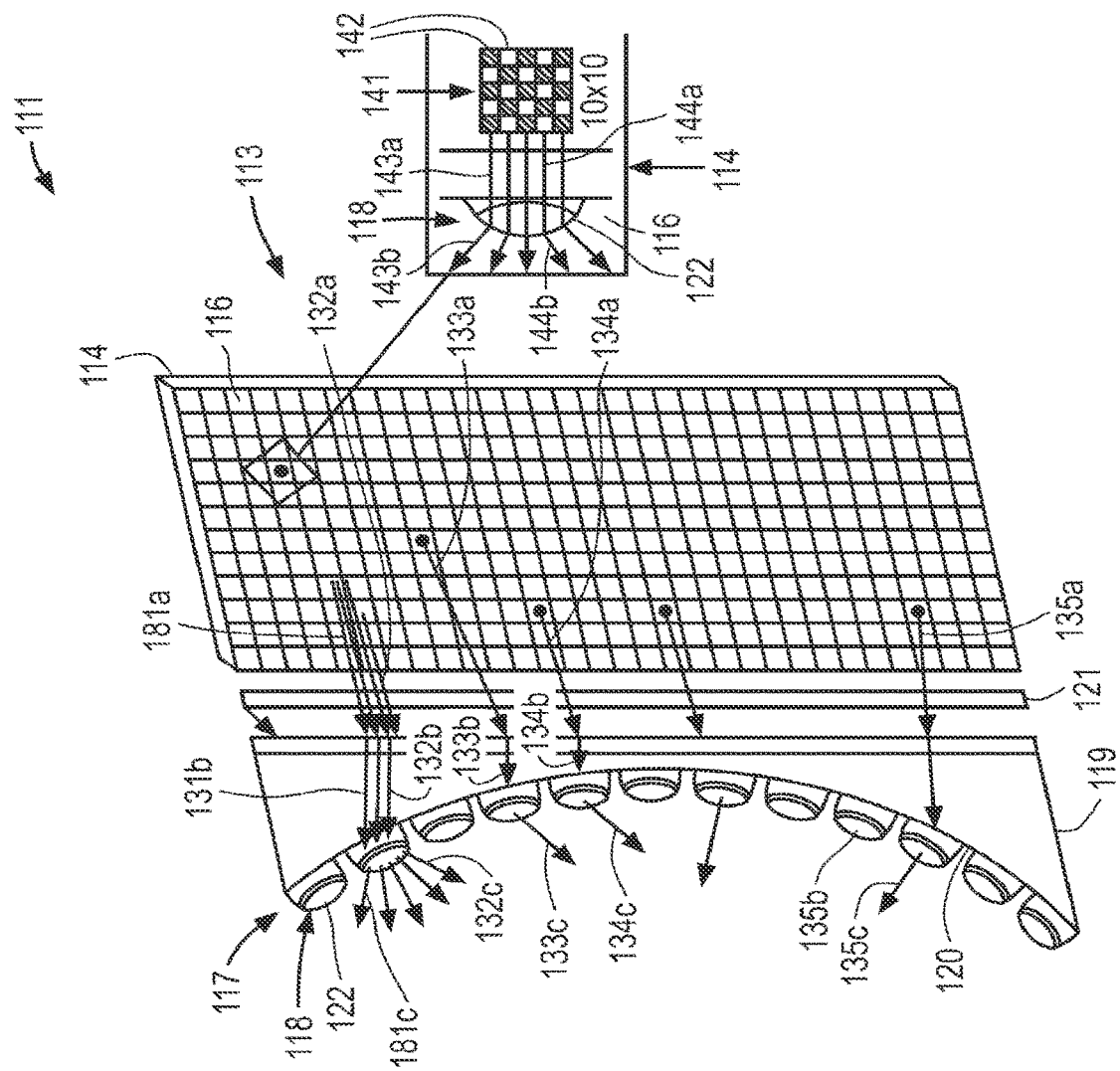
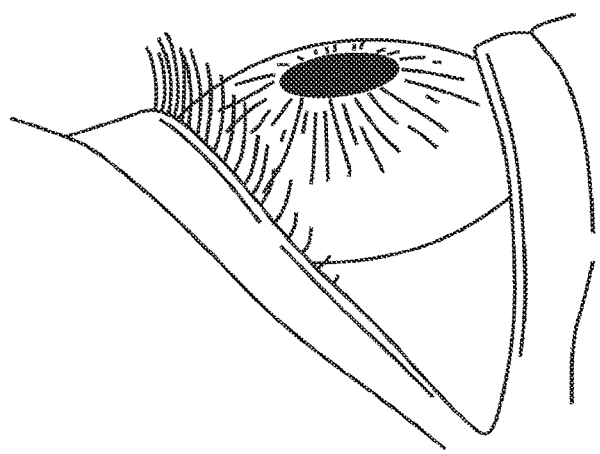
FIG. 5

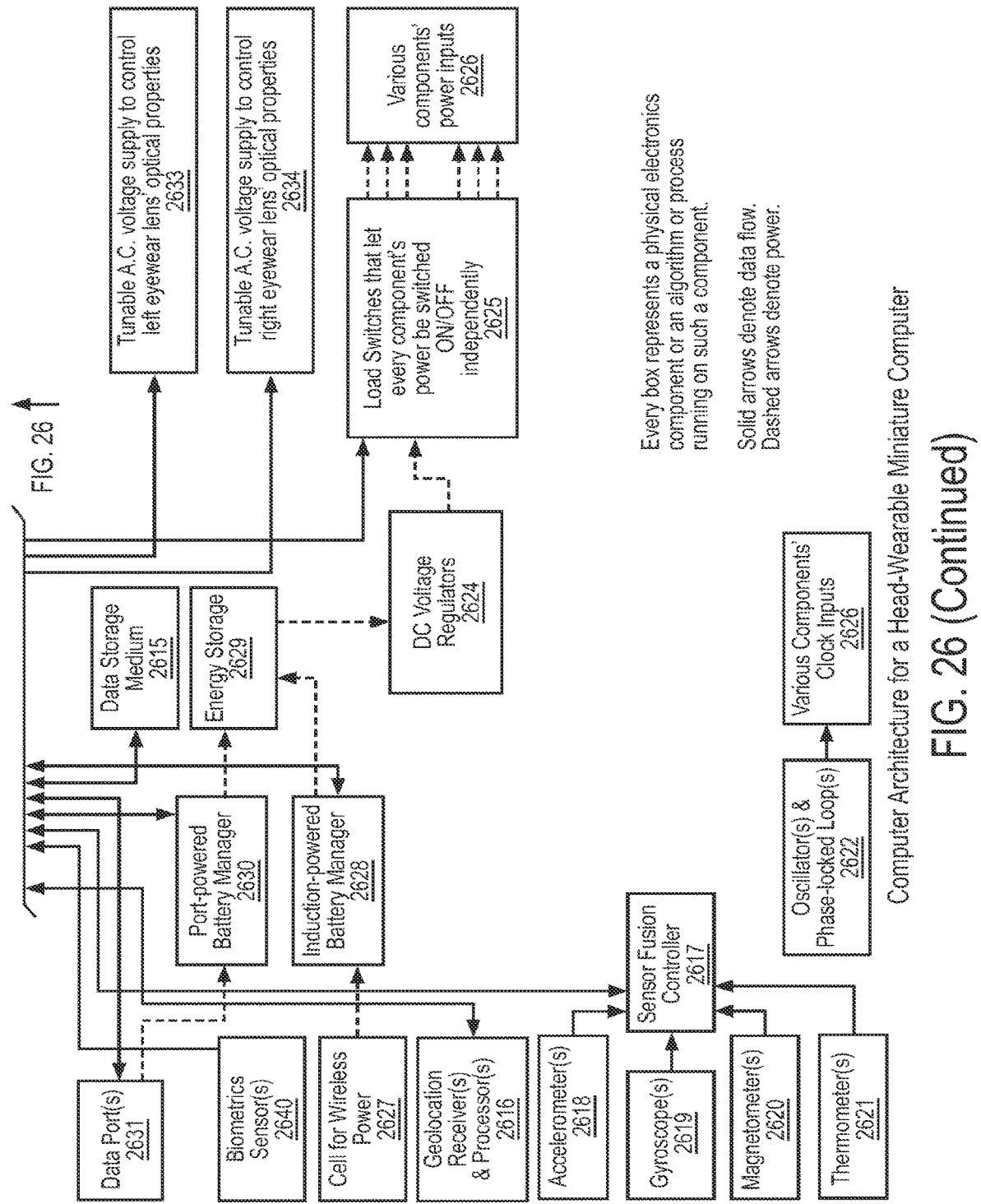

HEADWARE WITH COMPUTER AND OPTICAL ELEMENT FOR USE THEREWITH AND SYSTEMS UTILIZING SAME

CROSS REFERENCE TO RELATED APPLICATIONS

This application is a continuation of U.S. patent application Ser. No. 16/667,489, filed Oct. 29, 2019, which is a continuation of U.S. patent application Ser. No. 14/853,851, filed Sep. 14, 2015, which is a continuation of U.S. patent application Ser. No. 14/328,663, filed Jul. 10, 2014, which is a continuation of U.S. patent application Ser. No. 14/086,909, filed Nov. 21, 2013, which is a continuation of U.S. patent application Ser. No. 13/815,492. filed Mar. 5, 2013, which is a continuation-in-part of U.S. patent application Ser. No. 13/470,242, filed May 11, 2012, which claims the benefit of priority to U.S. Provisional Application Ser. No. 61/485,120, filed May 11, 2011, the contents of each application is incorporated herein by reference in their entireties.

FIELD OF THE INVENTION

The present invention relates to headwear and more particularly to headwear having cameras therein.

BACKGROUND OF THE INVENTION

Headwear such as glasses having cameras therein has been provided. Head-mounted displays have also been provided.

There is a need for headwear that can, for example, provide the user with an improved interactive experience with images viewable by the user through the headwear.

BRIEF DESCRIPTION OF THE DRAWINGS

The drawings described herein are for illustration purposes only and are not intended to limit the scope of the present disclosure in any way.

FIG. 5 is a schematic illustration one embodiment of a display apparatus for use with the headwear of the present invention.

DETAILED DESCRIPTION OF THE INVENTION

Figure 1:
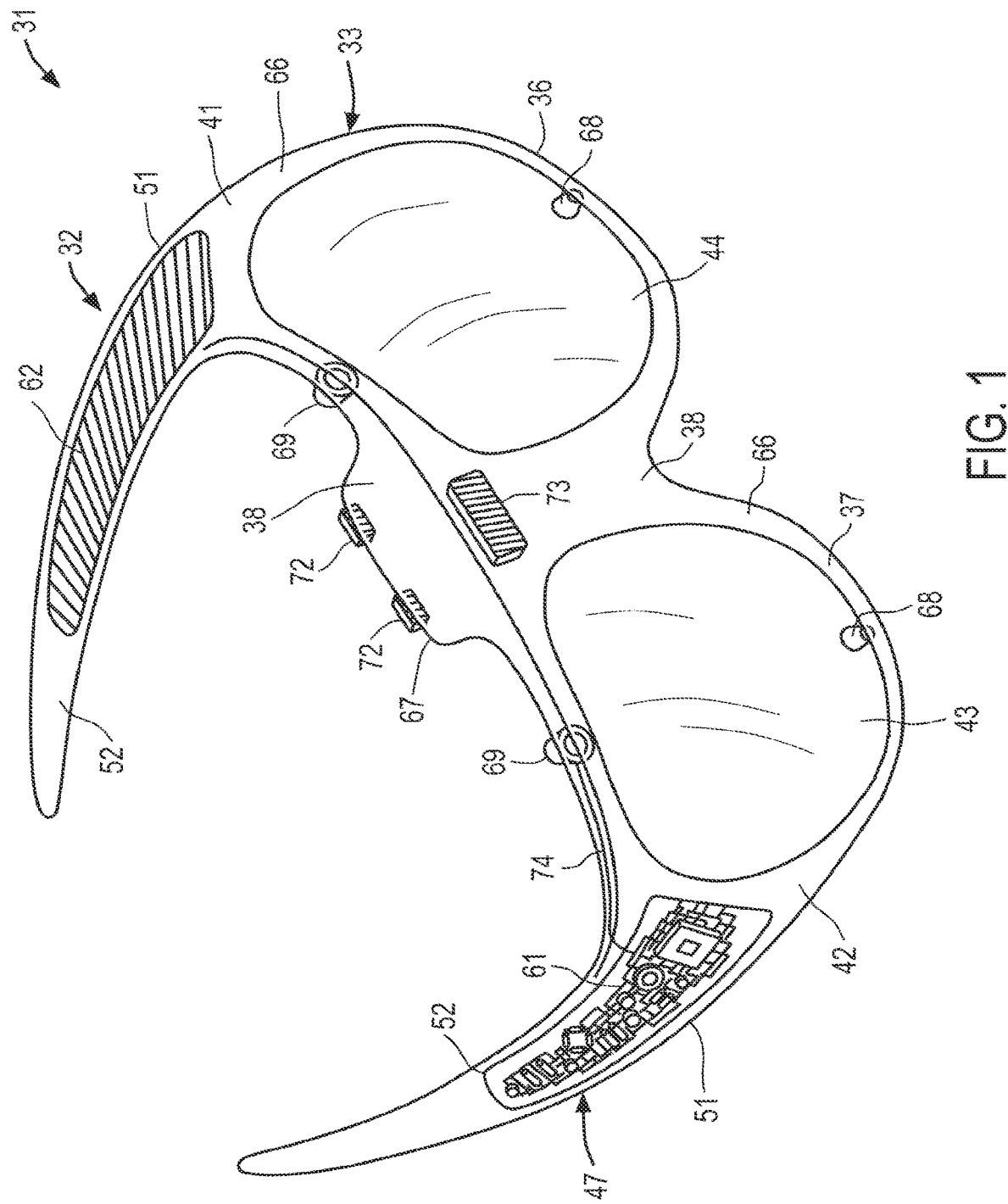
FIG. 1 is a front perspective view of one embodiment of the headwear of the present invention, consisting of a pair of glasses.
Figure 2:
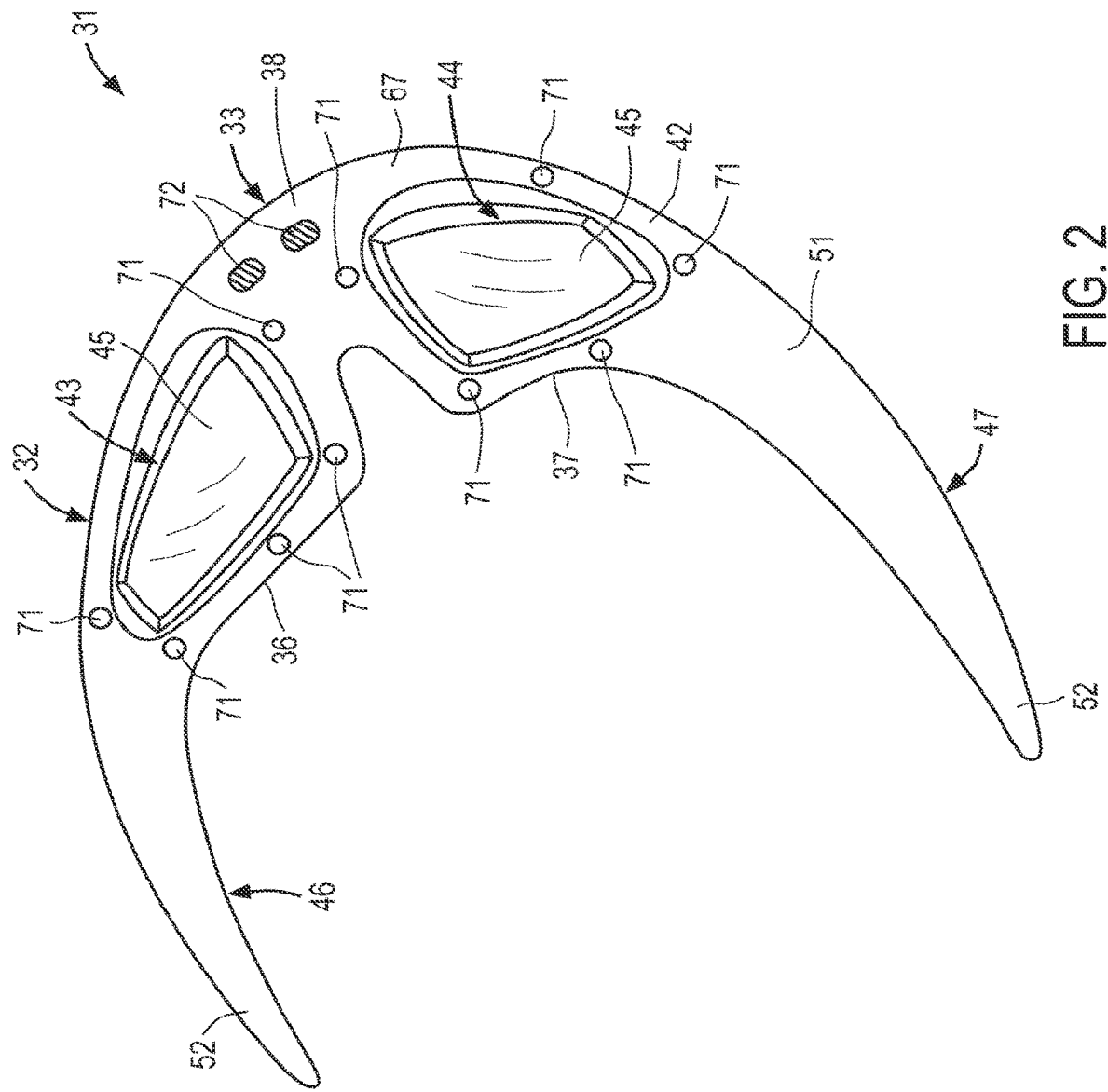
FIG. 2 is a rear perspective view of the glasses of FIG. 1.

The headware of the present invention can include any suitable head-mounted device or apparatus or face-wearable device or apparatus that can specifically include any suitable eyewear such as glasses or goggles. The headwear can include any suitable display such as a head-mounted display. In one embodiment, the headware can be a pair of glasses 31, such as illustrated in FIGS. 1 and 2. The glasses 31 can include a frame 32 made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly or a combination of the foregoing. Any of the display assemblies disclosed herein can be provided in glasses 31. When the optical elements 43, 44 include a display, they can each be referred to as near ocular digital displays and can show immersive volumetric three-dimensional graphics, stereo three-dimensional graphics or two-dimensional graphics and can include a liquid crystal display (LCD), an organic light-emitting diode (OLED) display, any other light-emitting diode (LED) display or a laser display. Each of the optical elements 43, 44 includes an inner surface 45 that faces the user and is thus view are mounted on the head of the user. When the optical elements 43, 44 include a display, the inner surface 45 is a display surface.

Frame 32 additionally includes a left arm or temple piece 46 and a second arm or temple piece 47 coupled to the respective left and right end portions 41, 42 of the front piece 33 by any suitable means such as a hinge (not shown), so as to be pivotably coupled to the front piece 33, or rigidly or fixably secured to the front piece so as to be integral with the front piece 33. Each of the temple pieces or temples 46, 47 can include a first portion 51 that is pivotably coupled to the respective end portion 41, 42 of the front piece and any suitable second portion 52, such as curved or arcuate piece, for coupling to the ear of the user. In one embodiment the front piece 33 can be formed from a single piece of material, so as to have a unitary or integral construction. In one embodiment, such as illustrated in FIGS. 1 and 2, the entire frame can be formed from a single piece of material so as to have a unitary or integral construction.

Glasses 31 can include a computing device, such as computer 61, which can be of any suitable type so as to be carried by the frame 32 and in one embodiment of a suitable size and shape so as to be at least partially disposed in one of the temples 46, 47 and in one embodiment, as illustrated in FIGS. 1 and 2, the computer is sized and shaped similar to the size and shape of one of the temples 46, 47 and is thus disposed almost entirely if not entirely within the structure and confines of such temple 46, 47. In one embodiment, the computer 61 can be disposed in both of the temples. The computer 61 can include a central processing unit such as one or more micro processors (not shown), a suitable storage medium (not shown) such as a flash drive or memory that is electrically coupled to the central processing unit, and a suitable input device, a suitable output device or a combination of input and output devices that is electrically coupled to one or both of the central processing unit and the storage medium. The computer 61 additionally includes a battery 62 or other suitable portable power supply. In one embodiment, the battery 62 is disposed in one of the temples 46, 47, and in the glasses 31 shown in FIGS. 1 and 2 the battery 62 is shown as being disposed in left temple 46 and electrically coupled to the remainder of the computer 61 disposed in the right temple 47. The one or more input and output devices can include a connector or port (not shown) accessible from the outside of frame 32, a wireless receiver, transmitter or transceiver (not shown) or a combination of such devices.

Face wearable computing device or apparatus 31, which can be in the form-factor of glasses, can include one or more input sensors or peripheral devices for any suitable purpose including the collection of environmental and biometric contextual data and information used as input to the computer 61. Front piece 33 is provided with an outward-facing, forward-facing or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras 68 that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices or peripherals can additionally include inward-facing digital sensors in the form of electro occulography sensors, or EOG sensors 71, and inwardly-facing sensors in the form of electroencephalogram sensors or EEG sensors 72. The EOG sensors 71 and EEG sensors 72 can each be mounted on or provided within the inner surface 67 of front frame piece 33 or elsewhere on the frame 32 so as to be facing the user. The outwardly-facing sensors can additionally include any suitable geometry sensor 73. Each of the peripherals or sensors are electrically coupled to the computer 61 by any suitable means such as a conductive lead, trace or cable 74, only a few of which are illustrated in the figures for simplicity. Additional peripheral devices or sensors for obtaining biometric inputs from the user can be provided and carried by or mounted on frame 32. Left and right optical elements 43, 44 can be additionally electrically coupled to the computer by any suitable means such as respective leads 74 when the optical elements include a display or other features that are controllable by the computer 61.

In one embodiment, illustrated in FIGS. 1 and 2, first and second inwardly-facing cameras 68 can be provided, one near the bottom center of each frame holder 36 and first and second outwardly-facing cameras 69 are provided, one near the top center of each frame holder 36, 37. The inwardly-facing cameras 68 can be used for any suitable purposes including the extraction of biometric data using image analysis. Such biometric data can include image-based eye tracking, iris, facial or other recognition for example for identification purposes, facial expressions and the mood of the user. The outwardly-facing cameras 69 can be used for any suitable purpose, for example to capture respective images similar to those capturable by the left and right eyes of the user. First and second EEG sensors 72 can be provided on a portion of the frame that contacts the skin of the user, for example on the inner surface 67 or the bridge 38 or front piece 33. A plurality of EOG sensors 71 can be provided on the inner surface 67 around each of the left and right optical elements 43, 44 so as to be registrable with the left and right eyes of the user. In one embodiment, the EOG sensors 71 contact the skin of the user. The outwardly-facing geometry sensor 73 can be used for any suitable purpose, including the scanning and capturing of three dimensional geometry.

Computer 61 can additionally include an operating system that can include software used to access and control the peripheral devices connected to the computer, including but not limited to peripherals 68, 69, 71, 72 and 73. The computer can process the data from the multiple input sources or peripherals and can then optionally output data and information to the human sensory system through the use of the near ocular digital displays 43, 44 for consumption into the user's or wearer's eyes. For example, outwardly-facing digital sensors, peripherals or cameras 69 and geometry sensor 73 can be used to collect contextual data about the surroundings of the wearer, and sent to the computer 61 for processing as input data used by the computing systems operating within the computer. The inwardly-facing sensors, including sensors 78, 71 and 72, can be used to capture data from the wearer of the apparatus or glasses 31 such that this data can be sent to the computer 61 and the computing system of the computer can compute additional meaningful data from the input data sent from such sensors, which can further be utilized by the computing system to control various aspects of the computing system of the computer 61, including any software system of the computer 61, or aspects of the computing system or attached peripherals of the computer, such as visual outputs to optical displays 43, 44 or auditory outputs to speakers (not shown). For example, EEG sensors 72 can be used to measure the user's brain activity and state, for example voltage fluctuations within the neurons of the brain of the user, that can be sent to the computer 61 and used to control various functions within the software or operating system of the computer. An example is using EEG sensors 72 to mentally concentrate on a button on optical displays 43, 44 in order to click on it.

Such output data can additionally include audio signals that can delivered to speakers (not shown) mounted on or carried by the frame 32 or coupleable to the frame for mounting elsewhere for consumption into the wearer's ears. Other output methods such as haptics can be provided. Other outputs can include, for example, haptic capacitive touch surfaces on frames 32 of the glasses 31, haptic/tactile virtual objects for example via hand-worn accessories such as gloves or rings, world-tracked three-dimensional spatially rendered audio, electrochromic sunglasses, LEDs or other visual displays for notifications, and simulating acceleration and/or gravity via electrical stimulation of the user's inner ear. Additionally, the output from computer 61 can be sent to other local applications, other networked application that have access to some or all of the data acquired by the biometric sensors of glasses 31, or both.

As can be seen, the computer 61 can access and control connected sensors and peripherals, including without limitation peripherals 68, 69, 71, 72 and 73, which are electrically connected to the computer and send data to the computer over digital leads or cables 74. The computer and peripherals, and a suitable power supply such as battery 62, can be packaged and encased into a frame 32 that is designed as eyewear and can have the form factor of glasses. The glasses 31 can use optical displays 43, 44 together with biometric sensors to create a natural user experience where biometric thoughts and feelings and moods and concentration can control the user interface, provided for example by displays 43, 44.

In an additional possible use, optical displays 43, 44 can include electrochromic sunglasses. In this regard, software or electrical command from computer 61 causes the lenses 43, 44 to change their color, darkness or both. The computer 61 can additionally change other optical properties of the displays 43, 44, such as the focus distance of the scene as seen through the lenses.

The headwear of the present invention can be configured to re-display the world that the user is seeing not just as a stereo three-dimensional scene, but in one embodiment as a more realistic volumetric three-dimensional scene. In such a volumetric three-dimensional scene, the light displayed to the user is in focus at the proper focus distance. In one embodiment, the focus distance of the light passing through the optical display assembly or optical element assembly of the invention is controlled by software or otherwise by a local computing systems such as computer 61 or any other networked computer system. In one embodiment illustrated in FIG. 3, headwear 78 includes a support structure 79, for example, frame 32 of glasses 31. An optical display or element assembly 80 of the headwear 78, such as left and right optical elements 43, 44 of glasses 31, can include a digital display matrix 81 and a plurality of optical layers or lenses disposed between the matrix 81 and the eye of the user that can be controlled by such software and/or computing system to adjust the focus distance of the light traveling through the assembly 30. Such optical layers can include any of the optimal layers or lens arrays disclosed herein. The display matrix can be of any suitable type, such as a liquid crystal display (LCD), an organic light-emitting diode (OLED) display, any other light-emitting diode (LED) display or a laser display. In one embodiment, the plurality of optical layers or lenses includes a double concave lens 82 overlying the display matrix 81 and a double convex lens 83 overlying the double concave lens 82 so that the double concave lens 82 is disposed between the double convex lens 83 and the display matrix 81. In one embodiment, each of the lens 82, 83 has a cross-sectional area approximating the area of the display matrix 81. The display matrix 81 and lenses 32, 83 are each carried by the frame or support structure 79 of the headwear 78, such as frame 32 or glasses 81. Each of the lenses can be movable is directions towards and away from the display matrix 81, and suitable linear movement devices such as linear actuators (not shown) can be carried by the support structure 79 for providing such respective lineal movement. In one embodiment (not shown), only one of lenses 82, 83 is provided and such lens is movable towards and away from the display matrix 81 by its linear actuator. In the foregoing manner, one or both of lenses 82, 83 serve as software or computing system focusable lens. It is appreciated that other software or computer focusable lens can be provided and be within the scope of the invention. For example, a liquid crystal with a tunable refractive index, or one or more deformable liquid or fluid-filled lenses, can be utilized instead of lenses 82, 83 and serve as the software or computer focusable lens of the invention.

The display matrix 81 and linear actuators are electrically coupled to a suitable miniaturized computer system or computer 86, such as computer 61 of glasses, also carried by the support structure 79. Each such optical element assembly 80, which can serve for example as one or both of optical elements 43 and 44 of glasses 31, can as described above include display matrix 81, double concave lens 82 and double convex lens 83 as well as an outwardly-facing digital sensor or image display module 87, such as camera 69 of glasses 31, and one or more inwardly-facing digital sensors in the form of camera 88, which can be similar to inwardly-facing cameras 68 of glasses 31. The optical element assemblies 80 of the headwear 78 can each be carried by the support structure 79 and electrically coupled to computer 86.

In operation, the one or more cameras 88 and/or other inwardly-facing sensors capture the scene in real-time and feed the data into the miniaturized computer 86. The computer then runs an operating system, alone or in combination with local application and/or networked applications that have access to some or all of the sensor data from cameras 88, and produces output that is sent to the display matrix 81. If no application is running, the default behavior is to pass the data from the sensors 88 through to the computer 86, as well as apply necessary camera transformations and other software procedures, to make the user see the unmodified view as if the user was not wearing the headwear 78.

Figure 3:
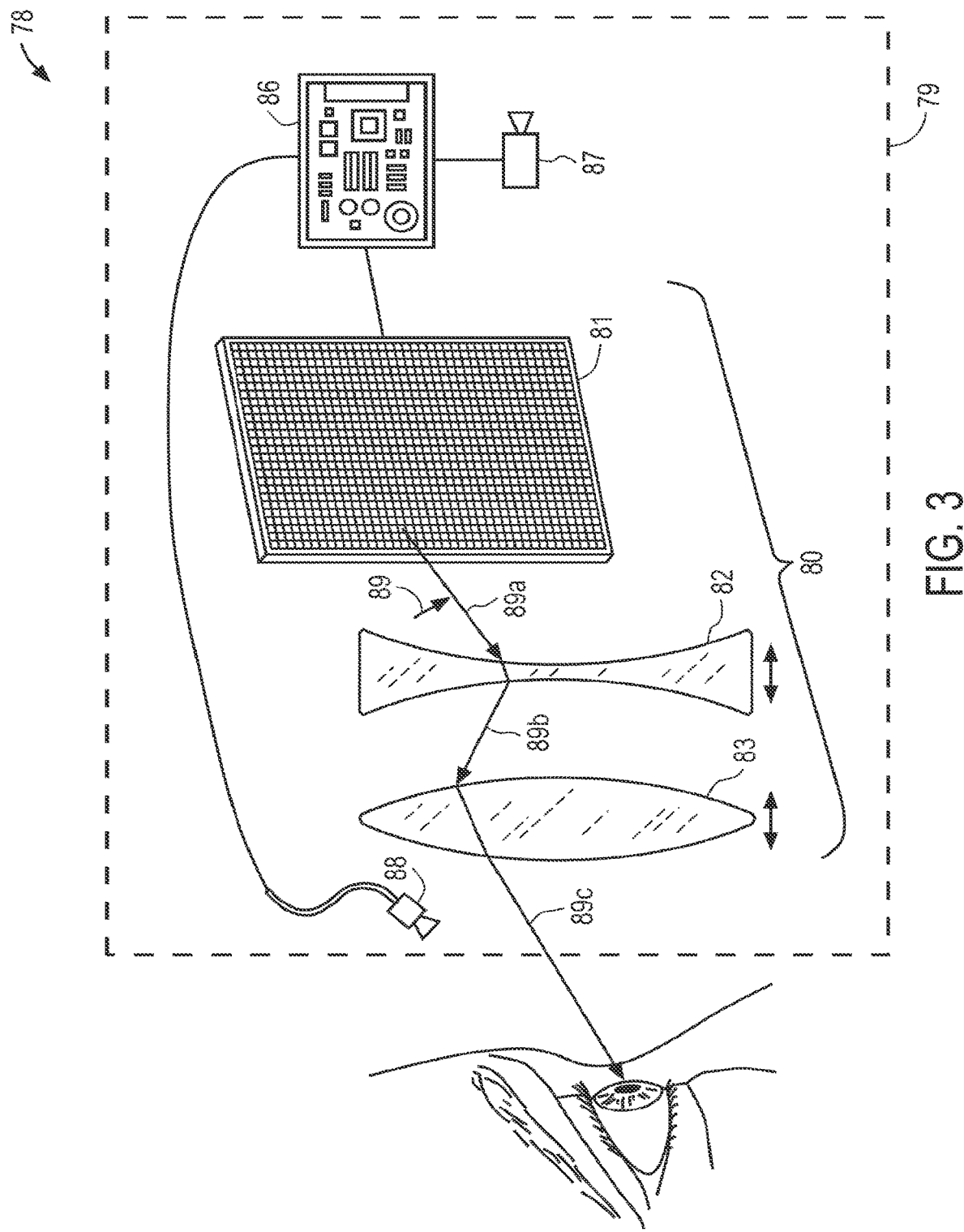
FIG. 3 is a schematic illustration of one embodiment of a display apparatus for use with the headwear of the present invention.

Once one or more of the local application, the networked application and the computer 61 produce output data, such data is sent to the display matrix 81, which converts the data into visible photons on the matrix 81. Next, those visible photons pass through one or more of the optical lenses 81, 82 which enhance the realism of the displayed representation of reality by for example adjusting the optical focal distance between the eye and the image viewed on the matrix 81. As an example, the combination of convex lensing element 82, concave lensing element 83, and a software or computer algorithm provided in one or more of computer 86, the local applications or the networked applications, which algorithm is informed by both knowledge of the scene and by knowledge of the view point at which the user is looking, can be used to adjust the optical focus distance between the display matrix 81 and the eye of the viewer of the viewed scene, as shown schematically in FIG. 3. An optical path 89 of a photon, from one of the pixels on display matrix 81, is shown in FIG. 3, and includes a first path segment 89a from the display matrix 81 to one surface of convex lens 82, a second path segment 89b from the opposite surface of convex lens 82 to one surface of concave lens 83 and a third path segment 89c from the opposite surface of concave lens 83 to the eye of the user. Adjusting the scene's focus distance can achieve several goals, including focusing individual objects to be at their correct optical distances, so as to achieve a level of realism called volumetric three dimensional graphics which is a better than standard stereo three dimensional graphics. Such adjustment of the scene's focus distance can also render objects at slightly different distances by using a software implementation of the user's optometry prescription. For example, if the user's prescription is minus 0.5 diopters in the left eye and minus 0.25 diopters in the right eye, then the objects shown to the left eye can just be drawn 0.5 diopters closer to the eye of the viewer than reality, and the objects shown to the right eye drawn 0.25 diopters closer to the eye of the viewer than reality, which achieve the optometry prescription without requiring any prescription lenses but instead an adjustment of the input data provided to the software algorithm.

It is appreciated that in one embodiment none of the lenses in optical display assembly 80 is movable, whether the assembly 80 include both lenses 82, 83 or only one of such lenses 83, 83.

Figure 4:
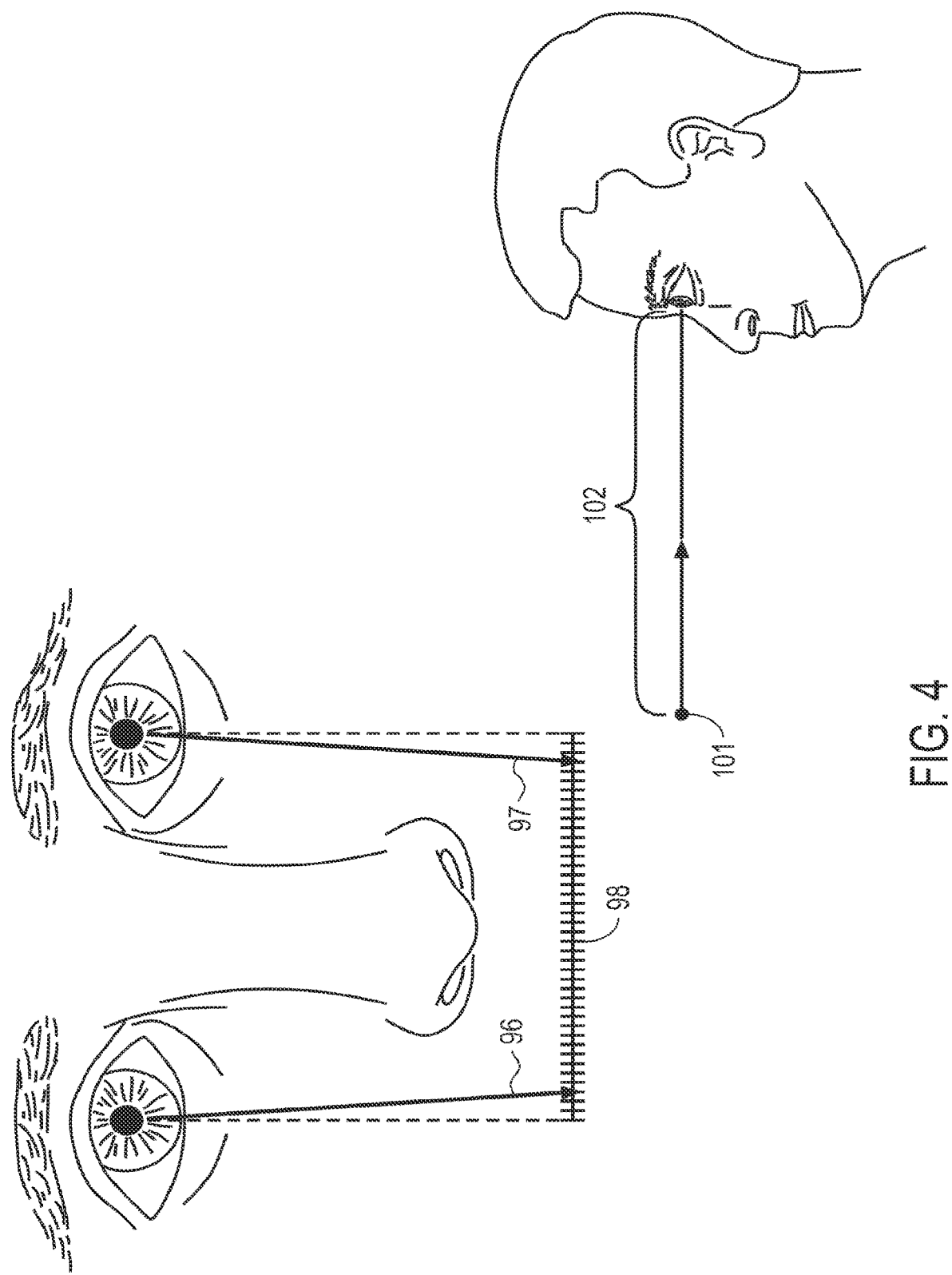
FIG. 4 is a schematic illustration of one embodiment of an eye tracking and three-dimensional distance focusing system for one embodiment of the headwear of the present invention.

One embodiment of determining the three dimensional point that the user is focusing on and/or the distance from the user's eyes to the three dimensional point that the user is focusing on, sometimes referred to herein as Z distance, for the purpose of driving a focusable display, and/or as inputs into a computer system, is illustrated in FIG. 4. An eye-tracking sensor, such as one or more cameras 68 on right optical element holder 37 of glasses 31 or the camera 88 of headwear 78 pertaining to the right eye of the user, determines the gaze vector 96 of the right eye of the user, that is the angle and direction at which the right eye of the user is pointed or gazing at a point in time, for example when viewing an object or virtual position in space. Another or the same eye-tracking sensor, such as one or more of cameras 68 on left optical element holder 36 of glasses 31 or the camera 88 of head wear 78 pertaining to the left eye of the user, simultaneously determines the gaze vector 97 of the left eye of the user, that is the angle and direction at which the left eye of the user is pointing or gazing at the point in time, for example when viewing the object or virtual position in space being viewed by the right eye at the time of measurement. The gaze vectors 96, 97 converge so as to intersect at such object or virtual position in space. Any suitable sensing system that can include the left eye-tracking sensor and/or the right eye-tracking sensor and/or additional eye tracking sensors tracks properties of the user's right and left eyes, for example the two pupils, irises, and/or eye muscles of the eyes, to determine the user's inter-ocular distance 98, mood, intent, or other biometric properties that can be computed and derived within a computer system, such as computer 61 of glasses 31, computer 86 of head wear 78, or other local or networked computers communicating with such computers 61 or 86. The inter-ocular distance is the distance between the eyes of the user, as shown in FIG. 4.

A computing system, such as computer 61 of glasses 31, computer 86 of headwear 78, or other local or networked computers communicating with such computers 61 or 86, uses inputs 96-98, and/or other inputs potentially including digital sensor data obtained from the headwear or elsewhere, waveforms, images and/or geometry of the scene that the user is looking at, to produce outputs including a three-dimensional point or gaze point 101 in space that the user is looking at and/or a Z distance 102, expressed in linear distance or dioptric/optical distance or both, from the user's eyes to the gaze point 101. The right gaze vector 96 intersects the left gaze vector 97 at such gaze point 101. The three-dimensional point 101 can be used as an input to a computer software system, for example computer 61 of glasses 31, computer 86 of headwear 78, or other local or networked computers communicating with such computers 61 or 86, to map a virtual position in three dimensional space where the user is looking in order for the user to control aspects of such software system. The Z distance 102, which can be expressed as dioptric distance where the dioptric distance equals one divided by the linear distance, is useful as an input to a computing and display system of the present invention that renders visible photons that are in focus at the proper optical focus distance that the user is looking at. More detail regarding the foregoing is disclosed in a paper entitled Volumetric World Display dated May 15, 2012 authored by Jon Rodriquez, the entire content of which is incorporated herein by this reference.

FIG. 5 illustrates a user viewing an immersive, computer-generated scene that looks just as realistic as the real-world by use of one embodiment of the headwear of the present invention. Although not illustrated in FIG. 5 for simplicity, the headwear 111 of FIG. 5 can be in the form of glasses, goggles, eyewear or any of the other headwear discussed above, and can include any suitable support structure (not shown), such as a frame, for supporting the components of the headwear on the head of the user. Headwear 111 can include any suitable left and right optical elements or assemblies 113, including any of the optical elements discussed above, mounted on or secured to the support structure. In one embodiment, each of the left and right optical elements or assemblies 113 are in the form of any suitable light field array such as a suitable plenoptic lens system. In one embodiment, each assembly 113 includes a high density digital display or matrix 114, for example any of the displays discussed above with respect to display matrix 81, having a display surface 116. A lens array 117, which can be of micro scale or nano scale, overlies the display matrix 114 and is included in the assembly 113.

In one embodiment, the lens array 117 includes a plurality of micro-scale lenses 118 arranged in an array that can be substantially centered on an eye of the user. Although the lens array 117 can be flat or have any other suitable configuration or shape, in one embodiment the lens array has suitable transverse dimensions so as to encompass the entire peripheral vision of the user. In one embodiment, the lenses 118 are arranged in an arcuate array 117 that can be substantially centered on an eye of the user so, for example, to warp around the eye of the user, and in one embodiment such arc has substantially the same curvature of the eye and has sufficient arcuate dimensions to encompass the entire peripheral vision of the user. In one embodiment, the curvature of the arcuate array is a radial curve. Each of the micro lenses can be made from any suitable material such as plastic, glass or another suitable transparent material, and can have an outer surface 122 that faces the eye of the user during use that can be either flat, concave or convex and is shown in FIG. 5 as being concave.

The lens array 117 can be carried by or mounted on any suitable member or element, and in one embodiment is mounted on a suitable support element 119 made from any suitable transparent materials such as glass or plastic. The support element includes an arcuate surface 120 on which the lenses 118 are mounted or secured and which defines the arcuate shape and dimensions of the arcuate array 117. Although in the illustrated embodiment the lenses 118 are fixed or non-movable, it is appreciated that lenses 118 can be movably carried by the support element 119 and be within the scope of the invention. In this regard, for example, the support element 119 can include can include nano materials and/or nano particles that are movable or actuatable for example by magnetic or electric fields to cause the lenses 118 to move on the arcuate surface 120 of the support element 119.

Each assembly 113 can further include a suitable focusing element 121 for eliminating artifacts such as chromatic aberrations from the light passing through the assembly. In one embodiment, the focusing element 121 is disposed between the display matrix 114 and the support element 119 of the lens stray 117.

A plurality of optical paths 131-135 are shown in FIG. 5 and illustrate the travel of respective photons emitted from the display matrix 114 and include a first path segment 131a-135a from the display surface 116 of the matrix 114 to the rear of the support element 119, a second path segment 131b-135b from the rear of the support element 119 to the rear surface of a micro lens 118, and a third path segment 131c-135c from the outer surface 122 of the micro lens 118 to the eye of the user. The exploded portion of FIG. 5 shows a subarray 141 of a plurality of pixels 142 of display matrix 114, and a plurality of optical paths 143, 144 of photons emitted from a couple of such pixels 142 and having first path lengths 143a, 143b from the display surface 116 of the subarray 141 to the rear surface of the micro lens 118 and respective second path lengths 143b, 144b from the outer concave surface 122 of the micro lens 118. As can be seen from FIG. 5, the concave outer surface 122 of each micro lenses 118 causes the optical paths of photons emitted from the pixels 142 of the subarray 141 operated on by such lens 118 to diverge from each other as they are emitted from the outer surface 122 of the lens 118. A convex surface on the micro lenses 118 would cause the optical paths of such a subarray 141 to converge from the outer surface 122 of the lens 118.

In one operation of such embodiment, data or signals from a miniaturized computer running an operating system, for example computer 61 or computer 86, and/or local application(s) and/or networked application(s), is sent to display matrix 81, which produces photons based on the input data or signal. The optical assembly 113, which in one embodiment includes display matrix 81, focusing element 121 and the plurality of micro leases 118, not only can display software controlled color and intensity like a normal pixel, it can also send different color and intensity of light in different directions, for example in the manner discussed above. The array 117 of these superpixels 118 can thus render an optical four dimensional light field, which is sufficient to reproduce the complete visual appearance of the real world, including optical focus and multi-focus, that is having different objects be at different distances in a single frame. When the micro lenses 118 are movable, the steering of light in different directions can also be assisted by other micro- and macro-scale optics layers (not shown), including optics that mechanically move or deform in response to electromagnetic fields. Such optic layers can also used to direct the light, including optical paths 131-135 and 143-144, so that it impinges upon the user's eye from all directions, for example in a wide-angle configuration, immersing the user in the virtual world.

Figure 6:
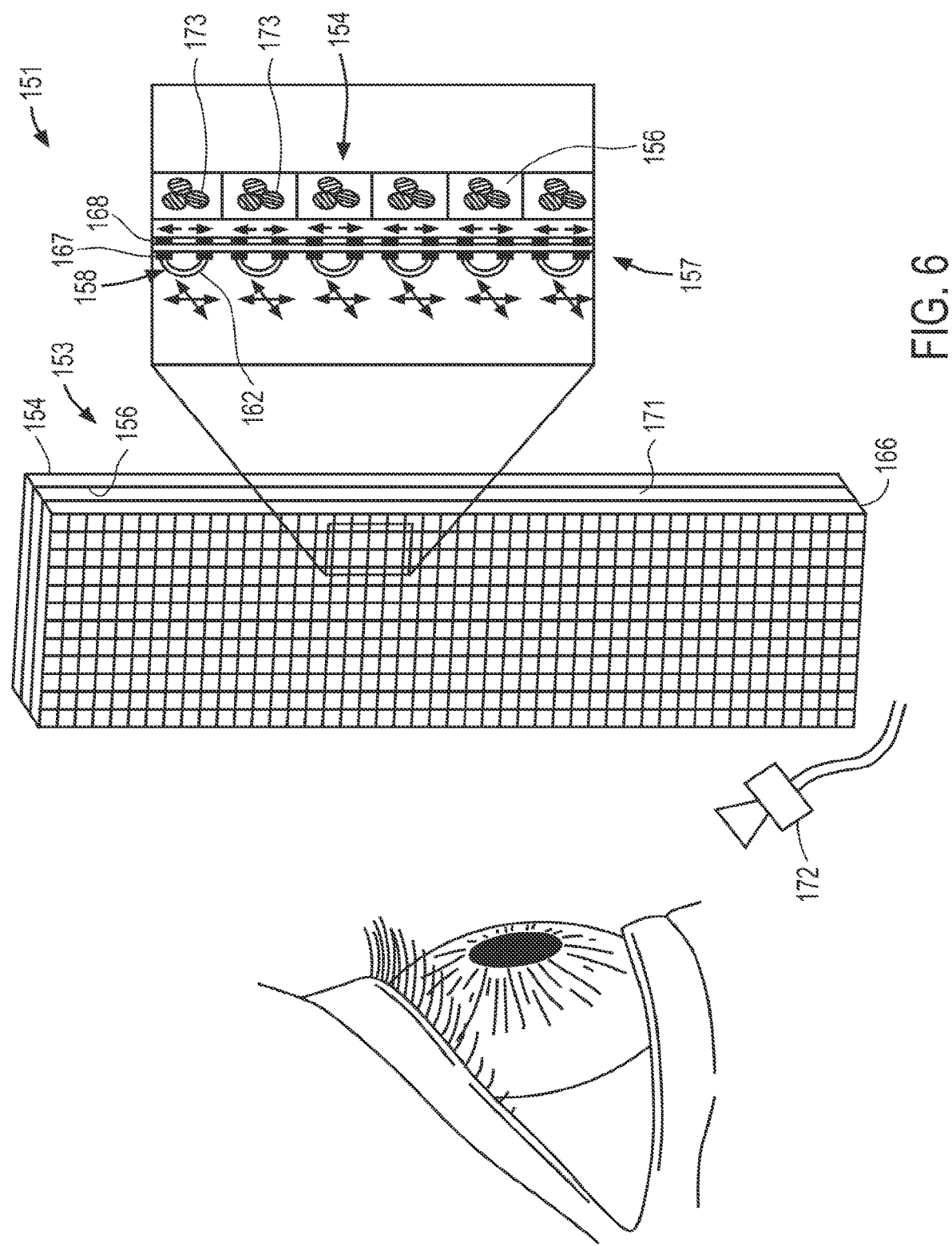
FIG. 6 is a schematic illustration of another embodiment of a display apparatus for use with the headwear of the present invention, a portion of which has been enlarged in size.

FIG. 6 illustrates one embodiment of a user in an immersive, computer-generated scene that looks just as realistic as the real-world. Headwear 151 therein is similar to headwear 111 and would be used with a miniaturized computer running an operating system, for example computer 61 or computer 86, and/or local application(s) and/or networked application(s). Although not illustrated in FIG. 6 for simplicity, the headwear 151 can be in the form of glasses, goggles, eyewear or any of the other headwear discussed above, and can include any suitable support structure (not shown), such as a frame, for supporting the components of the headwear on the head of the user. Headwear 151 can include any suitable left and right optical elements or assemblies 153, including any of the optical elements discussed above, mounted on or secured to the support structure. In one embodiment, each of the left and right optical elements or assemblies 153 are in the form of any suitable light field array such as a suitable plenoptic lens system. In one embodiment, each assembly 153 includes a high density digital display or matrix 154, for example any of the displays discussed above with respect to display matrix 81, having a display surface 156. A lens array 157, which can be of micro scale or nano scale, overlies the display matrix 156 and is included in the assembly 153.

In one embodiment, the lens array 157 includes a plurality of micro-scale lenses 158 arranged in an array that can be substantially centered on an eye of the user. Although the lens array 157 can be arcuate or have any other suitable configuration or shape, in one embodiment the lens array has suitable transverse dimensions so as to encompass the entire peripheral vision of the user. In one embodiment, the lenses 158 are arranged in a flat array 157 that can be substantially centered on an eye of the user and has sufficient dimensions to encompass the entire peripheral vision of the user. Headwear 151 is configured so that the assembly 153 is located very close to the eye of the user, and thus has a very near ocular distance, when in use. Each of the micro lenses can be made from any suitable material such as plastic, glass or another suitable transparent material, and can have an outer surface 162 that faces the eye of the user during, use that can be either flat, concave or convex and is shown in FIG. 6 as being concave.

The lens array 157 can be carried by or mounted on any suitable member or element, and in one embodiment is mounted on a suitable support element 166 made from any suitable transparent materials such as glass or plastic. The support element 166 includes a flat surface on which the lenses 158 overlie. Although in the illustrated embodiment the lenses 158 are movable, it is appreciated that lenses 158 can be fixably carried by the support element 166 and be within the scope of the invention.

In one embodiment, the lenses 158 are movable relative to the support element 166. Although the assembly 153 can include any suitable means tor moving the lenses 158 individually or in unison relative to the support element 166, in one embodiment each lens 158 is mounted on a first electromagnet 167 which overlies and is movable relative to a second electromagnet 168. The electromagnets 167 and 168 can each be of nano or micro scale size and can extend parallel to but spaced apart from each other. The first electromagnet can move in directions, including first and second orthogonal directions in its plane and thus parallel to the second electromagnet 168, and in one embodiment can additional move towards and away from the second electromagnet 168 regard. Any suitable means can be provided for causing such movements, and in one embodiment a magnetic particle fluid, for example nano materials and/or nano particles (not shown), is disposed between the first and second electromagnets 167, 168 and a magnetic field or flux generator or other suitable means can be provided for causing the first electromagnet 167 to move in the desired direction(s) relative to the second electromagnet 168. In one embodiment, electrostatics are utilized to cause such movement.

Each assembly 153 can further include an optional optical layer 171, which in one embodiment can be highly refractive, disposed between display matrix 154 and the support element 166.

Headwear 151 includes at least one eye-tracking sensor, and ideally at least one per eye, tracking one or both eyes of the user using the headwear. In one embodiment, the eye-tracking sensor(s) can each be in the form of an inwardly-facing digital sensor or camera 172, which can be similar to inwardly-facing cameras 68 of glasses 31.

Figure 7:
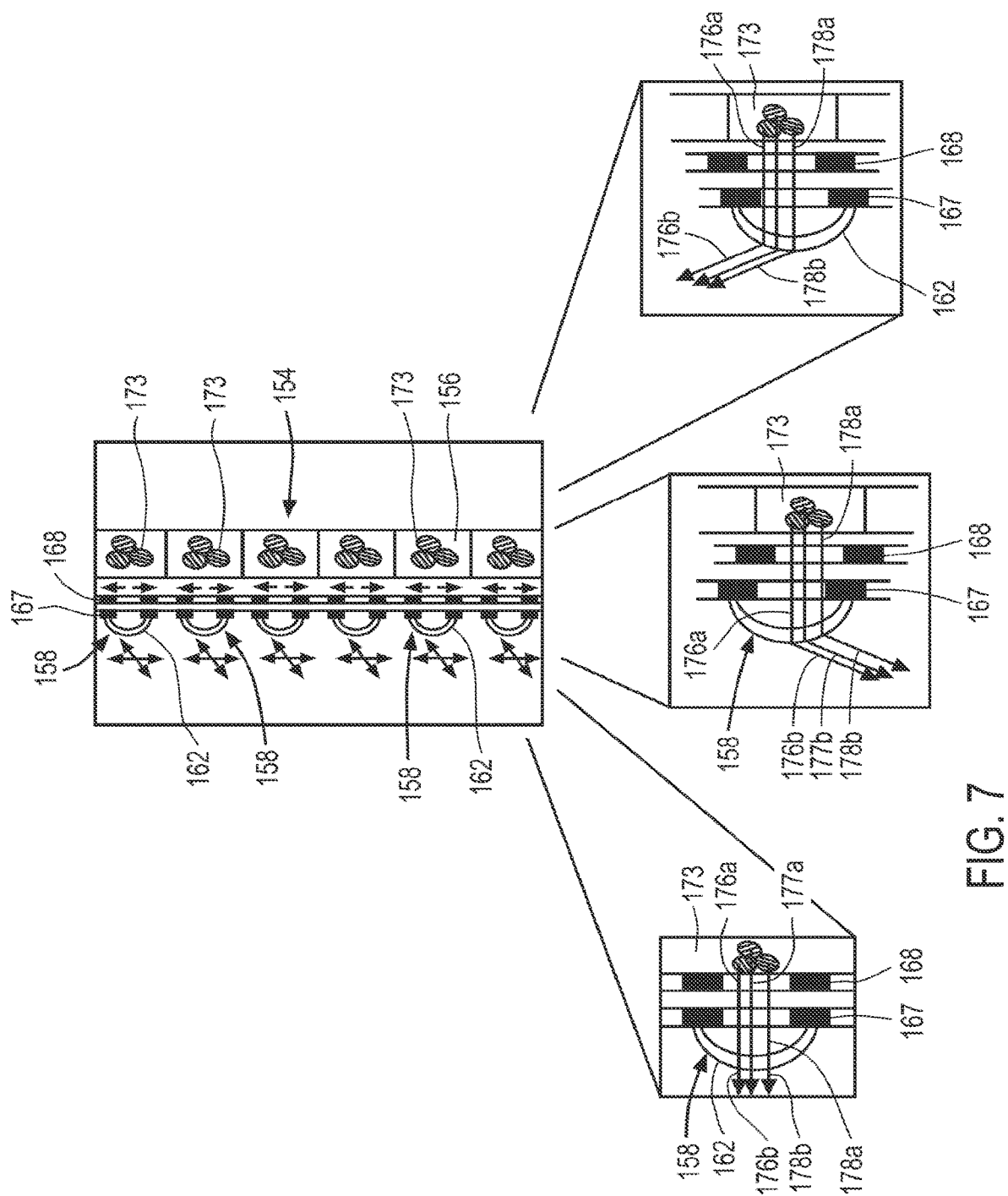
FIG. 7 is a schematic illustration of the enlarged portion of the display apparatus of FIG. 6, a portion of which has enlarged in three views to illustration alternate positions of the lenses shown therein.

The exploded portion of FIG. 6 includes a plurality of RGB matrices 173 provided, for example, on the display surface 156 of the display matrix 154. Each of the three pixels of each matrix is capable of emitting a separate photon. In FIG. 7, the first and second electromagnets 167, 168 are shown in three relative positions with respect to each other. Additionally in FIG. 7, a plurality of optical paths 176-178 are shown and illustrate the travel of respective photons emitted from the respective RGB matrix 173 and include a first path segment 176a-178a from the matrix 173 to the rear of the micro lens 158, and a second path segment 176b-178b from the outer surface 162 of the micro lens 158 to the eye of the user. As can be seen from FIG. 7, the concave outer surface 162 of each micro lenses 158 causes the second path segments 176b-178b of photons emitted from the matrix 173 to continue in a direction parallel to the first path segments 176a-178a when the first electromagnet 167 is aligned, registered or concentrically disposed with respect to the second electromagnet 168. When viewed in a plane as in FIGS. 6 and 7, the second path segments 176b-178b of photons emitted from the matrix 173 are redirected to an inclined first direction relative to or with respect to the first path segments 176a-178a when the first electromagnet 167 is offset in a first direction relative to the second electromagnet 168 and are redirected to an inclined second direction relative to or with respect to the first path segments 176a-178a when the first electromagnet 167 is offset in a second direction, that is opposite to the first direction, relative to the second electromagnet 168. A convex surface on the micro lenses 158 would cause the optical paths to similarly redirect when the first electromagnet 167 is moved to an offset position relative to the second electromagnet 168.

In operation, the scene can rendered through a combination of several means. Light color and intensity data travels to the display matrix 154, which emits visible photons. Simultaneously, electromagnetic commands controlled by the computer system are sent to the lens array 157 of mechanically actuated micro lenses 158 whose movement and/or deformation is actuated by the interaction of such electromagnetic commands with the first and second electromagnets 167 and 168. The effect of this movement and/or deformation of the micro lenses 158 and/or their housings and/or a liquid is to steer the light from the display matrix 154, 173 in software-controlled directions 176b-178b, resulting in the visible photons emitted by the matrices having not just software-controlled color, intensity, and (x,y) coordinates, but also software controlled left-right and up-down direction of emission. In one embodiment, such commands can be encoded as electromagnetic or acoustic waveforms. When such an array 157 is tiled across a vast array, such as display matrix 154, and/or built into or with an optical layer containing or adjacent to such array, the resulting total system has the power to render a so-called "four dimensional light field", meaning that the system takes in data specified with (x,y,pan,tilt) spatial coordinates, or coordinates in one of several other equivalent parameterizations of four dimensional light fields. The resulting "four dimensional light field display" or "four dimensional plenoptic display" is able to render multiple objects that are in focus at a variety of different focal distances—in other words, a scene with all the optical realism of physical reality.

The inclusion of the eye trackers 172 is useful for stabilizing the displayed scene relative to the rotation of the user's eyeball, became the optical center of the eyeball is not in the same place as the rotational center of the eyeball, such stabilization is beneficial. Such eye tracking is also useful as an input to a software or other operating system of the computer (not shown) of headwear 151 and/or local application(s) and/or networked application(s) communicating with such computer, for example in an interface where the user looks at an object to seamlessly and effortlessly interact with the object.

In addition, the input from eye tracker or inwarding facing sensor or camera 172 can be used for a display technique called "saccade amplification", which increases the user's field of view by "moving the world" when the user moves their eyes. For example, if the user looks left by ten degrees, the world can move right by ten degrees, resulting in a total movement of 20 degrees for a 2× amplification of how many degrees the user can turn their view. This could also give the user the ability to extend their peripheral far beyond the normal human field of view, for example, to include views behind the person's head. This saccade amplification technique, combined with viewing data from cameras, for example any suitable outward-facing camera included in the headwear 151, that see to the left and right of the user's head as well as forward, results in expanded peripheral vision and awareness for the user, a great boon for drivers and pilots who need to be aware of their surroundings in all directions.

Figure 8:
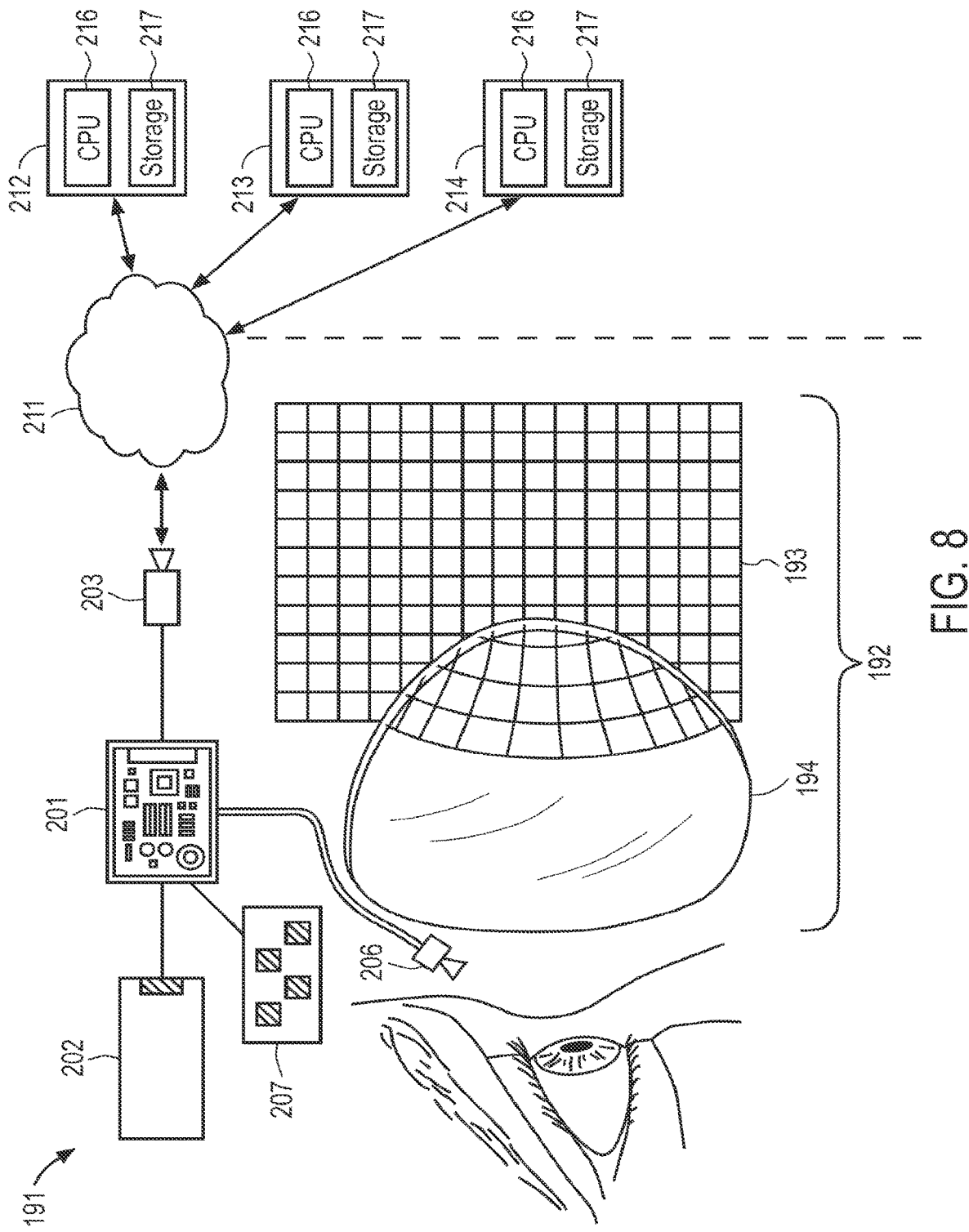
FIG. 8 is a schematic illustration of another embodiment of a display apparatus and system incorporating the same for use with the headwear of the present invention.

A system and methods for interactive local and remote display and control of a computer controlled via signals and with output to a light based output system can be provided. In one embodiment, illustrated in FIG. 8, headwear 191 can be in the form of glasses, goggles, eyewear or any of the other headwear discussed above, and can include any suitable support structure (not shown), such as a frame, for supporting the components of the headwear on the head of the user. Headwear 191 can include any suitable left and right optical elements or assemblies 192, which can be similar to any of the optical elements or assemblies discussed herein including optical elements 43, 44 of glasses 31, display assembly 80 of headwear 78, optical assembly 113 of headwear 111 or optical assembly 153 of headwear 151. In one embodiment, the optical assembly 192 includes any suitable display matrix 193, which can be similar to display matrix 81 discussed above, and any suitable optical layer 194, which can be similar to any of the optical, layers herein including optical layers 82, 83, lens array 117 or lens array 157.

Headwear 191 can include any suitable computing system, including any of the computers disclosed herein such as computers 61 and 86. In one embodiment, a micro computer system or computer 201 powered by a suitable rechargeable battery 202, which can be similar to battery 62, is provided. Computer 201 can receive a data stream from one or more image sensors 203, which can be of any suitable type such as camera 69, geometry sensor 73 or as combination thereof, positioned such that the image sensor 202 senses the same scene as a human eye. One or more additional image sensors 206, which can be of any suitable type such as similar to camera 68, EOG sensor 71 or a combination of the foregoing, is positioned such that a human eye and surrounding region is visible in the field of view of the sensor. Sensor 206 delivers a data stream to the micro computer system 201 as well. One or more additional sensors 207, which can be of any suitable type such as EOG sensors 71, EEG sensors 72 or any other sensor for obtaining biometric information from the user, can also be connected to the micro computer 201. Additionally, the micro computer system or computer 201 is connected to a means of data transmission 211 to one or more networked computers, which in one embodiment can include first networked computer 212, second networked computer 213 and third networked computer 214, such a way that data cart be simultaneously transmitted to and from the micro computer 201 by one or more of such networked computers. The data transmission means can be of any suitable form, including wired, a local area network, a wide area network, a dynamic area network, cellular transmission, peer to peer or a combination of any of the foregoing. Each of computers 212-214 can be of any suitable type, and each include at least a central processing unit 216 and one or more storage mediums 217.

The micro computer system 201 connects to a digital display assembly 192. The digital display system or assembly 192 is positioned such that light emitted from display matrix 193 passes through one or more layers 194 of material that may modify the path of the light such that the light is delivered to a human eye.

In one method of operation, the micro computer system 201 receives inputs from one or more of sensors 203, 206, 207 and executes procedures in response to the inputs. In one example, a procedure processes the input from the digital sensor system 206 to determine properties of the human eye that it senses. The procedure then modifies the signals delivered to the display matrix 193 in response to the measured properties. In another example, the input stream from the outward facing sensor system 203 is processed and output to the display matrix 193. In another example, a procedure receives data from the outward facing sensor system 203 and delivers it along the means of networked communication 211 to a networked computer in the first networked computer 212, which in one embodiment can be a grid computer, a computing cluster or a remote cloud computer. The first networked computer 212 stores the sensed data in its digital storage medium 217 and then a collection of software or other instructions running on one or more second networked computers 213 executes procedures on the data to extract information. The procedures on the second networked computers 213 can include reality as a platform software. The extracted information is then delivered back along the network 211 to the micro computer system 201 and a procedure running on the micro computer system 201 executes a procedure to output the information to the display matrix 193.

The foregoing procedures may be modified in response to other procedures or signals received from inputs to the micro computer system 201, including inputs from any of sensors 203, 206, 207. In one example, a third-party application on the third networked computer 214 sends a command to the second networked computers in 213 which in turn delivers a signal to the micro computer 201 which modifies the procedures embedded in computer 201.

Figure 9:
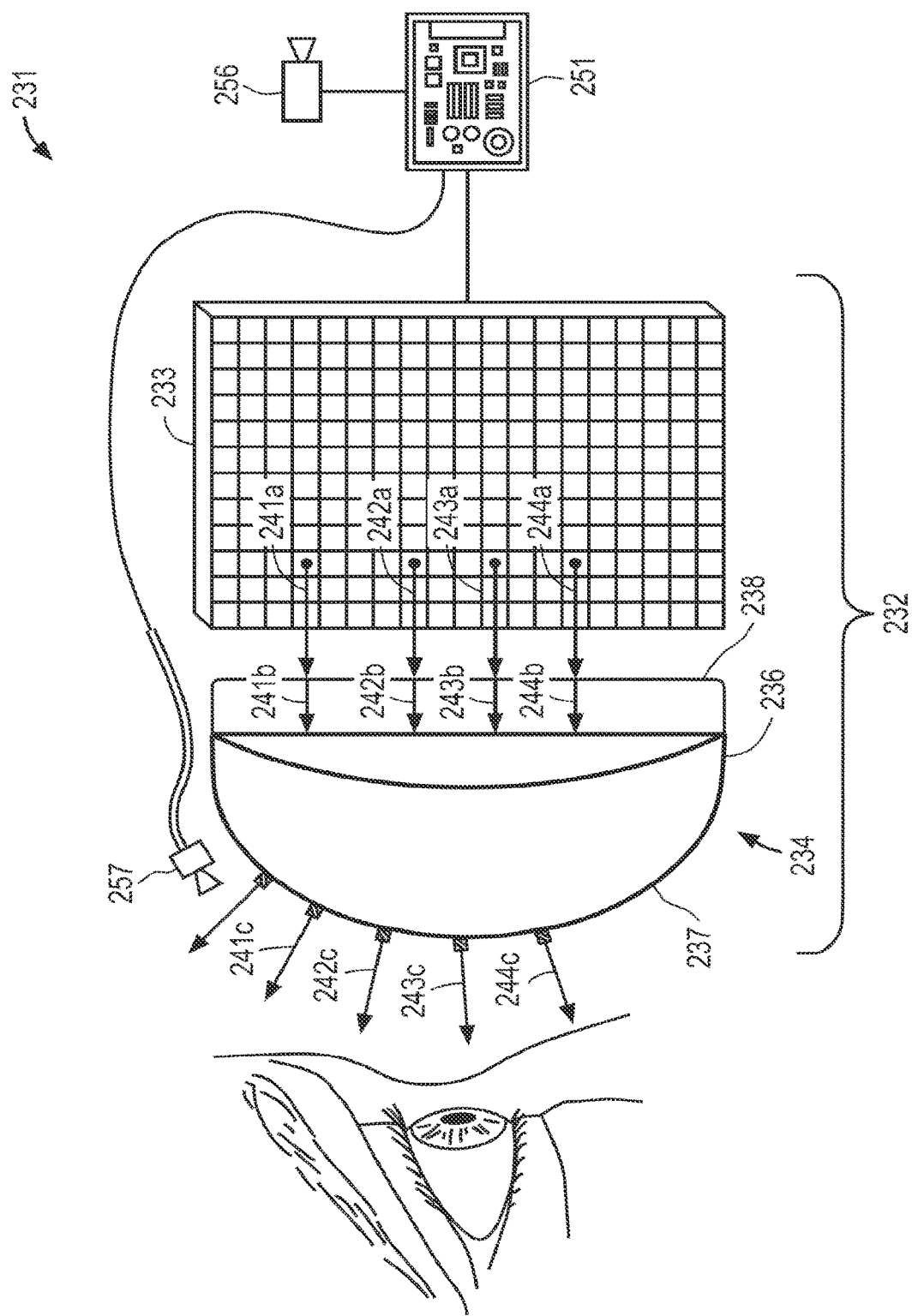
FIG. 9 is a schematic illustration of a further embodiment of a display apparatus for use with the headwear of the present invention.

In another embodiment of the headwear of the present invention, illustrated in FIG. 9, headwear 231 can be provided in any suitable form such as glasses, goggles, eyewear or any of the other headwear discussed above, and can include any suitable support structure (not shown), such as a frame, for supporting the components of the headwear on the head of the user. Headwear 231 can include any suitable left and right optical elements or assemblies 232, which can be similar to any of the optical elements or assemblies discussed herein including optical elements 43, 44 of glasses 31, display assembly 80 of headwear 78, optical assembly 113 of headwear 111, optical assembly 153 of headwear 151 or optical assembly 192 of headwear 191. In one embodiment, the optical assembly 232 includes any suitable display matrix 233, which can be similar to display matrix 81 discussed above, and any suitable optical layer or layers 234, which can be similar to any of the optical layers herein including optical layers 82, 83, lens array 117 or lens array 157 and can further include prisms and/or mirrors and/or waveguides and/or other optics. The optical layer 234 can include hemispherical optics of any suitable size and configuration, include hemispherical optics similar to micro lenses 118 or 158 that are provided in an array overlying the display matrix or a larger hemispherical element such as a single hemispherical element 236 that covers the entire or substantially all of the display matrix 233.

The hemispherical element 236 can be made from any suitable material such as plastic, glass or another suitable transparent material, and can have an outer surface 237 that faces the eye of the user during use that can be either flat, concave or convex and is shown in FIG. 9 as being concave.

Each assembly 233 can further optionally include a suitable focusing element 238 for eliminating artifacts such as chromatic aberrations from the light passing through the assembly. In one embodiment, the focusing element 238 is disposed between the display matrix 233 and the hemispherical element 236.

A plurality of optical paths 241-244 are shown in FIG. 9 and illustrate the travel of respective photons emitted from the display matrix 233 and include a first path segment 241a-244a from the surface of the display matrix 233 to the rest of the focusing element 238, a second path segment 241b-244b through the focusing element and a third path segment 241c-244c from the outer surface 237 of the hemispherical element 236 to the eye of the user. As can be seen from FIG. 9, the concave outer surface 237 of the hemispherical element 236 causes the optical paths of photons emitted from the display matrix 233 and operated on by the element 236 to diverge from each other as they are emitted from the outer surface 237 of the hemispherical element 236. A convex surface on the hemispherical element 236 would cause the optical paths emitted from the display matrix 233 to converge from the outer surface 237 of the hemispherical element 236.

Headwear 231 can include any suitable computing system, including any of the computers disclosed herein such as computers 61 and 86 and/or any combination of one or more other local or networked computers. In one embodiment, a micro computer system or computer 251 powered by a suitable rechargeable battery (not shown), which can be similar to battery 62, is provided. Computer 251 can receive a data stream from one or more image sensors 256, which can be of any suitable type such as camera 69, geometry sensor 73 or a combination thereof, positioned such that the image sensor 256 senses the same scene as a human eye. One or more additional image sensors 257, which can be of any suitable type such as similar to camera 68, EOG sensor 71 or a combination of the foregoing, is positioned such that a human eye and surrounding region is visible in the field of view of the sensor. Sensor 257 delivers a data stream to the micro computer system 251 as well. One or more additional sensors (not shown), which can be of any suitable type such as EGG sensors 71, EEG sensors 72 or any other sensor for obtaining biometric information from the user, can also be connected to the micro computer 251. The micro computer system or computer 251 connects to digital display matrix 233. The digital display system or assembly 232 is positioned such that light emitted from display matrix 233 passes through one or more layers of material, which can include hemispherical element 236, that may modify the path of the light such that the light is delivered to a human eye.

In one method of operation, the headwear or system 231 captures data of the scene in front of the user, using digital sensor or camera 256. Then, the miniaturized computer system 251 executes computer software or embedded operations that perform intelligent analysis and/or modifies, enhances, or reproduces the data stream in various ways. Then the miniaturized computer 251 outputs the new data or signals and sends it to display matrix 233. The display matrix produces visible photons, that travel along optical paths 241-244 and are sent through lenses and/or prisms and/or mirrors and/or waveguides and/or other optics 236 that redirect visible photons to the user's eyes.

In one embodiment of this system or headwear 231 designed for stereo 3D, there can be just one miniaturized computer 251, but two each of the components including camera 256, optical assemblies 232 and sensor or camera 257 such that there are one of each of such components for each eye. This stereo formulation produces a stereo 3D experience where data is displayed to each eye and combine to form a 3D display system. The same miniaturized computer 251 can be used to process both eyes' data streams.

Figure 10:
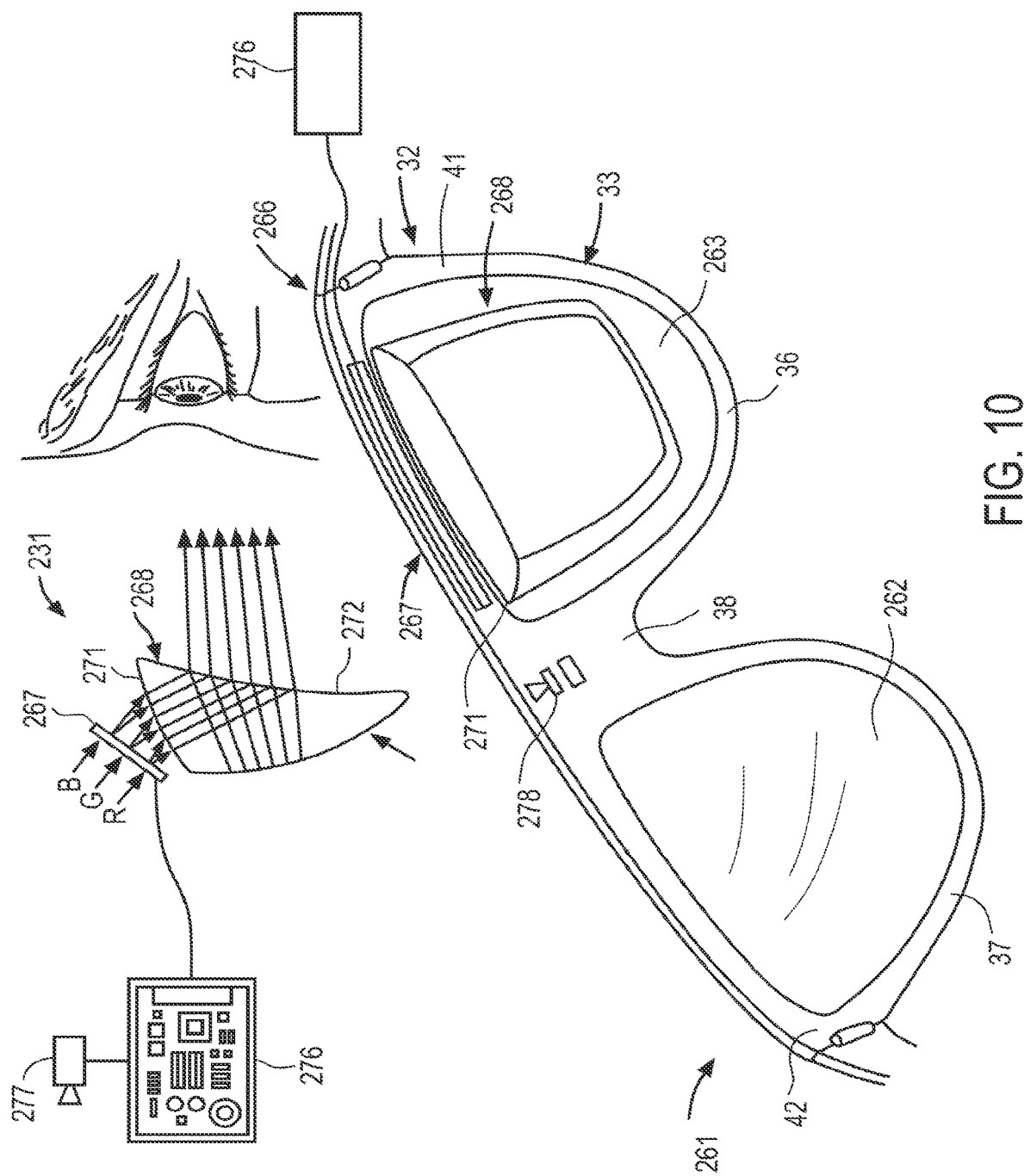
FIG. 10 is a schematic illustration of another embodiment of a display apparatus for use with the headwear of the present invention.

In another embodiment of the headwear of the present invention, illustrated in FIG. 10, any suitable form of headwear can be provided, including classes, goggles, eyewear or any of the other headwear discussed above, and in one embodiment is in the form of a pair of glasses 261. The glasses can be of any suitable type, including glasses 31, and like reference numerals have been used to describe like components of glasses 261 and 31. For simplicity, on a portion of the glasses 261 are shown in FIG. 10. Headwear or glasses 261 can optionally include left and right optical lenses 262, 263 secured within respective left and right optical element holders 36, 37. The glasses 261 can additionally include any suitable left and right optical elements or assemblies 266, which can be similar to any of the optical elements or assemblies discussed herein including optical elements 43, 44 of glasses 31, display assembly 80 of headwear 78, optical assembly 113 of headwear 111, optical assembly 153 of headwear 151, optical assembly 192 of headwear 191 or optical assembly 232 of head wear 231. Although only one optical assembly 266 is shown in FIG. 10, it is appreciated that an optical assembly 266 can be provided for both eyes of the user.

In one embodiment, the optical assembly 266 includes any suitable display matrix 267, which can be similar to display matrix 81 discussed above, and any suitable optical layer or layers 268, which can be similar to any of the optical layers herein including optical layers 82, 83, lens array 117 or lens array 157 and can further include prisms and/or mirrors and/or waveguides and/or other optics. In one embodiment, illustrated in FIG. 10, the optical layer is a prism 268 having a suitable size and configuration and including a first surface 271 for receiving light from display matrix 267 and a second surface 272 for emitting light to the eye of the user. The prism 268 extends over all or at least a portion of the optical element holder 36, 37 so to permit the user to see the second surface 272 of the prism when the eye of the user is viewing through the optical element holder. The first surface 271 faces upwardly from the frame 32 and the display matrix 267 overlies the prism so that photons and light emitted by the display matrix 267 impinge the first surface 271. The prism is sized and shaped so that the light is refracted within the prism and is directed towards the eye of the user he the second surface 272. In this regard, the second surface 272 can be convex so as to direct the light towards the center of the eye. The prism can optionally be sized and shaped so as to magnify the image projected by the display matrix 267 and the light travels through the prism, so that the image viewed from the second surface 272 is larger in one or more dimensions than the image emitted from the display matrix 267.

Headwear or glasses 261 can include any suitable computing system, including any of the computers disclosed herein such as computers 61 and 86 and/or any combination of one or more other local or networked computers. In one embodiment, a micro computer system or computer 276 powered by a suitable rechargeable battery (not shown), which can be similar to battery 62, is provided. Computer 276 can receive a data stream from one or more image sensors 277, which can be of any suitable type such as camera 69, geometry sensor 73 or a combination thereof, positioned such that the image sensor 277 senses the same scene as a human eye. One or more additional image sensors can be provided, including any of the other biometric or other sensors disclosed herein. In one embodiment, an outwardly-facing geometry sensor 278 can be used for any suitable purpose, including the scanning and capturing of three dimensional geometry. The micro computer system or computer 276 connects to digital display matrix 267.

Headwear or glasses 261 overlays information from computer 276, over the real scene, into the user's eyes. The system augments reality and/or overlays information and/or composites virtual objects into the scene.

In one method of operation of glasses 261, the input data from the one or more sensors, including sensor 277, is rendered by miniaturized computer 276 that decides what data to show based on the operating system and/or local application(s) and/or networked application(s) that are running combined with contextual awareness using digital sensors 277, 278. The system can be a display for one eye only, or for two eyes.

As discussed and seen in FIG. 10, the system or glasses 261 has a display matrix 267 that is not directly in front of the user's eye, and lenses and/or prism and/or mirrors and/or waveguides and/or other optics 268 to redirect the displayed photons into the user's eye in such a way that the photons overlay with the real-life scene. In one embodiment, the lenses and/or prisms and/or mirrors: and/or waveguides and/or other optics 268 show the data privately, so that the user's eye can see the graphics, but a third party looking at the user only sees the user's face and eye, but not the data.

Figure 11:
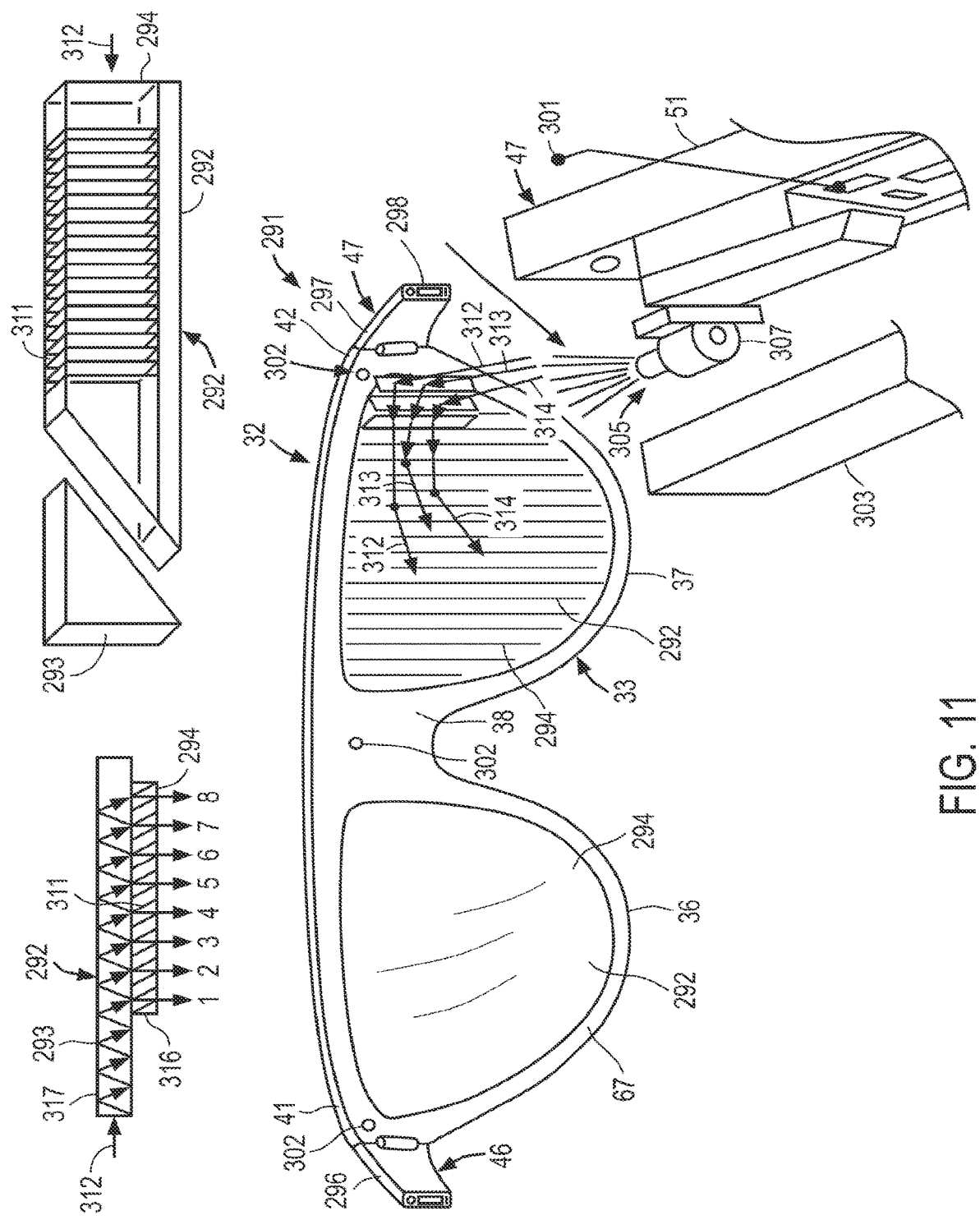
FIG. 11 is a schematic illustration of another embodiment of a display apparatus for use with the headwear of the present invention.

In another embodiment of the headwear of the present invention, illustrated in FIG. 11, any suitable form of headwear can be provided, including glasses, goggles, eyewear or any of the other headwear discussed above, and in one embodiment is in the form of a pair of glasses 291. The glasses can be of any suitable type, including glasses 31, and like reference numerals have been used to describe like components of glasses 291 and 31. For simplicity, on a portion of the glasses 291 are shown in FIG. 11. Headwear or glasses 291 can optionally include an optical lenses 292 secured within each of the left and right optical element holders 36, 37. The lens 292 has a front surface 293 and an opposite rear surface 294. The left and right ends 41,42 of the frame front piece 33 can optimally include respective left and right extensions 296, 297 that extend rearwardly from the respective ends 41, 42. Left and right temples 46, 47 are provided, and can either be fixedly secured to respective extensions 296, 297 or removably attachable to the respective extensions. In one embodiment, any suitable connector mechanism 298 is provided for securing the temple to the respective frame extension.

Headwear or glasses 291 can include any suitable, computing system, including any of the computers disclosed herein such as computers 61 and 86 and/or any combination of one or more other local or networked computers. In one embodiment, a micro computer system or computer 301 powered by a suitable rechargeable battery (not shown), which can be similar to battery 62, is provided. Computer 301 can receive a data stream from one or more image sensors 302, which can be of any suitable type such as camera 69, geometry sensor 73, camera 68, EOG sensors 71, EEG sensors 72 or a combination thereof. In one embodiment, the sensors 302 include one or more cameras and/or other digital sensors that face outward, that is toward the world or away from the user, and/or inward, that is toward the user. The data feeds from these sensors 302 go to miniaturized computer 301 running an operating system and/or local application(s) and/or networked application(s). In one embodiment, the computer 301 is disposed within the first portion 51 of right temple 47, although the computer could be disposed elsewhere on the frame 32 as discussed above. Right temple 47 can have a removable cover or section 303 for permitting access to the computer 301 and/or other electronic components of the glasses 291.

The glasses 291 can additionally include any suitable left and/or right optical elements or assemblies 306, which can be similar to any of the optical elements or assemblies discussed herein including optical elements 43, 44 of glasses 31, display assembly 80 of headwear 78, optical assembly 113 of headwear 111, optical assembly 153 of headwear 151, optical assembly 192 of headwear 191, optical assembly 232 of headwear 231 or optical assembly 266 of glasses 261. Although only one optical assembly 306 is shown in FIG. 11, it is appreciated that an optical assembly 306 can be provided for both eyes of the user. The optical assembly 306 can include any suitable light projector 307, which in one embodiment is a high-speed or frequency three-color laser projector based on a scanning mirror (galvanometer). In one embodiment, the light or laser projector is disposed in one of the arms or temples 46, 47 of the glasses 291 and in one embodiment is shown inside a cavity of the right temple 47 accessible by cover 303. The micro computer system or computer 301 connects to the light projector or laser projector 307. The optical assembly 306 can additional include any suitable optical layers discussed herein, and in one embodiment includes a series of optical strips or layers 311. The strips 311 can be spaced apart across the width of the lens 292, as shown in the right lens 292 in right optical element holder 37 in FIG. 11, or can be spaced apart across the depth of the lens, that is between the front surface 293 and the rear surface 294 of the lens 292 as shown in the partial view of another embodiment of the lens 292 in the top corner of FIG. 11.

In one method of operation, computer 301 and its operating system and applications send data to light projector 307. The nature of the projector is that it can send visible photons with software-controlled color and intensity and software-controlled directions. A plurality of light paths 312-314 depicting the paths of respective photons emitted by the projector are illustrated. The arrows in this figure depict how lenses and/or prisms and/or mirrors and/or waveguides and/or other optics can direct the visible photons on paths 312-314 that take the photons from the projector 307 around to the eyewear lens 292, coming in from the side. As the photons then travel across the eyewear lens 292, such travel being depicted as going right to left with respect to the right lens 292 in FIG. 11, the photons encounter a series of optical strips 311. When a particular photon encounters a particular optical strip 311, it either gets redirected toward the user's eye, or it passes to the next optical strip 311. In one embodiment, the determination of whether a photon is redirected or passed is encoded into the photon's wavelength, position, intensity, polarization, phase, and/or timing. In another embodiment, the determination of whether a photon is redirected or passed is controlled by changing physical properties of the strip 311. In a specific example of this, a strip 311 is controlled through mechanical actuation and/or electromagnetic fields and/or acoustics.

In one example implementation of the optical strips 311, each strip can use Polymer Dispersed Liquid Crystal to be opaque or transparent at a given instant of time, per software command. In a different example implementation of the optical strips, each strip 311 can have a specific wavelength of light that it redirects toward the user, passing all the other wavelengths through to the next strip 311. In a different example implementation of the optical strips 311, each strip can have certain regions of the strip that do cause redirection and other regions that don't, and the projector 307 can use high precision steering of the light to target the photons at the redirecting region of the intended strip 311.

In the embodiment of the lens 292 on the top right of FIG. 11, strips 311 extend parallel to the front and rear surface 293, 294 of the lens and are spaced apart across the depth of the lens between surfaces 293, 294. The light from laser projector 307 enters the lens 292 from a face or surface of the lens, and is shown as entering the rear surface 294 of the lens. In a manner similar to that discussed above, when a particular photon encounters a particular optical strip 311, it either is retained at such strip so as to be visible by the user's eye, or it passes to the next optical strip 311.

In the embodiment of the lens 292 on the top left of FIG. 11, strips 311 are disposed in and spaced apart along the width of a first layer 316 of the lens 292, which is secured in a suitable manner to a second layer 317 of the lens 292. In one embodiment, front surface 293 is formed by the second layer 317 and rear surface 294 is formed by the first layer 316. The second layer 317 can be provided with reflective coatings on at least a portion of the surfaces thereof so that the laser lights bounces off such surfaces so as to travel along the layer 317 until the light encounters a strip 311 provided in the first layer 316, and is either redirected towards the eye of the user or continues on to the next strip 311 in the manner discussed above.

Glasses 291 permit the overlaying projected photons onto the real-world scene with high brightness, without blocking the real-world scene from direct view, and without blocking other people from seeing the user's eyes, in a miniaturized form factor worn as a pair of glasses. This system is able to direct light at the user from any point in the eyewear lens, such as lens 292 discussed herein, while occupying only a very small form factor. This system is compatible with the systems and headwear disclosed herein, including the four-dimensional light field display of headwear 111 and 151 described respectively in FIGS. 5 and 6, and with the system for three dimensional plus dioptric gaze tracking described in FIG. 4.

Figure 12:
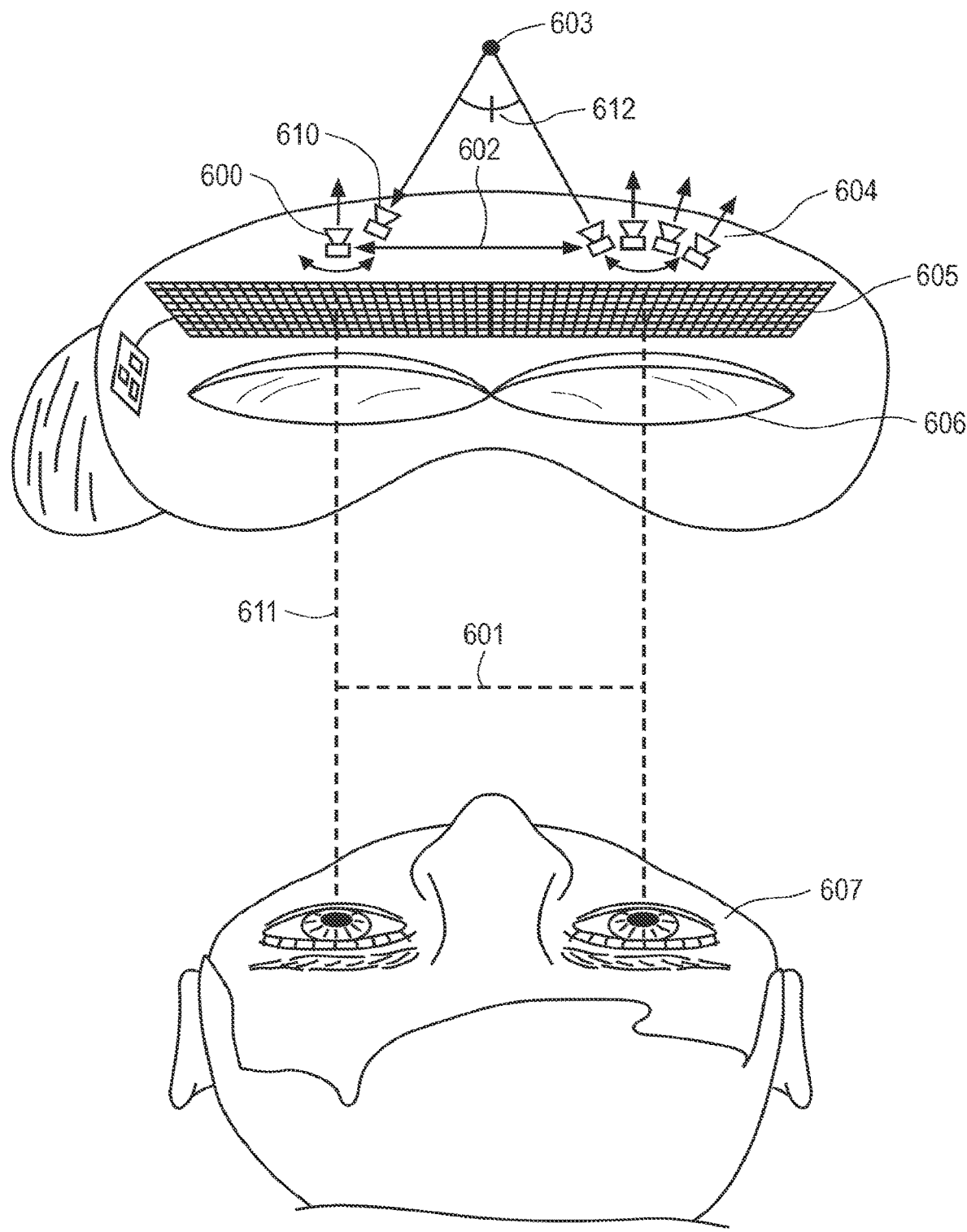
FIG. 12 is a schematic illustration of a further embodiment of a display apparatus for use with the headwear of the present invention.

In FIG. 12, a head worn apparatus is shown containing a plurality of components together creating a computer and computer display system (606, 606), which can be used for streaming the real-world view from digital input sensors such as digital camera (604) or a plurality of other digital sensors (610, 600, 604).

Computer system (605) containing computer software or containing a plurality of computer software for displaying data into the computer display for the purpose of enhancing human vision with digital information, including 3-Dimensional graphics, 2-Dimensional graphics, or multiple layers of 3-Dimensional or multi-dimensional data that can be displayed sequentially or spatially, or both sequentially and spatially.

Near-ocular computer display for the purpose of integrating digital information and data into digital images or meta data that can drawn by the display system (606) and seen with the human eyes.

Computer system and software methods for displaying immersive virtual reality, immersive virtual images or immersive videos.

The human wearing the head-wearable apparatus (607) has their inter-ocular distance (601) measured through a plurality of methods such as software system that analyses data obtained from a sensor system or a plurality of sensor systems. For example a digital image sensor system or a plurality of digital image sensor systems, or a digital video sensor system, or a plurality of digital video sensor systems, or a electromagnetic variation measurement sensor system, or a plurality of multiple electromagnetic variation measurement sensor systems, or a plurality of any other sensor system; which then sends data to the computing system which uses software to compute the inter-ocular distance (601).

The human wearing the head-worn apparatus (607) looks through lenses (606) with their eyes, viewing a digital display system (605, 606) or a plurality of display systems (605, 606), containing a single optical element or a combination of a plurality of optical elements, including prisms, mirrors or waveguides and/or other optics that manipulate photons sent from display matrix prior to the photons being seen by the human eye (611).

A head-worn computer device with a display that shows the human eye or both of a humans eyes a digitally displayed version of the real world after the digital representation of the real world has been collected using a digital sensor system or a plurality of digital sensor systems (600, 604, 610) and then processed by the computer system and drawn to the display so that the human can view it (607, 611, 606, 605); in such a case the human may view a direct representational version of the real-world surrounding them, or the computer may display a modified view of the real-world that is containing additional data and information, or the human may view 3-Dimensional or multi-dimensional data that represents a digitally fabricated virtual environment that may or may not exist in the real world.

When the system is in the mode that shows the real physical reality into the human eyes, reality is captured by a miniaturized computer through the sensors (604). There are one or more sensors in item (604). These digital sensors can have different purposes and different properties. In one embodiment, sensors are pointed in different directions (610), sensing different wavelengths of light (or other non-light properties like sonar-ping distance), and having variable angular field of view.

The system transforms images from multiple cameras (600, 604) to generate images that match the perspective of the human eye including situations when the human eye is rotated without having to translate or rotate the visor or camera assembly.

As the miniaturized computer is reading from the sensors (604), it is able to use software (603) to interpolate and/or extrapolate the data captured by the various sensors (600, 604) in order to vary the interocular distance (602, 601) and/or to vary the convergence angle (612).

Varying the interocular distance (602) and convergence angle (612) using the digital image sensor data with the computer system allows the virtual image displayed to the human eye to match the user's real-life inter-ocular distance (601) and convergence angle (612), in order to produce a display system that simulates the appearance of the real world perspective as seen by a human eye, but is displayed to the human from a near-ocular digital display system. Other goals for the system (612, 603, 602, 601) can include variable control of depth perception, or can include widening independent control of the computer software in such a way as to virtually modify visible inter-ocular distance (602, 612, 603) for a number of virtual 3D display purposes.

Figure 13:
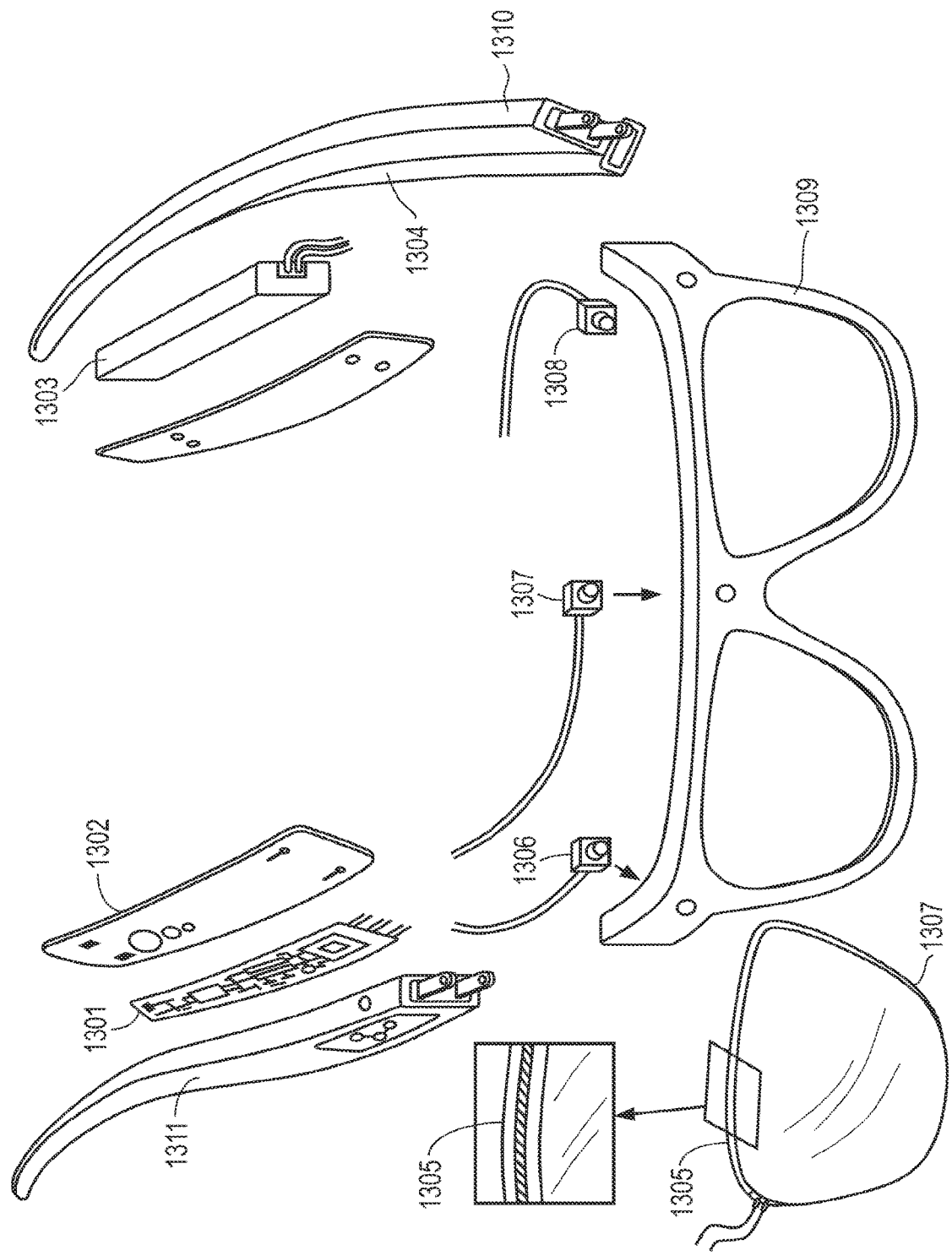
FIG. 13 is a schematic illustration of another embodiment of the headwear of the present invention.

In FIG. 13, a face wearable apparatus is shown comprised of a plurality of components including a miniature computer system (1301), or a plurality of miniature computer systems, or a system on a chip, or a plurality of system-on-chips.

Head-worn wearable computing apparatus containing a computer running software and enabling self-contained software execution capabilities, or networked software execution capabilities that is optionally comprised of a central processing unit, co-processor or co-processors, memory, storage space, computer networking components, and various peripherals, including various sensor systems including multiple biometric sensors (1302) as inputs into the computer system, and a computer operating system used to compute data and run applications on the computer.

A head-worn computer apparatus containing plurality of sensor systems including digital image sensor systems or digital video sensor systems (1306, 1307, 1308), biometric sensor systems (1302) with a plurality of additional digital sensor systems (1302) are used to send data to the computer (1301) which further computes data that can be utilized by the computer software system to control digital, or electrical, or magnetic, or auditory, or software events or any combination of one or a plurality of such events within the apparatus.

A head-worn computer apparatus with a computer and operating system running software that allows the data from a plurality of digital sensor systems to be transmitted across a computer network.

A head-worn computer is connected to a layered optical system (1305, 1307) layered with digital display or layered optical material elements or any combination of digital display and layered optical material elements (1305) that are able to receive and draw data sent from the computer (1301). In one embodiment of the system the computer sends data in the form of either digital signals or in the form of electrical signals or a plurality of signals, and the optical system is comprised of layered substrates (1307) and glass layered with chromatic shifting display material elements (1305) and optionally photon emitting elements, and optionally reflective, refractive or diffractive elements (or any combination of reflective, refractive or diffractive elements), or any plurality of the aforementioned; having capabilities such that the computer system is able to control directly the layered materials, such that the display configuration of the layers inside of the glass will change based on the data sent to the material elements (1305) from the computer (1301). The computer interprets and understands the requests and context of data and uses messages, algorithms or logic (or any combination of messages, algorithms and logic) to send data using signals to control properties of the layered glass (1305). The material within the glass (1305) acts as a receiver of the system, receiving direct commands from the computer (1301) and the glass (1305) changes its state according to the configuration of the data sent to it from the computer (1301).

A head-worn computer apparatus comprised of a plurality of components creates a system comprised of one or more outward digital sensor systems, in one embodiment the sensor system (1306) or plurality of sensor systems (1306, 1307) are digital cameras capable of capturing digital images and digital video (1306, 1307, 1308) for the purpose of sending this data for processing and utilization within the computer system (1301). One such use of this data is to create a digital representation of the environment that the wearer is experiencing while wearing the glasses, and further transmitting this digital representation of the wearer's experience to other people across a computer network, such that they are also able to view, edit or experience (or any combination of viewing, editing or experiencing) the perspective or point of view of the person wearing the head-worn apparatus.

The headwear computer apparatus is comprised of an exterior enclosure (1309) or a plurality of exterior enclosures (1309, 1310, 1311) that together contain the components and elements of a face-wearable computer apparatus such that this apparatus can be worn by a wearer as glasses or as eyewear.

The headwear computer apparatus is supplied with power from a power source (1303). In one embodiment this is a battery (1301), such as a battery comprised of lithium ion, or another embodiment, a battery comprised of graphene, or in another embodiment, this is a self contained battery containing a wireless charging system, or in another embodiment this is a third-party portable power source that can be utilized to power the computer.

The headwear computer apparatus is supplied with power from a power source that with power replacement or power replenishment capabilities; in one embodiment such power replenishment may be achieved by recharging the power source via either wired or wireless charging systems (1304) such that an external power source can supply power to charge the onboard power source. In another embodiment the power source can be physically removed and easily replaced or upgraded with a new power source for continuous power to be supplied to the computing system within the apparatus. In another embodiment the power may be recharged by either a self-contained, or an externally contained solar panel charging system.

Figure 14:
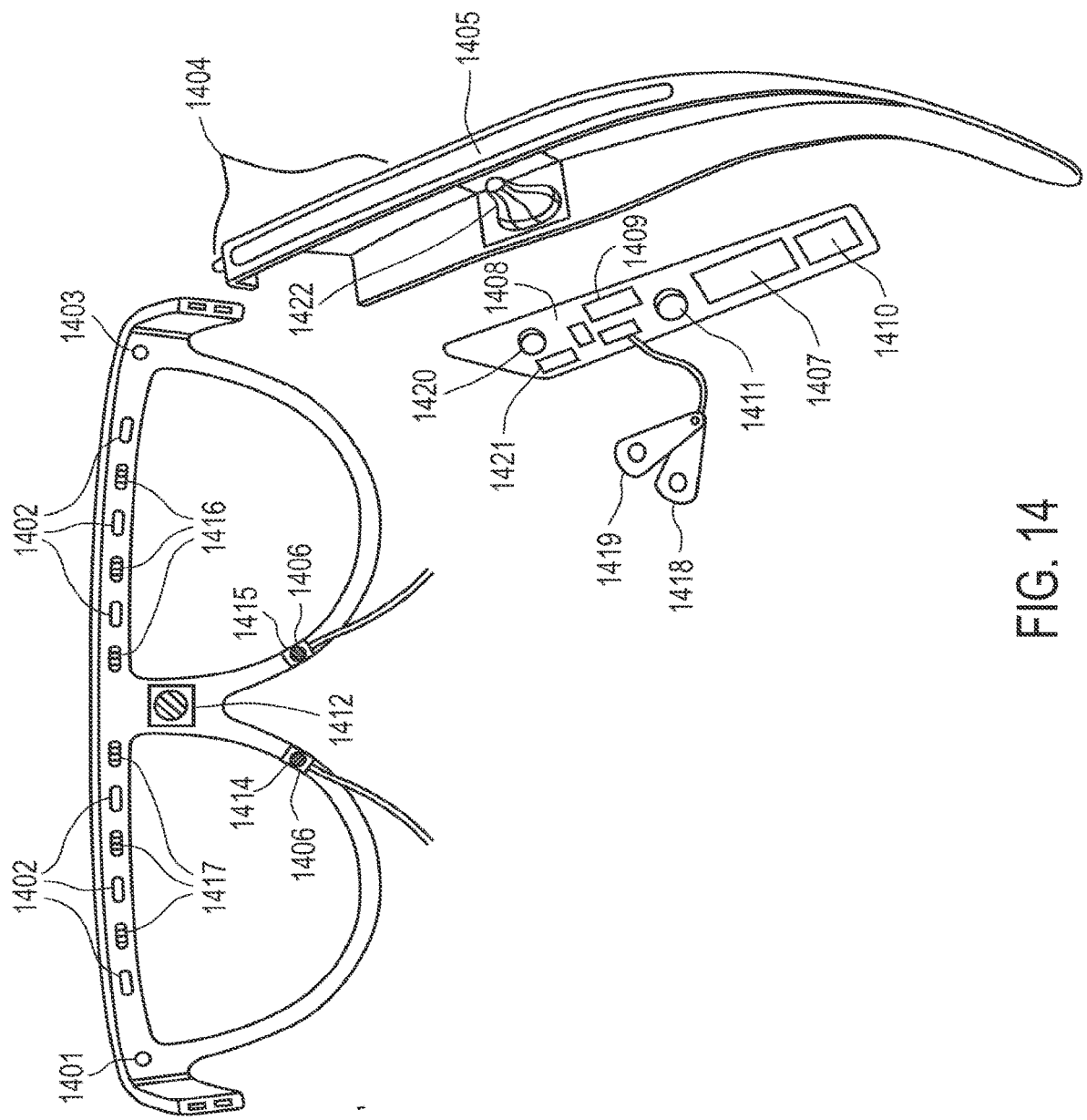
FIG. 14 is a schematic illustration of another embodiment of the headwear of the present invention.

In FIG. 14, a real-time sensing of various physical properties of the user and the world is disclosed.

The device can use one or more cameras (1414) (1415). (1406), facing outwards (toward the world) and/or inwards (toward the user) for detecting images, video, geometry, photonic spectra, and more.

The device can use one or more accelerometers (1408) to sense accelerations along the x, y, and z axis. The device can use one or more gyroscopes (1409) to sense angular accelerations and/or rotations along all three pitch, roll, and yaw axes. The device can also use one or more 3-axis magnetometers.

The device can use one or more location sensors (1410) including but not limited to satellite-based approaches (such as GPS, GLONASS, and more), tower/base-station based approaches such as triangulating based on cell phone towers, atmospheric sensors such as altimeters, optical landmark detection (e.g. using a image sensor to identify a known landmark like the Eiffel Tower), and more.

The device can use one or more range/distance sensors (1412), facing outward (towards the world) and/or inward (toward the user's face). These sensors can feed into algorithms for scanning 3D geometry. A range sensor facing toward the user's face can also determine whether the glasses are currently being worn. (1420)

The device can use one or more temperature sensors (1411), which can be based either on physical contact or on infrared light or other means, to sense the temperature of the user and/or the environment and/or components of the glasses and/or physical objects out in the world.

The device can use one or more pulse oximeter sensors (1419) (1418) to determine the user's heart rate and/or blood oxygen content. The device can also use one or more blood pressure sensors (1418) and other biometric sensors.

The device can use an NFC transceiver (1421) to communicate with other computing devices and/or passive or active tags.

The device can use one or more ambient light sensors (1404) for various purposes including camera autoexposure, determining indoor/outdoor and day/night context for use by software applications, controlling the darkness of "digital transitions" electrochromic sunglasses, sensing spectral colors of the ambient light, and other properties of light.

The device can use one or more microphones (1401) (1403) for various purposes including audio recording, software voice commands, beamforming to detect audio source location, and other acoustic sensing.

The device can use various electrodes (1402) in contact with the user's skin for various biometric purposes including electro-encephalo-graphy (EEG), electro-oculography (EOG), electro-myo-graphy (EMO), galvanic skin response (GSR), and other biometrics.

Various surfaces of the device can sense tactile input (1405) through means including capacitance, piezo effects, or other means.

Figure 15:
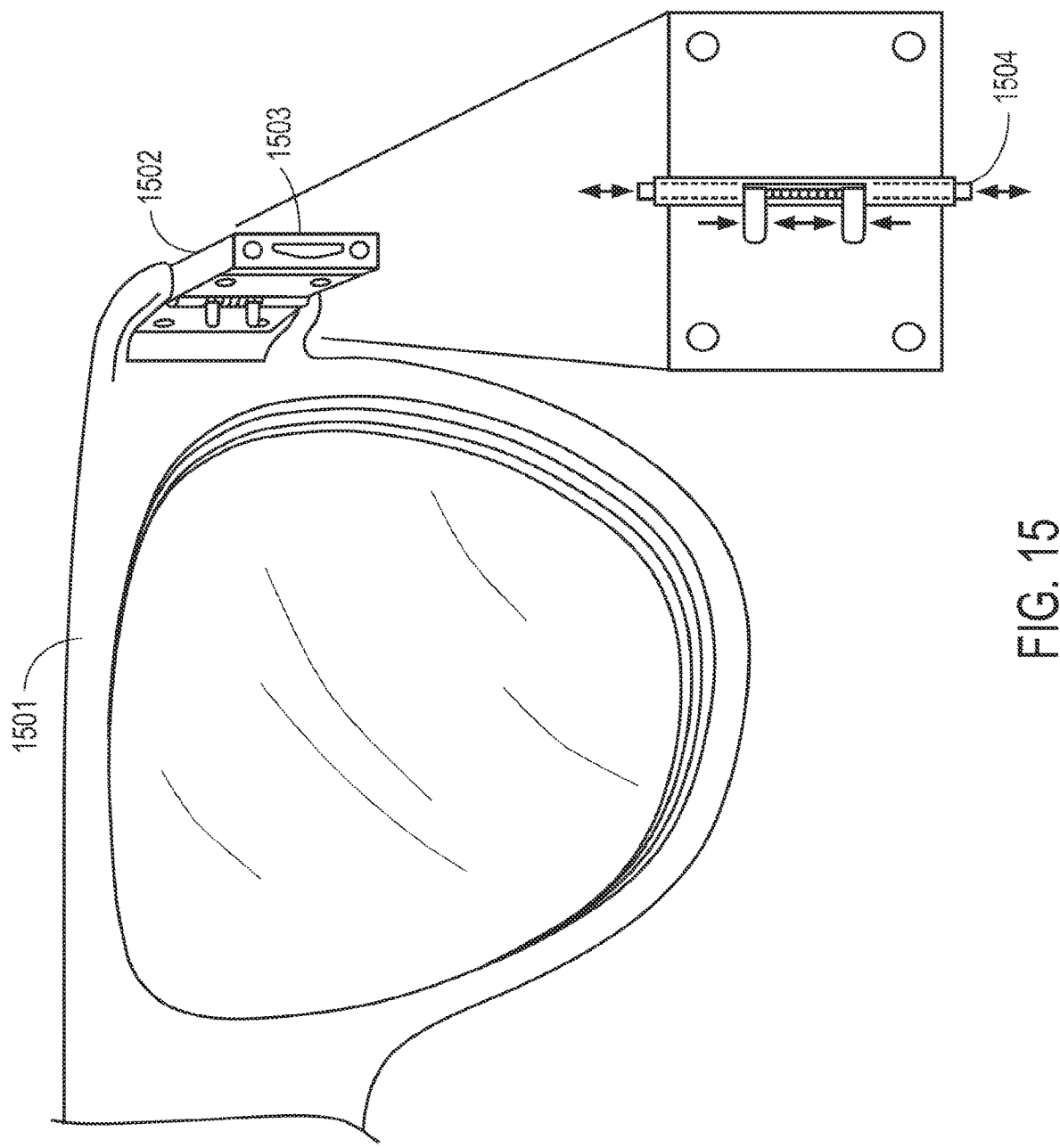
FIG. 15 is a schematic illustration of a further embodiment of the headwear of the present invention.

In FIG. 15, structure of glasses frame for enabling multiple optical layers, high-bandwidth transmission of electrical signals through hinge, and mechanically assisted attachment and detachment of glasses arms is disclosed.

The mechanical structure of the glasses has grooves for lens placement, with multiple grooves sized with (same or different) dimensions (1501) to support multiple optical components of those dimensions. Additionally the mechanical structure has a hinge system (1502) that enables rapid connection and disconnection of the glasses front piece and one or more glasses arm pieces. In one specific example of the hinge system, a spring pushes pins such that the glasses arm is rigidly connected to the glasses front, with the spring being retractable via squeezing of additional pins (1504) to disengage the attachment. In another example, the hinge has one or more data ports that enable a glasses arm piece to rigidly connect the glasses. The glasses front-hinge-arm interconnect system additionally has connections that permit bidirectional transmission of data between the glasses front piece and the glasses arm (1503). In one example, the arm connects to the front piece and electrical contact is made between components in the arm and components in the front piece.

In another embodiment, one or more cameras and/or light emitters can be part of the arm, near the hinge.

Figure 16:
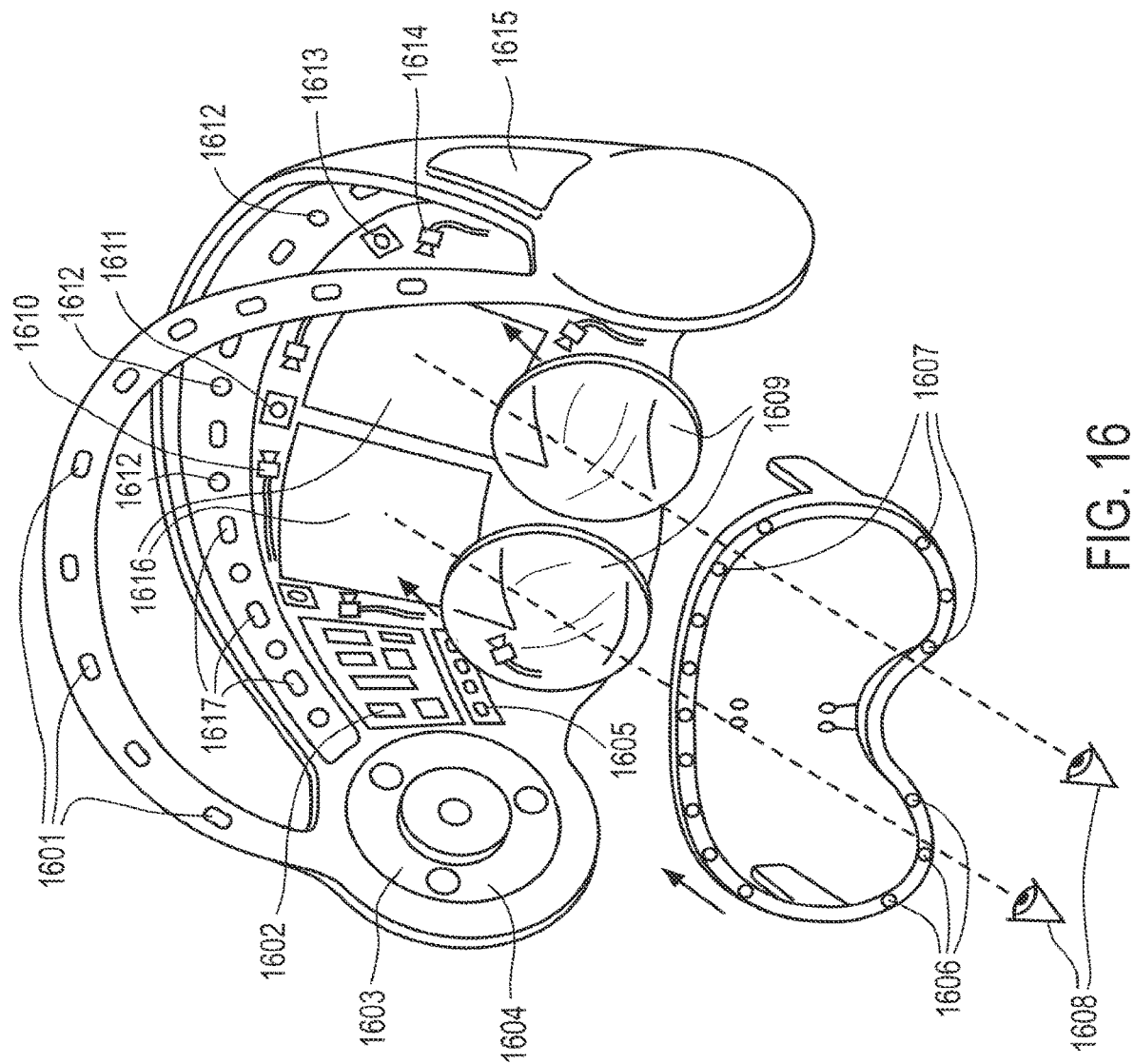
FIG. 16 is a schematic illustration of another embodiment of the headwear of the present invention.

In FIG. 16, a face-wearable device is illustrated that can immerse the user in a virtual environment and/or augment their perception of the real world and/or enhance the user's biological and mental capabilities and/or sense the user's biological/mental state.

The device uses a miniaturized computer system (1602) to run an operating system and applications, and can communicate with a network for a variety of purposes (including applications utilizing the network) (including in and out going data streaming) (including remotely triggered commands in both directions) (including tapping into third-party application programming interfaces) (and other uses). The computer also drives all of the sensors and outputs of the device.

The device can use one or more cameras (1610) (1614) and/or other kinds of geometry and/or image and/or spectral sensors, for sensing the geometry, spectra, and physical properties of both the world and the user.

The device can use various sensors of thought, mood intent, etc (1601) (1612) which sense the user's mental state and/or intent. Said sensors can include electro-encephalography (EEG) and/or magnetic resonance imaging (MRI) and/or optical scanners, and/or other brain scanning techniques.

The device can also directly influence the user's mental state, using electrodes and/or actuators (1617) providing direct current, alternating current, or other forms of direct mental stimulation. One such technology can be transcranial direct current stimulation (tDCS).

The device can provide visual output to the user using displays (1616) whose light travels through optics (1609) on its way to the user's eyes (1608). As described in other figures of this patent, one purpose of said optics can be to enhance the display to seem 3D and immersive, looking to the user just like real life.

The device can provide audio output to the user using a speaker system (1603), which can include noise cancellation (1604) implemented through mechanical dampening, software or electrical feedback and/or feedforward controls, or other means. Content and properties of the audio output are determined by software and/or circuitry. For example, audio can be "spatially rendered" to make the user perceive various virtual audio sources as located in various x,y,z locations in world space—this is using a software algorithm that controls both the audio output as well as head-tracking inputs and a head-related transfer function (HRTF) to simulate acoustics.

The device can be powered by energy storage media (1615) such as batteries, capacitors, fuel cells, and/or reactors. Alternatively, the device can be powered by a power input, including wireless power transmission over electromagnetic fields and/or photons.

The device can also use eye tracking sensors (1606) (1607) to track the user's eyes (1608). Said eye tracking sensors may include electro-oculo-graphy (EOG), and/or various light-based sensors such as cameras and/or active sensors which may emit light, and/or sonic scanning, and more.

Various biometric sensors (1605) can sense a wide variety of elements of the user's state of mind and body, including but not limited to: heart rate, blood oxygen content, happiness, alertness, body temperature, body voltage/resistance/capacitance/inductance, skin color and other optical properties, body geometry (including real-time geometry such as facial expressions), breathing rate, arousal, like/dislike, and concentration.

The device can use various distance and/or geometry sensors (1611) (1613) to sense whether the user is wearing the device, the facial structure of the user, the user's identity (based on facial structure), their facial expressions, and more.

Figure 17:
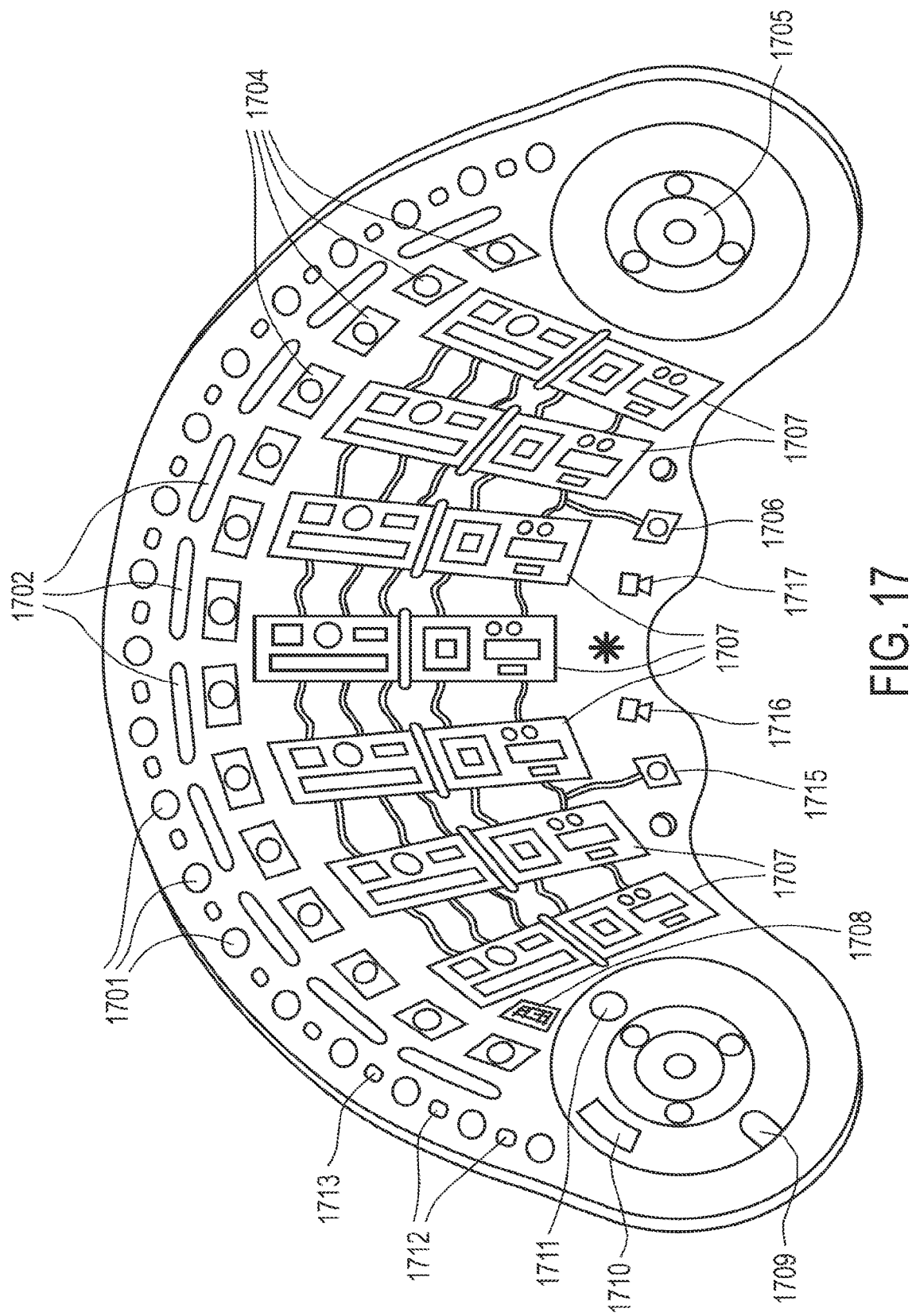
FIG. 17 is a schematic illustration of an embodiment of a head mounted sensor apparatus for use with the headwear of the present invention.

In FIG. 17, a system for transmission and reception of sensory experience through measurement of biological and environmental properties is shown.

A physical device is equipped with sensors for reception of biological properties and transmission of sensory experience. In one example, the device has sensors for determining human brain electrical properties for the purpose of determining thought patterns (1701). The device additionally has sensors for determining properties of human biological functioning. In one example the device has a sensor for determining functional properties for the human heart and circulatory system (1709). In another example the device has a sensor measuring physiological arousal through the skin (1710). The device additionally has sensors for capturing properties of both the state of a human as well as the state of the environment. In one example the device has a temperature sensor (1711). In another example the device has an image sensor (1715) (1706). In a specific example of that, the image sensor is used to capture images of a face. In another specific example, the image sensor is used to capture images of the environment. In another example the device has an audio recording sensor (1716) (1717). In another example the device has a transceiver for wireless electronic communication (1708). In another example the device has a sensor for determination of structural properties (1704). In a specific example of that, the structural property sensor determines distances from the sensor to points on a human face. In another specific example, the sensor determines distances from the sensor to points in the environment.

The device is additionally equipped with components that enable transmission of sensory experience to a human. In one example, the device has an audio transmission component (1705). In another example, the device has a component of the electromagnetic field and electrical properties of a human brain (1702). In another example, the device has a component or components for transmission of light (1609) (1712) (1713). In a specific example of that, the light is transmitted to a human visual system (1608). In another specific example, the light is transmitted to the environment to aid in other sensory perception of the environment (1712) (1713). In a specific example of that, a known patient of light is transmitted onto the environment for the purpose of determining geometrical or physical properties of the environment.

The device additionally has a miniature multicore multiprocessing computer system or collection of parallel computing systems consisting of various specialized coprocessors and/or reprogrammable circuits (1707) connected to the sensors and transmission components. The computer system or systems receives the sensed data. The systems additionally send signals to the transmission components which instruct the transmission components to transmit.

Figure 18:
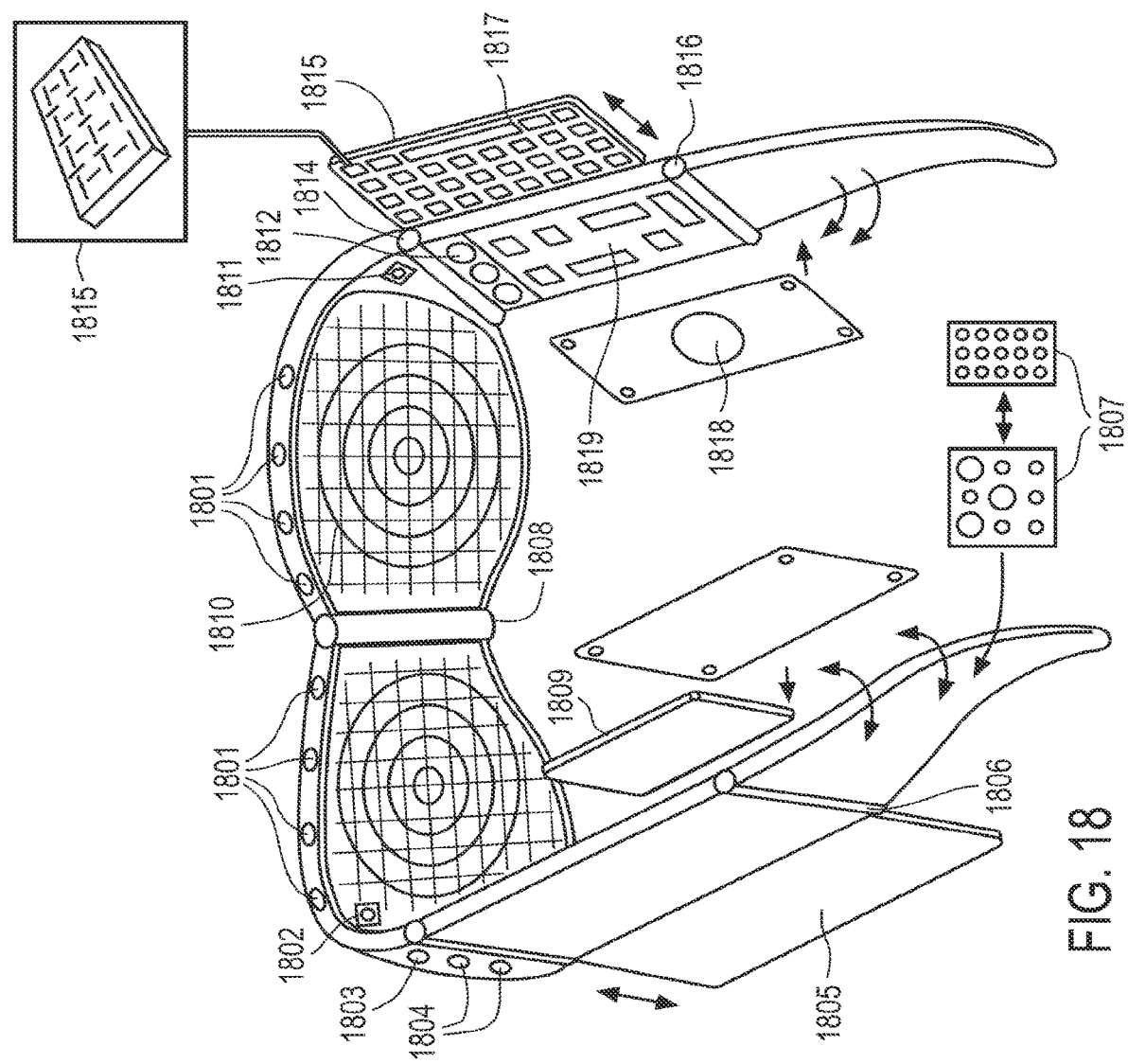
FIG. 18 is a schematic illustration of another embodiment of the headwear of the present invention.

In FIG. 18, folding glasses that convert to smart device/mobile phone are shown.

The device can utilize hinges (1808) (1806) (1816) which allow it to fold.

Some or all of the device can be coated/surfaced with color-changing paint (1807) which changes color under software command.

The device can be powered by energy storage media (1809) such as batteries, capacitors and/or fuel cells, or more.

The device can detect audio using one or more microphones (1804) or other audio sensors. It is able to use computer software to intelligently incorporate the inputs from these various sensors to perceive a variety of information about the sound sources including direction, intent, and other properties.

The device can use one or more cameras (1802) (1811) which may face toward the world and/or toward the user. The device can use software to intelligently extrapolate as much information as possible, including 3D geometry of the world and/or user, user intent and mood, and much more.

Various surfaces of the device can be display surfaces that are also able to sense touch input (1805) (1817). Some or all of these surfaces and/or other surfaces of the device are able to provide haptic feedback to the user (1815) through various means including providing voltage on a grid that the user can feel. Such grid (1815) can be used to render virtual textures and/or to provide feedback as the user is performing touch input.

Certain panels (1818) or other sections of the device may be detachable/reattachable, to expose surfaces inside and/or change the shape of the device.

When in glasses mode, the device can immerse the user in a display+optics subassembly (1810) that can render 3D and 2D scenes and graphics.

The device can sense a variety of properties of the user and the scene using a variety of sensors (1801).

The device can utilize mechanisms (1803) (1814) that can hinge and/or detach/reattach and/or slide as on a rail. These mechanisms allow the user to rearrange the device into various mechanical configurations, and/or the mechanisms could also be actuated, allowing the device to rearrange itself into various structural configurations based on software.

Figure 19:
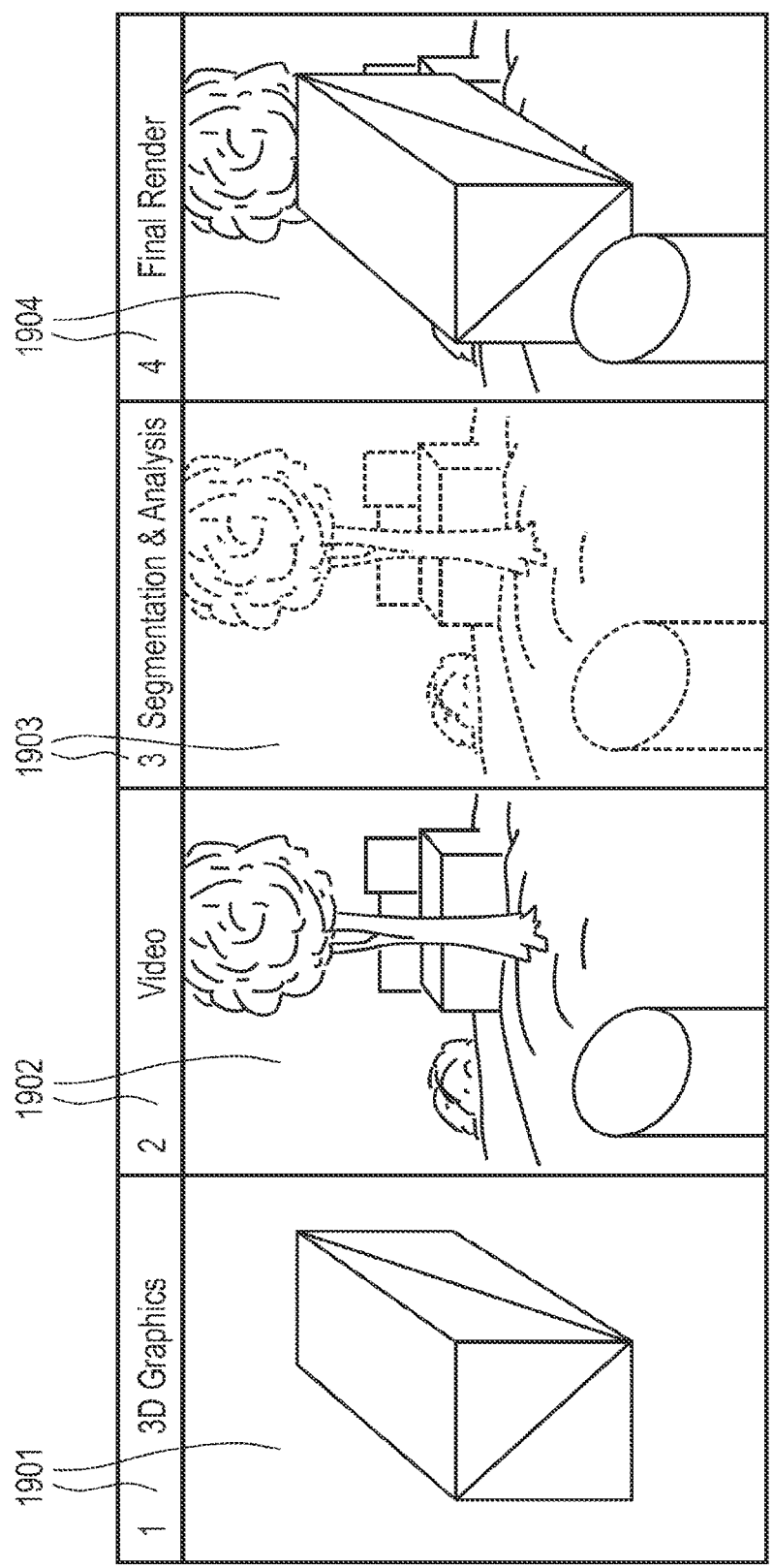
FIG. 19 is a portion of one embodiment of a user interface for use with the headwear of the present invention.
Figure 20:
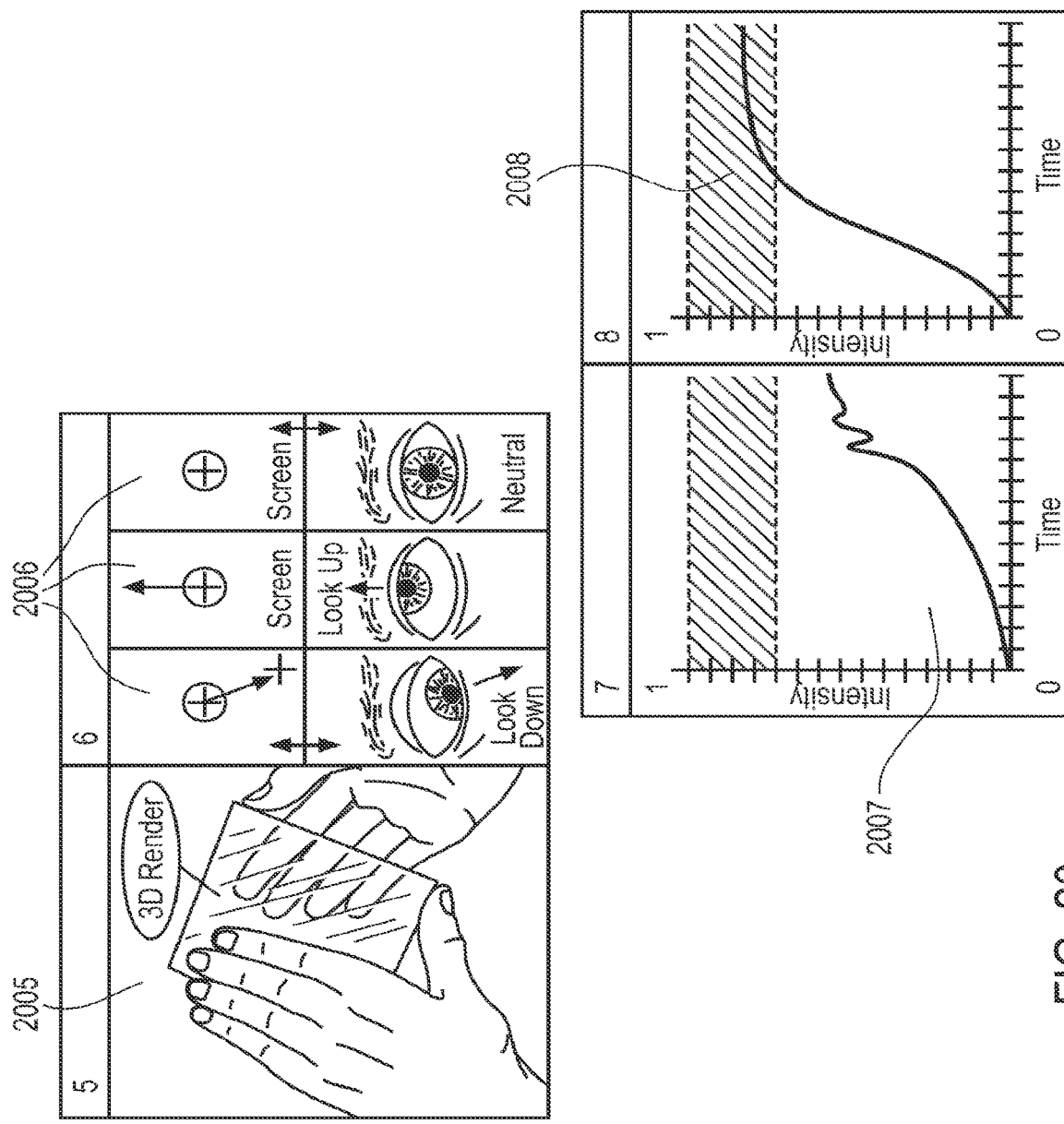
FIG. 20 is another portion of the user interface of FIG. 19.

In FIGS. 19-20, interface for interactive presentation of data with control via sensed biometric data.

An interface is displayed to a human where data (1901) is displayed and seamlessly integrated into the human eye's perception of the world. An image sensor senses the world from the perspective of a human eye (1902). The sensed data is processed and metadata is extracted (1903) such that additional data can be added to the sensed data in a way that looks accurate to the human visual system. The data is combined with the extracted metadata to create an image stream (1904); that stream is then displayed to the human eye.

One embodiment contains a computation interface with graphical feedback capabilities which includes computer software controllable through biometric feedback (2005, 2006, 2007, 2008).

In one embodiment, the image sensor observes motion of the viewer's hands (2005) and adjusts the process in (1904) to respond to the hand motion, allowing a rendered object to appear as though the human hand was causing it to move. In another example, the position of the human eye is tracked (2006) and used to alter the displayed data (1901), such as causing a rendered object to move up when the human eye moves up.

In another embodiment, electric voltages or currents in the human brain are sensed in such a way that thinking a specific thought triggers changes in the rendered data. When a wearer thinks most thoughts, the brain sensor does not detect the activation thought and the change does not happen (2007). When a wearer thinks a specific thought, the sensor detects the thought and the change happens (2008). Additionally, the sensor may be configured to require a specific thought for a particular duration (2007, 2008).

Figure 21:
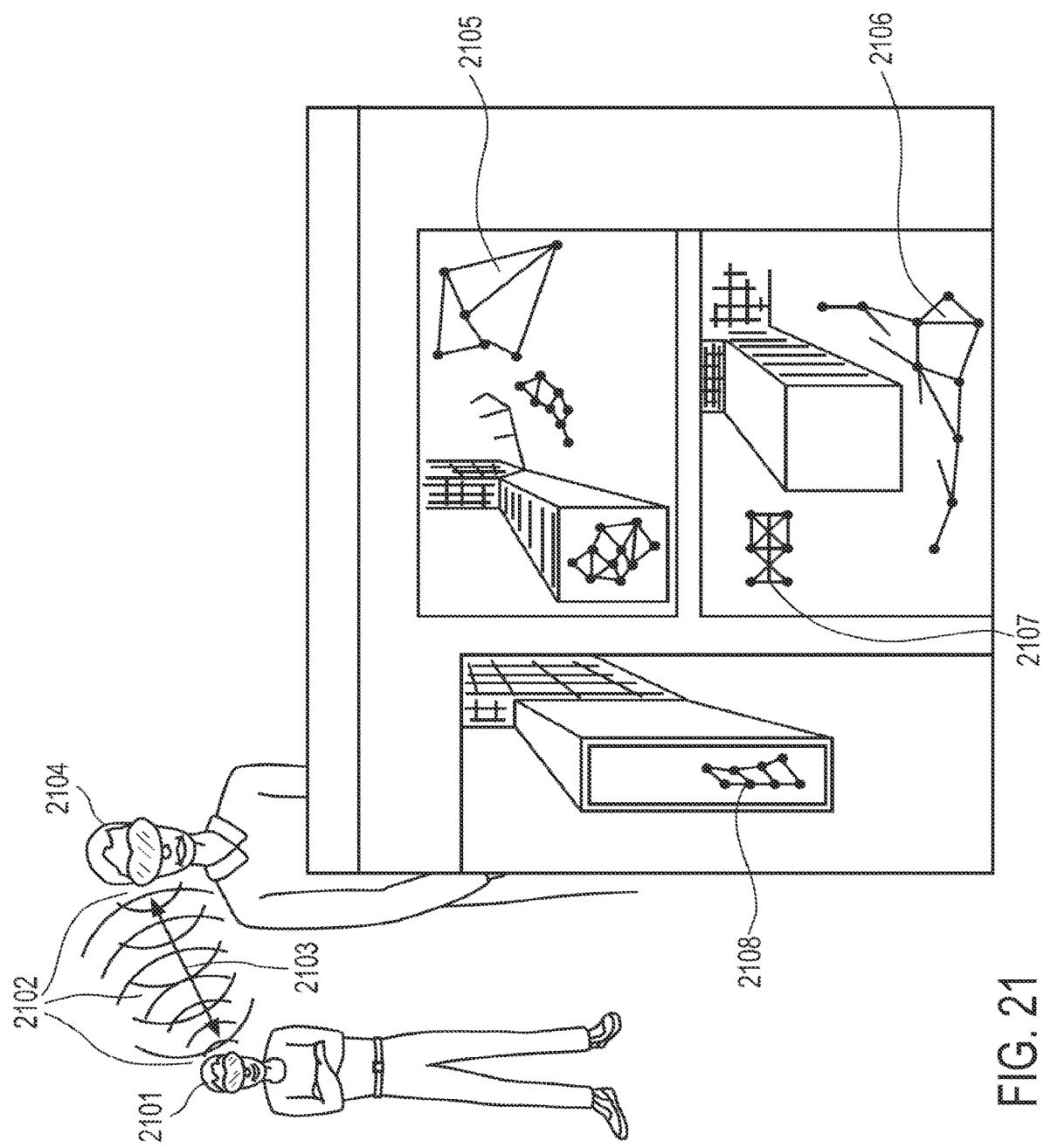
FIG. 21 is a schematic illustration of a multi-user system utilizing a plurality of the headwear of the present invention.

In FIG. 21, a system for sharing computer resources with head-wearable computers using dynamically created computer networks is shown.

A head-worn or otherwise wearable computer (2101) communicates over a network and dynamically determines the networking context. In one embodiment this includes networking within a peer to peer proximity-based wireless mesh network (2102) with one or more other mobile or head-worn computers (2104). When a mobile computer receives a signal to execute a procedure, it sends a signal to other mobile computers over the mentioned peer to peer to wireless network protocol. A procedure is executed to determine whether part of the original procedure can be transmitted to a separate mobile computer for execution on that mobile computer (2103).

In one embodiment, a head-worn computer with an image sensor executes a procedure to extract data or metadata from the image sensor's data stream. It signals this to other mobile computers and determines that another mobile computer will execute part of the procedure (2102, 2103). The two mobile computers simultaneously execute separate parts of the procedure. The result of the procedure is made available to both mobile computers (2103).

When a head-wearable computer receives a signal from a previously unseen mobile computer, it signals other mobile computers it is connected with and joins the local network comprised of a plurality of other head-wearable computers or other mobile wearable computers, or any other computer transmitting a compatible network protocol, or any plurality of the aforementioned networking scenarios. The head-worn computers store a representation of the other computers that are reachable.

In one embodiment, a collection of a plurality of head-worn computers (2105, 2108, 2107, 2106) are connected to each other and each stores the path to the other computers. When one computer moves out of range of the links that connect it to others, nearby computers announce the loss of the out of range computer.

Figure 22:
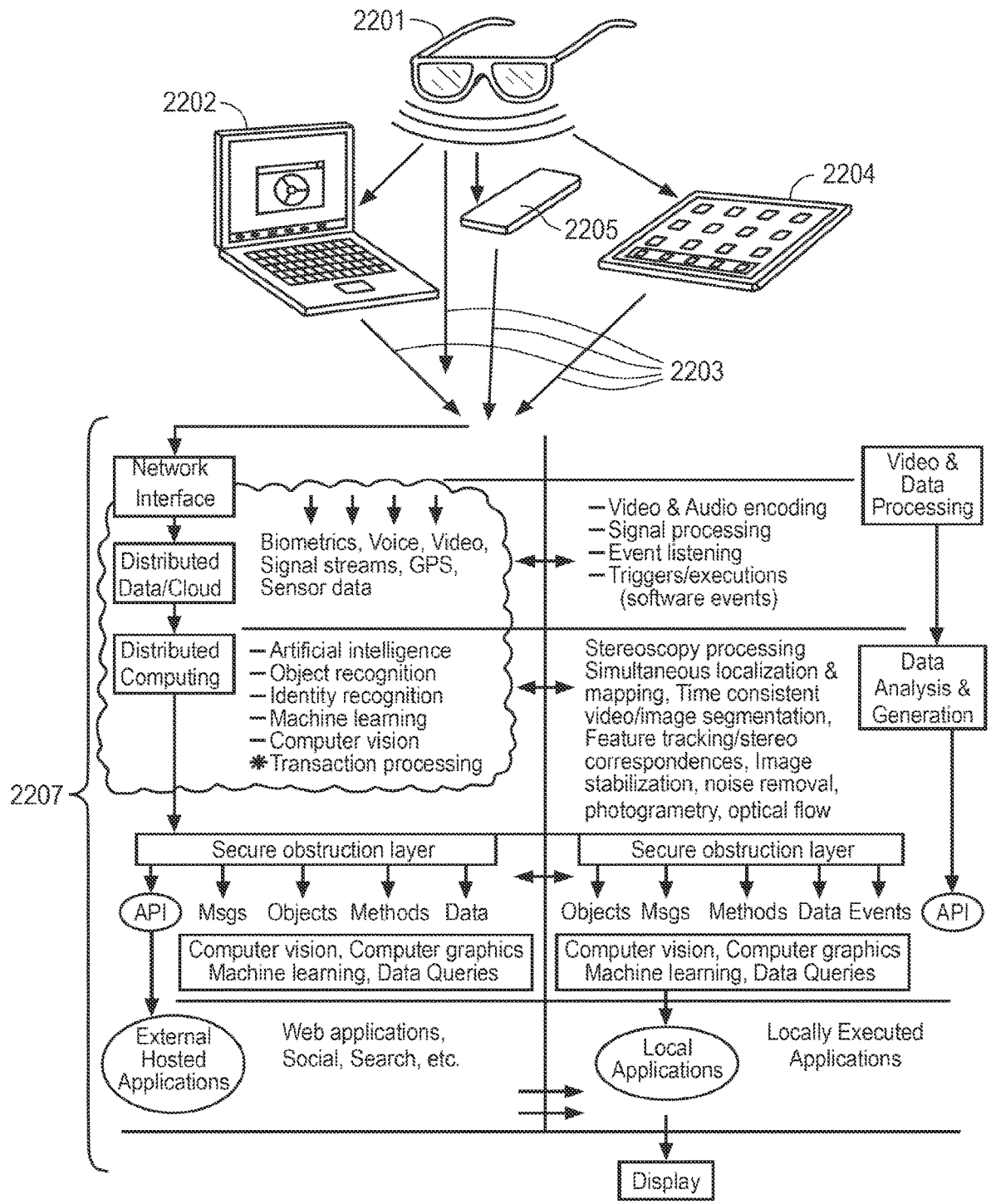
FIG. 22 is an embodiment of a system utilizing the headwear of the present invention.

In FIG. 22 a ality as a platform is shown, and can include a method for secure recording, transmission, local and remote processing, and display of sensed data from glasses.

A head-worn sensing platform such as glasses (2201) senses data from environmental sensors. The sensed data is transmitted through various mobile communication platforms (2202, 2203, 2204). The data is transmitted to networked computers for processing. The networked computers apply procedures to the received data to extract metadata. The networked computers additionally receive signals from other networked computers requesting access to the extracted metadata. If the requesting computers have permission to access the extracted metadata, the metadata is made accessible to the requesting computers via a software interface (2207). Additionally, the extracted metadata can be transmitted back to the mobile sensing head-worn computer (2203).

The sensing platform also executes procedures on the sensed data using a head-worn computer (2201). Those procedures extract metadata from the sensed data and execute further procedures based on the extracted data. In one example, the head worn computer (2201) transmits data to the mobile computer (2205) that receives heart rate data from a heart rate sensor (2201), and a procedure determines that the heart rate has spiked. This triggers a procedure which turns on an audio sensor and an image sensor. This metadata is additionally transmitted through the previously mentioned mobile communication platforms (2207) to networked computers for additional processing.

The metadata is further processed on the device and are data is generated from the processing. In one example, image sensor data is analyzed to extract information about edges and corners in the sensed data. Additional procedures on the mobile sensing platform request access to the sensed data and the additional metadata. If the procedures are authorized to access the data, the data and metadata are transmitted locally to the additional procedures (2207). The additional procedures perform further processing on the data, and also access networked computers through the mobile sensing platform's network connection. In one example, an application requests a database of images from a networked computer and stores the database on the mobile sensing platform. It then requests access to and applies a procedure to the sensed data and metadata in order to match the sensed data with the saved database of images. The procedures optionally call stored procedures to output data to a display (and/or other outputs) integrated into the mobile sensing platform.

Figure 23:
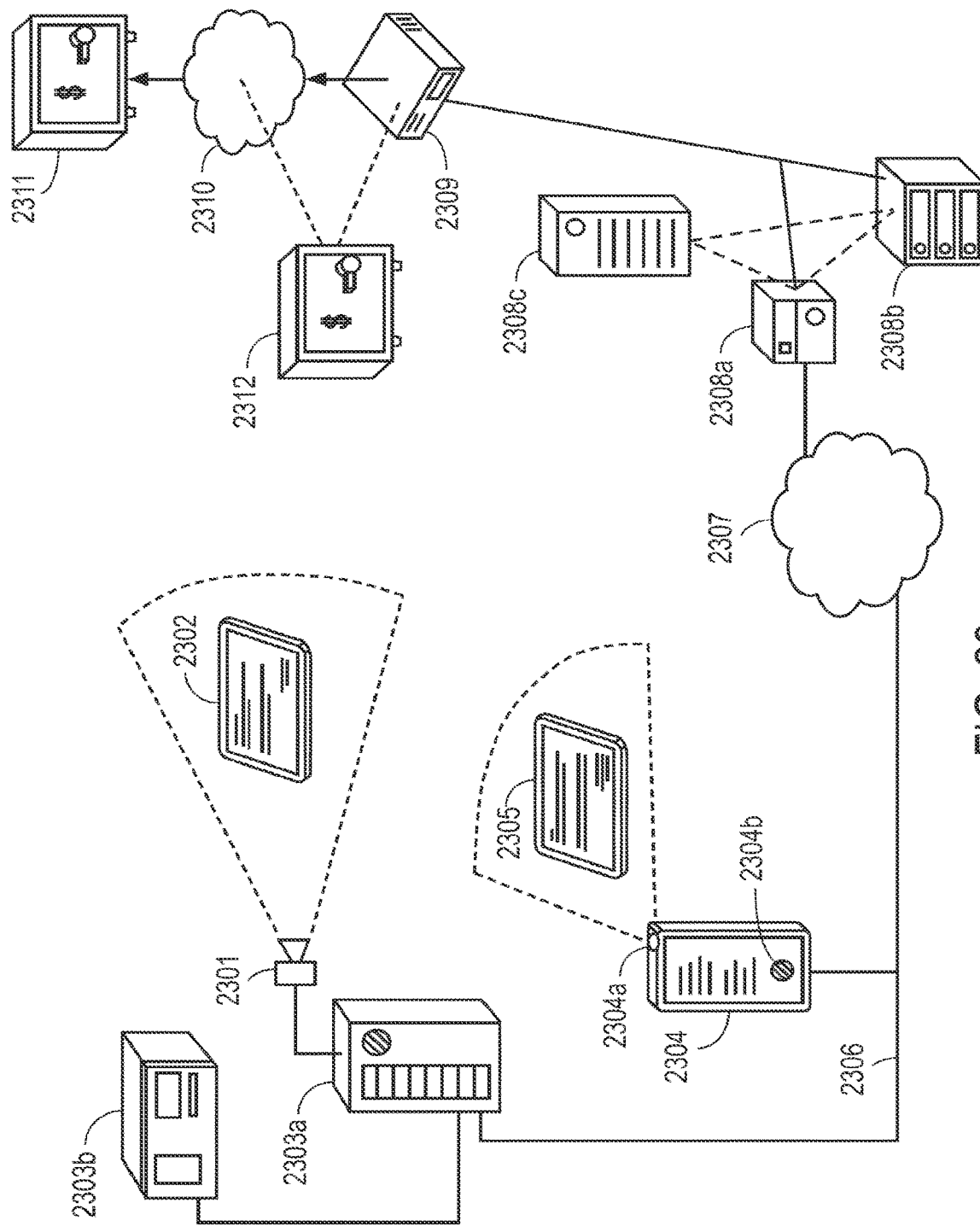
FIG. 23 is an embodiment of a transaction processing system utilizing the headwear of the present invention.

In FIG. 23, methods for transmission and processing of payment information from a networked digital image sensor are shown, one embodiment contained within a headworn computer system and combined with a digital camera, transmitted across a computer network for the purpose of creating an end-to-end digital transaction processing system, one embodiment of which can be used for virtual currency transactions, real currency transactions or other variable forms of monetary payments, monetary conversions or currency exchange systems.

A form of payment (2302) is placed in the field of view of a digital sensor, for example, a digital camera (2301) such that the camera can observe the form of payment. A networked computer system (2303*a* and 2303*b*) receives a series of images that represent the form of payment, as taken by the camera. In one embodiment, the camera and head-worn computer could be directly connected, such as an embedded camera (2304*a*) inside of eyewear containing a computer (2304) or in another embodiment the system could transmit data in combination with a head-mounted computer and a secondary computer contained inside of another enclosure such as a mobile computer, a desktop computer or a laptop computer (2303*a*).

The images are transmitted over a network (2306) to a collection of networked computers for processing. In one embodiment, the images are sent into a networked cloud computer server or servers (2307) for processing. Software executing from the cloud computing server or servers performs analysis on the data sent, and associates account information, payment information and other required data or metadata to secure any form of monetary transaction between one party, two parties, or a plurality of parties. In one embodiment, the payment information can be analyzed from a digital image using a combination of computer vision algorithms or optionally optical character recognition algorithms. The payment information between parties can be extracted and stored as a digital representation of the form of payment to proceed with the transaction. In one example of an embodiment, a credit card, this could consist of the card number, name, expiration date and security code.

The account transaction information is then dispatched via a dispatching server (2308*a*). The dispatching server negotiates and authenticates a secure connection with a transaction server (2308*c*) and further optionally sends data and details regarding the transaction to a secure computer database server plurality of secure computer database servers (2308*b*).

The computer processing the secure transactions (2308*c*) executes a procedure to dynamically determine and negotiate with another secure server (2309) based on payment type for the purpose of withdrawing, depositing, and transacting the monetary exchange.

The digital payment processing data that was derived from images captured from or in conjunction with head-worn computer apparatus, using cloud based computer vision, is transmitted to a networked computer (2309) that is authorized to process a payment with the form of payment from the particular banking or monetary exchange entity or entities (2312, 2311) required to complete the monetary transaction. In one embodiment, this could be a third-party payment processor that is authorized to process credit card transactions (2310). In another embodiment, this could be a banking institution such as a FDIC bank. In another embodiment this could be a pre-paid credit authorization and payment system. In another embodiment, this could be a virtual currency transaction system (2310). In another embodiment this could be any third-party transaction system (2310). In another embodiment this could be the Federal Reserve Bank (2311).

In one embodiment, the head-worn computer is networked with other computers and bundles the form of payment and an associated amount to charge together, and then delivers the charge and form of payment over the computer network (2310) to a financial institution (2311, 2312) or a plurality of financial institutions. In one embodiment a computer from a face-worn head-wearable computer delivers a request across a computer network that is analyzed and dispatched to another computer located at different financial institutions (2311) and delivers the charge and form of payment directly between the financial institutions (2311, 2312).

Figure 24:
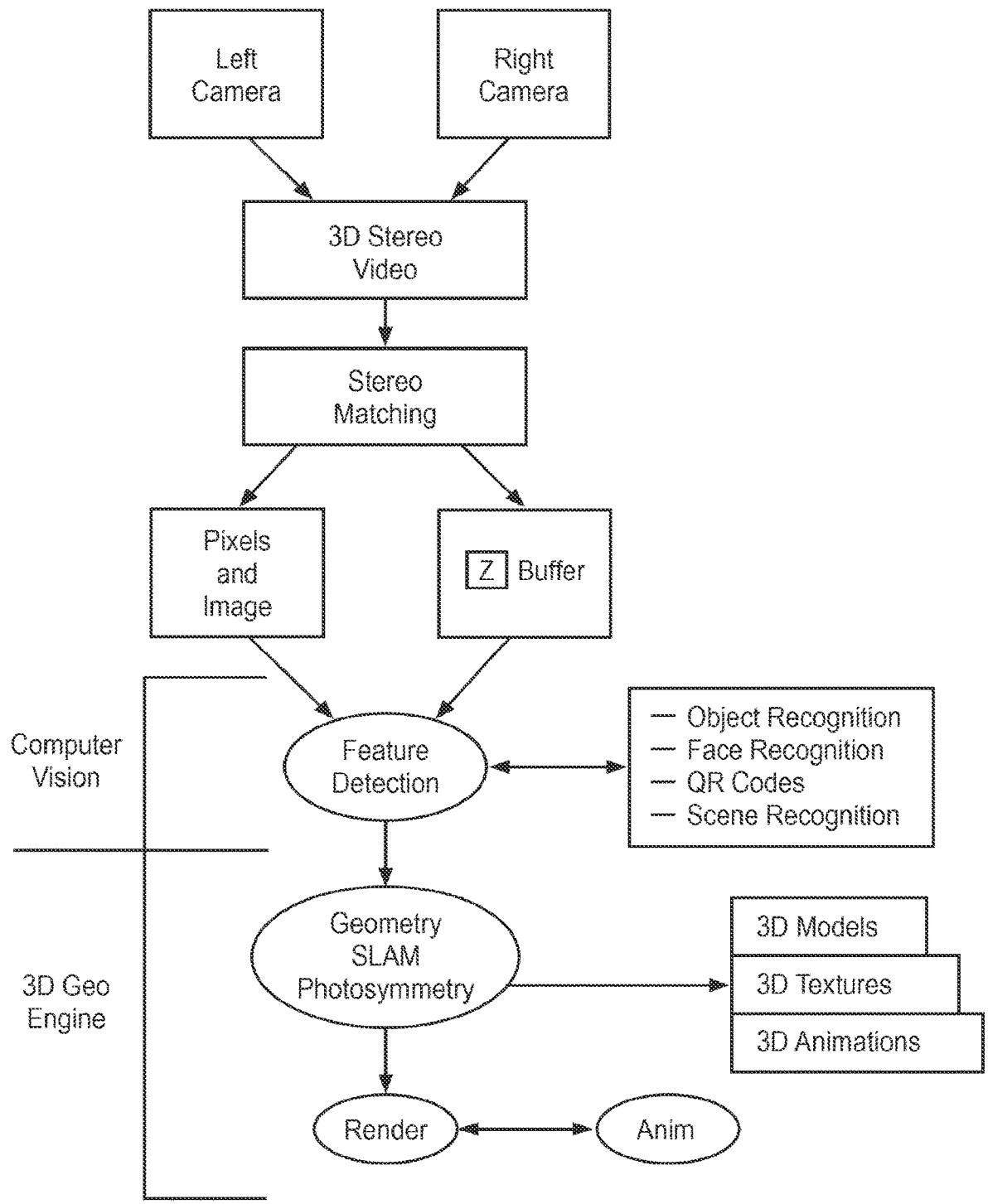
FIG. 24 is an embodiment of a processing system incorporating the headwear of the present invention.

In FIG. 24, methods for extraction of data and metadata from the world through one or more image sensors is shown.

One or more sensors that collect digital data are used to process and acquire digital data streams, with one or more instance of the sensors running simultaneously either synchronously or asynchronously to collect data and send into a processing, combination and recombination process to transform it into various data formats that comprise and represent features of real world data.

One or more images sensors are used to sense image data for one or more scenes.

The data streams from one or more image sensors are first enhanced by applying a procedure that increases the fidelity of the images. In one example, this could be a procedure that combines sequential images together to produce a more detailed and higher resolution image. In another example, this could be a procedure that modifies the images to reduce the appearance of camera motion between frames, thereby spatially stabilizing the image stream.

The enhanced streams are then processed together using a procedure that merges the information from multiple streams into a single data structure containing both the original sensed data and additional derived data. In one example, the data structure could be an image containing the positions and colors of each point that was sensed in the original scenes, using a procedure that determines the position of points in a scene based on similarities in two images of the same scene.

The combined data structure is then processed by a procedure or collection of procedures that analyzes the data to extract metadata. In one example, a procedure for finding objects in an image is applied to the data structure to determine the position and orientation of one or more objects in the original scenes. In another example, a procedure for detecting patterns such as bar codes is applied and one or more bar codes are extracted from the data structure. This metadata is then stored both with the data structure and in one or more networked computer systems.

The data structures generated by the above procedure are then processed through a procedure that aggregates multiple sequential data structures, extracts additional metadata and generates new data structures representing the aggregated data. In one example, a procedure is applied that combines multiple sequential data structures storing the position and color of points in a scene into a single unified color model of the scene, and additionally determines the position and orientation of the image sensors in that scene. In this example, a procedure is then applied that extracts distinct spatial regions of the model such as the spatial region corresponding to a person standing in front of the image sensor. Additionally in this example, a procedure is applied that extracts distinct spatial and temporal regions together such as the spatial and temporal region (animation) corresponding to a person walking in front of the image sensor.

Figure 25:
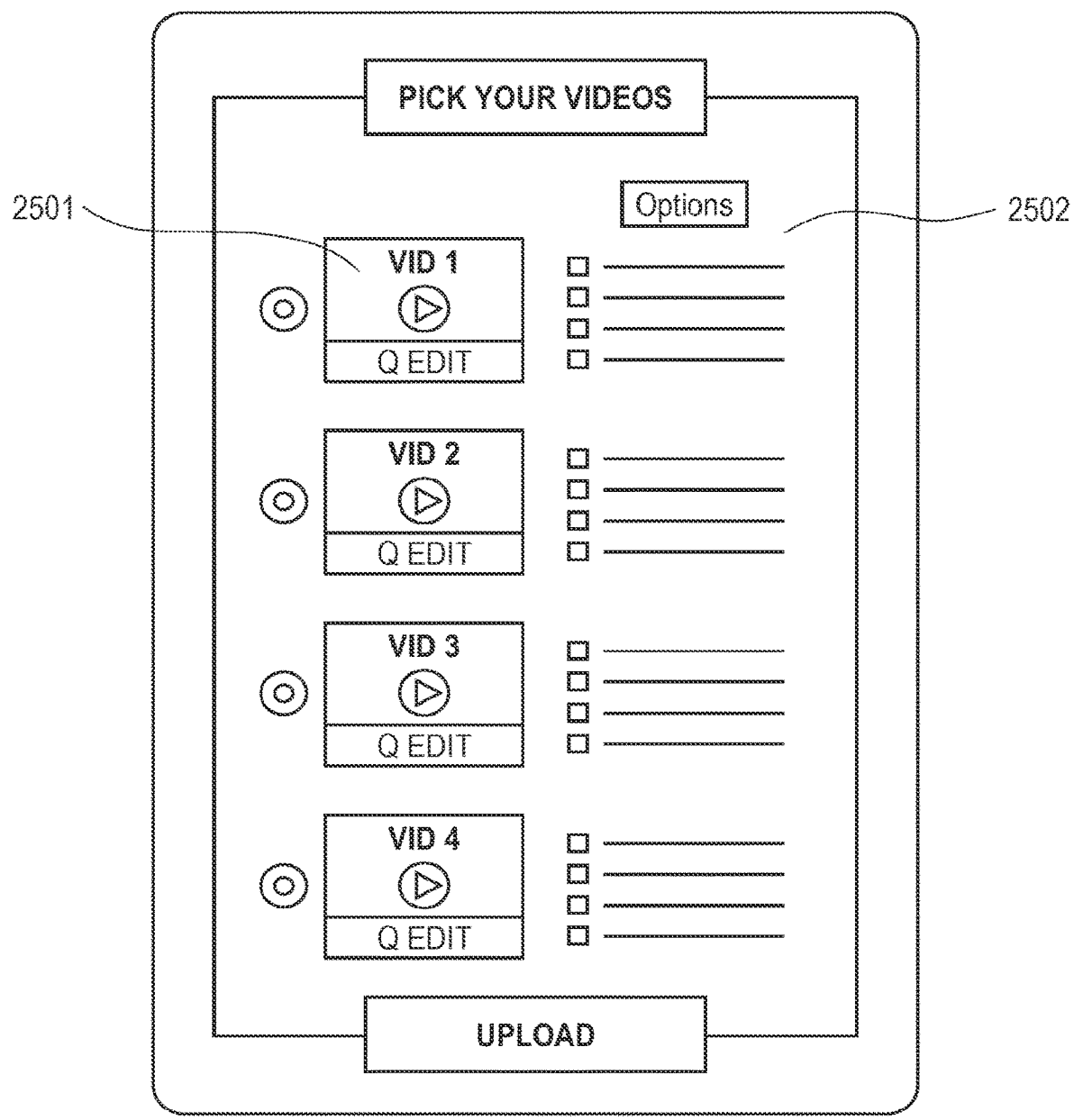
FIG. 25 is an embodiment of a system utilizing the headwear of the present invention.

In FIG. 25, an interactive interface for viewing, modifying and sharing recorded experiences is shown.

A mobile computer (2502) executes procedures to display an interface exposing a collection of bundles of data (2501) representing sensed observations of the world. The interface is controlled through sensors that transmit signals to (2502). When a control signal comes that indicates that the controller (user) wants to select a bundle of data, the interface changes to display that bundle of data. In one example, the data is video and audio previously recorded by sensors. When selected, a video player is displayed. In another example, the data bundle additionally includes the position of the sensors at the time of recording, and additionally sensed properties of a human controlling the sensor at the time of recording. When selected, the additional position and sensed human properties are displayed along with the video and audio data.

When a control signal comes that indicates that the controller (user) wants to modify a bundle of data, the interface changes to display an editing interface.

Figure 26:
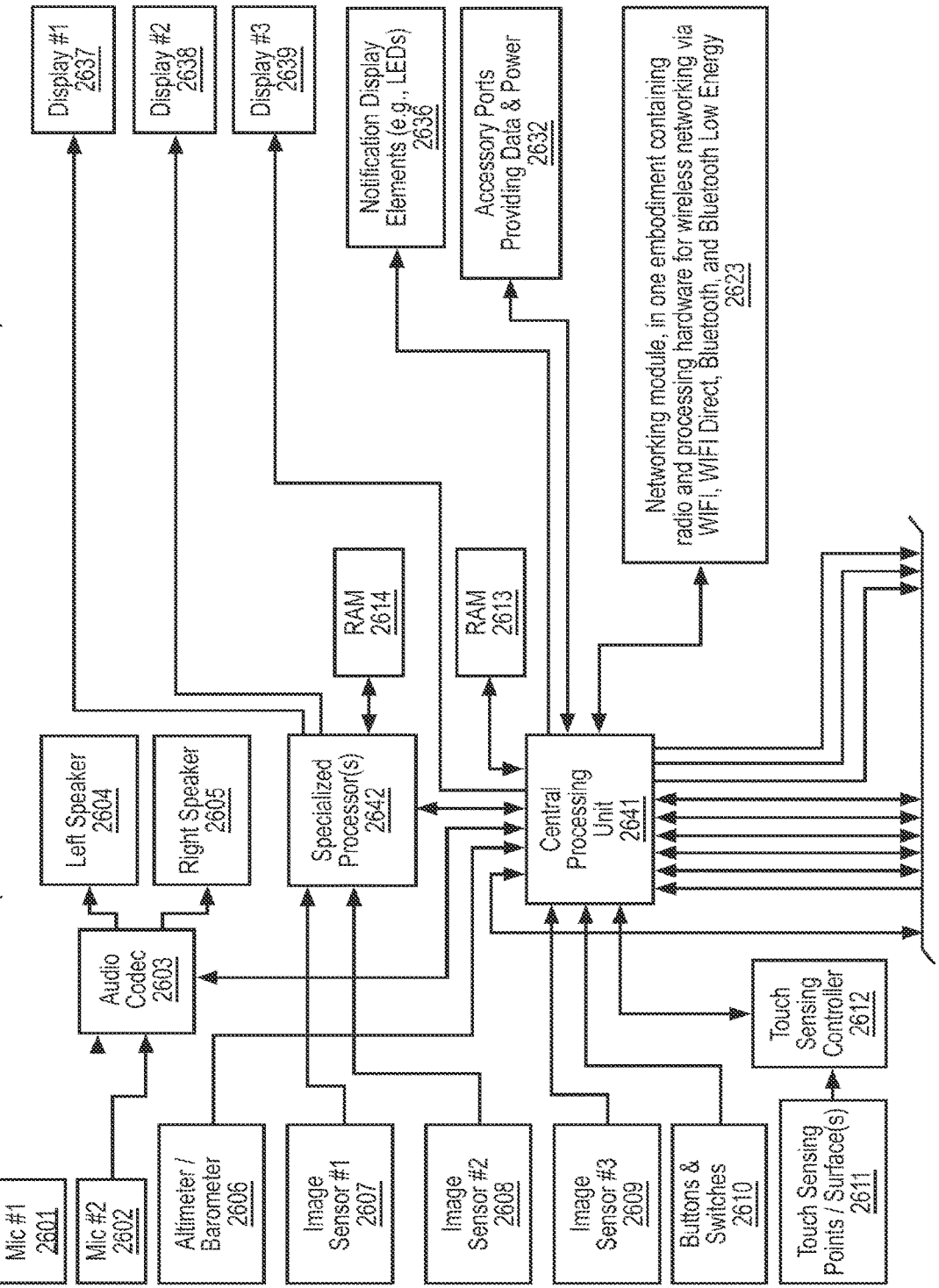
FIG. 26 is one embodiment of the computer architecture of the headwear of the present invention.

The interface additionally exposes a capability to transmit the bundle of data to separate networked computer with a single signal. When a control signal comes that indicates that the controller wants to transmit the bundle to a separate networked computer, a procedure is executed to transmit the bundle in such a way that if the connection between the mobile computer and the external networked computer is broken, the transmission is paused; the transmission is resumed automatically when the connection is restored. In FIG. 26, one embodiment of a computer architecture for a head-wearable miniaturized computer is shown.

Listed are various components of a computer in headwear, and the transmission of data flow and power flow as they relate to each other. Various embodiments of this computer can include some or all of the listed components and data flows and power flows, as long as the embodiment contains at least one CPU (2641) or GPU (2642) (or any processing unit that can execute instructions (2641) (2642) (2612) (2617) (2616) (2607) (2608) (2609) (2623)), at least one storage or memory bank (2613) (2614) (2615), at least one peripheral input/output device, and at least one energy source (2631) (2627) or energy storage medium (2629). One embodiment contains all of the components and data flows and power flows illustrated in the figure and described below:

A central processing unit (CPU) (2641) or a plurality of processing units (2641) sends and receives data to/from a variety of peripherals; such processing units (2641) may act in parallel, may act synchronously or may act asynchronously depending on the configuration of the system. The processing units (2641) also send/receive data to one or more memory banks (2613) (2614). The processing unit(s) (2641) also have access to a storage medium (2615); in one embodiment such storage medium is solid state storage such as flash memory (2615), in another embodiment this storage is magnetoresistive random access memory (2615). The processing unit(s) (2641) may directly communicate with additional specialized semiconductors or specialized processing units (2642) or a plurality of specialized processing units (2642). In one embodiment this specialized semiconductor is utilized as a graphics processing unit (GPU) (2642) or a plurality of graphics processing units (2642). In one embodiment, the specialized processing unit(s) (2642) communicate with the central processing unit(s) (2641) via a direct bus, or via shared random access memory (RAM) (2613) (2614) or via static storage medium (such as solid state storage) (2615), or any plurality of the aforementioned communication methods. The processing unit(s) (2641) or the specialized processing unit(s) (2642) or any combination of the processing unit(s) (2641), graphics processing unit(s) (2642) or other specialized processing unit(s) (2642) can send data that will be drawn into a computer display or a plurality of computer displays (2637) (2638) (2639) (2636).

In one embodiment, a specialized processing unit (2642) or a plurality of specialized processing units sends data bi-directionally or unidirectionally or a combination of both unidirectionally and bi-directionally, either asynchronously or synchronously, in serial or in parallel (or any combination of the aforementioned communication methods) via a bus or a plurality of buses with the processing units. The specialized processing unit(s) (2642) communicate data from sensors, or a plurality of sensors, such as a digital image sensor or a plurality of digital image sensor(s) (2607) (2608). In this embodiment, the communication system between sensor and processing unit(s) (2641) (2642) can optionally send control data to the image sensors (2607) (2608) (2609) to control various imaging parameters including exposure time, gamma value, autofocus distance, resolution, frame rate, and color space transformations. The specialized processing unit (2642) or central processing unit(s) (2641) may then send further data to be drawn on a computer display or a plurality of computer displays (2637) (2638) (2639) (2636).

In one embodiment, an image sensor or a plurality of image sensors (2609) sends data to the central processing unit(s) (2641). An image sensors or a plurality of image sensors (2607) (2608) sends data to the specialized processing unit(s) (2642).

In one embodiment, some or all of the image sensors (2607) (2608) (2609) may consist of depth map sensors, point cloud sensors, or geometry sensors, including without limitation: "time of flight" based sensors, sensors that involve projecting patterned light, and stereo image correspondence sensors.

In one embodiment, a sensor that collects audio, or a plurality of sensors that collect audio (2601) (2602), such as a microphone or a plurality of microphones (2601) (2602), send data into the computer system and utilize an audio codec (2603) or a plurality of audio codecs. The audio codec(s) (2603) send and receive data to/from the processing unit(s) (2641) (2642), in some embodiments including other specialized processing units (2642) such as audio enhancement processors or direction-microphone-array-beamforming processors. The processing units (2441) (2442) may then process the audio, data utilizing various amounts of logic or algorithms, and then store the audio data onto one or many pluralities of aforementioned storage mediums (2615). The computer system in combination with the audio code(s) (2603) may then send audio data in a format that can be output as waveforms by an audio output system, such as a speaker or a plurality of speakers (2604) (2605).

In various embodiments, the audio output transducers (2604) (2605) include without restriction: electromagnetic, piezo, bone-conduction, or ultrasonic-directed-audio speakers, including a single form of aforementioned audio output format, or a plurality of audio output formats and methods.

Various physical or tactile components (2610) act to control the transmission of signals as inputs into the computer system used to activate commands on the computer. Some examples of such tactile components are pushbuttons (2610), switches (2610), capacitive touch (2611) or any plurality of physical input sensors used to send data to the processing unit(s) (2641) (2642) for the purpose of activating events on the computer. Examples of events that can be activated on the computer include but are not limited to the activation of power, the switching of software or application context, or the activation of various communication protocols within the computer.

The computer system sends data to a single display element or a plurality of multiple display elements (2636) (2637) (2638) (2639), including but not limited to data intended to notify the user of various events and status. In one embodiment one or more of the display elements (2637) (2638) (2639) (2636) may show graphical icons representing messaging states. In another embodiment one or more of the display elements (2637) (2638) (2639) (2636) may be comprised of LED lighting elements. In another embodiment one or more of the display elements (2637) (2638) (2639) (2636) may be comprised of LCD light elements. In another embodiment one or more of the display elements (2637) (2638) (2639) (2636) may be comprised of OLED display elements. In another embodiment one or more of the display elements (2637) (2638) (2639) (2636) may be comprised of a laser projection display system.

The processing unit(s) (2641) (2642) send data and power to a tunable AC voltage supply or a plurality of tunable AC voltage supplies (2634) (2635). The AC voltage systems (2634) (2635) convert DC to AC in order to send voltage, frequency, and duty cycle control to an eyeglass lens or a plurality of eyeglass lenses. The voltage, frequency, and duty cycle control(s) cause the eyeglass lens(es) to change various visible properties of the glass, including without restriction: light emission, color, darkness, polarization, scattering, reflection, diffraction, refraction and refractive index.

Various touch sensing points (2611) send data to a touch sensing controller (2612) or a plurality of touch sensing controllers. The touch sensing controller(s) (2612) send and receive data to/from the processing unit(s) (2641) (2642). In one embodiment, the touch sensing points (2611) are capacitive touch sensing points, and the controller (2612) is a capacitive touch sensing controller.

A biometric sensor or a plurality of biometric sensors (2640) sends data to the processing units. In one embodiment, the biometric sensors (2640) include an optical pulse oximetry sensor (which measures heart rate and blood oxygen content).

A geolocation module (2616) or a plurality of geolocations modules send and receive data with the processing unit(s) (2641) (2642) and with satellites/bases of known locations. In this embodiment, the geolocation module uses the Global Positioning System (GPS) (2616). Other embodiments may utilize, without restriction: GLONASS satellites, "Galileo" satellites, "Compass" satellites, cellular towers, wireless routers, and mobile devices.

A sensor fusion controller (2617) or a plurality of sensor fusion controllers receives, weights, and combines data from various sensors, including without restriction: an accelerometer or a plurality of accelerometers (2618), a gyroscope or a plurality of gyroscopes (2619), a magnetometer or a plurality of magnetometers (2620), an altimeter or a plurality of altimeters (2606), a clock or a plurality of clocks (2622), and a thermometer or a plurality of thermometers (2621). The controller (2617) can combine the sensor inputs using various algorithms including, in one embodiment, a Kalman filter. The controller (2617) sends the original and the combined data to the processing units (2641) (2642) for processing, and can also further receive data back from the processing units (2641) (2642) and adjust state according to the instructions sent back from the processing units (2641) (2642). The processing units (2641) (2642) in combination with software algorithms compute unique data utilizing a plurality of sensor data which creates a new unique sub-set or super-set of the original data as a single dimensional or multi-dimensional data structure that can be consumed, interpreted or used by the computer to activate events, or to send to other computers over a computer network (2623) for various means of additional processing and consumption; such as in the example of sending data over the computer network (2623) to a remove server for distributed processing or storage in a cloud computing architecture.

In one embodiment, the sensor fusion controller consists entirely of software algorithm(s) running on the existing processing units (2641) (2642).

In one embodiment, an altimeter/barometer (2606) or a plurality of altimeters/barometers sends data to the processing unit(s) or the sensor fusion controllers (2617).

The processing unit(s) (2641) (2642) can interface with various hardware accessories in the headwear using a hardware accessory port or a plurality of hardware accessory ports (2632). In this embodiment, the hardware accessory port(s) (2632) provide a bidirectional serial data bus as well as voltage-regulated power lines.

The processing unit(s) (2641) (2642) send and receive data to/from various wireless computer networks including but not limited to wide-area networks such as the Internet, local area networks including peer-to-peer networks with mobile devices, mesh networks, either dynamic mesh networks or persistent mesh networks, or ad-hoc mobile networks, or any other single form of software configurable computer network type or plurality of configurable computer network types that can be negotiated and connected into by the device. This is accomplished using a networking module (2623) or a plurality of networking modules, which can interface to various types of networks utilizing any network protocol, either standard network protocol, or proprietary custom designed networking protocol, either a single networking protocol or a plurality of computer networking protocols, either wired or wireless.

The processing unit(s) (2641) (2642) send and receive data to/from a data port (2631) or a plurality of data ports (2631) (2632). In this embodiment, the port (2631) is a USB port or, a USB On The Go (OTG) port. A USB OTG port allows the processing unit(s) (2641) to act as both host/master and device/slave depending on what the other device is that connected to the port. In another embodiment, the data port (2631) is a firewire port. In yet another embodiment, the data port (2631) is an HDMI data port. In another embodiment, the data port (2631) is an audio output port, such as an I2S audio port. In another embodiment, the data port (2631) is a display port such as a Low-Voltage Differential Signaling (LVDS) video port. In another embodiment the data port (2631) is a camera port, such as a MIPI port. In another embodiment, the data port (2361) is a data transfer port such as a SDIO port. In another embodiment, the data port (2631) (2632) is an industry standardized port, such, as SPI, I2C.

In one embodiment, the headwear device receives and sends power over the data ports (2631), such as in one example, over a USB port (2631). When the headwear receives power from the data port (2631), the power then flows into a battery control & charging circuit (2630) or a plurality of battery control& charging circuits (2630) (2628). These circuit(s) charge & measure an energy storage medium (2629) or a plurality of energy storage media. In this embodiment the energy storage medium is one or more lithium-ion battery cells (2629).

The processing unit(s) (2641) (2642) send and receive data to and from the battery control & charging circuit(s) (2628) (2630). In this embodiment, data received by the processing units from the battery management circuit(s) (2628) (2630) includes the energy storage media's (2629) state of charge, which can then be processed and alerted to any plurality of data output systems or any plurality of data messaging systems (for example, for the purpose of outputting a message or a status bar that represents percentage charged information such as "200 milliamp-hours charged out of 300 milliamp-hours capacity").

In one embodiment the headwear device receives and sends power over a coil for inductive coupling (2627), or a plurality of such coils. In this embodiment, the headwear receives wireless power for recharging. The power from the inductive coupling (2627) flows into a coil-powered battery control & charging circuit (2628), or a plurality of coil-powered battery control & charging circuits. The coil-powered battery control & charging circuits (2628) charge the energy storage media (2629). In this embodiment the coil-powered charging circuits (2628) perform AC-to-DC conversion; other embodiments of battery chargers (2628) (2630) can perform various power conversions including without limitation: DC-to-AC, AC-to-DC, solar-to-DC, laser-to-DC, and radio-to-DC.

The energy storage media (2629) send power to various DC regulators (2624), which then send the regulated power to various power mains for power utilization and consumption. In this embodiment, the voltages are regulated and transformed into any plurality of available voltages such that the computing circuits (2626) all receive the necessary voltage in order to create a fully functional and stable flow and consumption of electricity within the computing architecture such that all needed components (2626) and integrated circuits (ICs) (2626) can turn-on and operate properly when the processing unit(s) or any other portion of the system requires such.

The power mains send power to every circuit that needs power, but on the way to a particular load device, the power most flow through what is known as a "load switch" (2625)—an electric switch that is able to connect or disconnect power to that particular load circuit. The load switches (2625) are controlled by receiving data from the processing units(s). The network of load switches (2625) allows the processing unit(s) to regulate the power supply to all components (2626) of the system individually or in combination, including any processor, peripheral, or other component. The component regulation can turn the power on, off and in some cases set it to a variable level, independently through the use software control, settings, attributes or methods.

Various clocks (2622), including without restriction crystal oscillators, phase-locked loops, microcontrollers, and wireless receivers, send clock pulses to all of the components that need clock inputs (2622).

In one embodiment, an apparatus for digital display and computation is provided and can include a face-wearable near-ocular optics coupled micro-display used to display data in front of the eyes, micro-computing device with head mounted computer, and sensor system for biometric human computer input comprised of various sensors used by the apparatus to process data and then send it to the display.

A face-wearable computer, with one embodiment containing a system-on-a-chip graphics accelerated micro-computer unit worn on the face of the user.

Eye-goggle display system comprised of one, two or more optical-micro-display units with an interocular aligned optical-layered-micro-display aligned for each eye, enabling computer displayed imagery transmitted into the eye. Alternate embodiments can include laser projection optical configurations, direct to retinal displays (or) micro display in the form of a micro array optics of honeycomb-like domes aligned to display matrix liquid crystal display (LCD) elements.

Two (or more) externally facing paired and synchronized high quality mini digital sensors used to read digital video data, or digital sensor data such as infrared light that can be used to recreate three dimensional (3D) or digital imaging data, or other wavelength measurement sensors. In one embodiment this can be used for the purpose of creating a stereoscopic 3D computer based vision processing pipeline via the device's internal computing input and output framework, and optionally rendered as stereoscopic 3D geometric or image data into the device's display units.

Comprised of integrated biometric human-computer-interaction input human-computer control interfaces Integrated neural brain wave measurement reading components used to measure frequency differences in brain waves which can be used to trigger software events within the computer device In one embodiment, sensor systems around eyes used by computer software to position a cursor or as a selection based software control interface In one embodiment, a biometric sensor system or a plurality of biometric sensor systems can be used, such as a heart-rate monitor, to trigger computing events In another embodiment, body heat monitor can be used to trigger computing events Natural hand gesture based input system using computer vision algorithms and image tracking from video cameras, optionally in combination with additional sensor systems, such as finger-worn sensors that form a sensor fusion algorithm to detect and determine the position and rotation information of hand gestures in combination with digital image sensors.

A microphone (or an array of microphones) for reading, supply and processing external audio into the computing system Headphones for transmitting audio data to the wearer In one embodiment: The optical architecture is based on a principle called "unit focusing" [1] which is how SLR camera lenses work. Unit focusing is the process whereby adjusting the relative z-axis positions of a series of alternating converging and diverging lenses allows one to alter the focus distance and/or the magnification of the image that is passing through the lens system.

As depicted in FIG. 1, the architecture in this prototype was chosen for its extreme simplicity, and consists of only three lens (including the user's eye's lens), whereas most camera lens systems contain four or five lenses. This simplicity results in predictable lens distortion, but said distortion may be partly compensated for in the software rendering engine, and is also not the most pressing user experience challenge (latency is).

One can quite simply conceptualize the effects of this display by tracing the path that the image of one frame's light takes on its way from the pixel plane (positive Z, at the right side of FIG. 1) it originates at towards its final destination of the human retina (negative Z, at the left side of FIG. 2):

1. Between the LCD and the "C" lens, the light diverges as it travels leftward.
2. The "C" lens converges the light.
3. Between the "C" lens and the "D" lens, the light converges.
4. The "D" lens diverges the light.
5. Between the "D" lens and the eye's lens, the light diverges.
6. The eye's lens converges the light.
7. The light forms an in-focus image on the retina.

Notice that the total system (including the eye) is symmetrical about the "D" lens. Starting at the "D" lens and moving outward, both sides contain a diverger, then a converger, then a pixel grid. The total system is thus a symbiotic union where half of the components consist of human tissue and muscle, and the other half of manufactured glass and electromagnetic motors.

Eye Tracking: While the user is interacting with this display, each of their eyes are being independently tracking using a pair of cameras. The cameras are modified by removing the filters that block infrared light. This allows the CMOS sensors' red channels to capture infrared in addition to red. Meanwhile, infrared LEDs illuminate the eyes. The reason to capture infrared is that it facilitates the task of pupil tracking: many people have brown irises when viewed in RGB, but in infrared, everybody's eyes irises are very light gray. This creates a clearly defined edge between the pupil and the iris (see FIG. 2).

For each eye, three points of interest are tracked in real time using the OpenCV GPU-accelerated computer vision library. Two of the points are the two corners of the eye, and the third point is the center of the pupil.

The eye corners are detected using Oriented Gradient features. The pupil is tracked by taking the xy derivative of the image (edge detection) and then fitting an ellipse onto the elliptical border between the black pupil and the light-gray iris.

Once we know the positions of each of the eye corners and the pupil, these data are used for the following purposes:

The positions of the two corners are averaged to obtain an x,y location for that eye. This allows the rendering engine software to create an effect of head-movement parallax, which is equally important a depth cue as binocular parallax is! [2]

In addition, it is the pupil position data that really lets the display come alive. First, we calculate the 2D displacement between the center of the eyeball versus the center of the pupil. Next, we apply an affine transformation in 3D to convert the 2D gaze displacement into a 3D gaze vector for that eye. Then, normalize the vector.

Once we have the 3D gaze vectors for both eyes, we cast those rays out from the eyeball positions, and find the point in 3D space where the two gaze rays intersect (or come closest to intersecting, by least squares). This gives us the 3D point in space that the user is currently looking at, which is extremely useful! Let us refer to this point as the "vergence point".

Next, we enhance the precision of our measurement of the vergence point. We achieve this by incorporating an additional source of z-coordinate information. If we cast the x,y components of the vergence point forward directly along the positive z axis, we can follow that line forward until we hit the nearest opaque virtual object in the virtual scene. If we assume that the user is indeed focusing on the object that they are looking directly at, then the z coordinate of said object is a second source of information about the z coordinate of the ground-truth vergence point. Ultimately, we average the two possible z values, weighting each source by 50%.

Once we know the gaze vergence point's z coordinate precisely, we feed this value back into a closed-loop mechatronic control system that actuates the z coordinates of the four movable lenses (two per eye) of the optics system. We also feed the vergence point's z into the rendering engine, in order to software-simulate retinal blur (see chapter 5: rendering).

We control the optical power of the sub-system consisting of the "D" and "C" lenses. We control said optical power quite simply: the optical power measured in diopters is roughly linearly proportional to the distance (in meters) between the "D" and "C" lenses. We always try to keep the midpoint z (in meters) at the "D" and "C" lenses equal to the midpoint z (in meters) of the LCD and the retina; this is just a rule of thumb intended to reduce optical distortion, which I have stumbled upon in my practical experience controlling the system.

So we know that we are able to control the optical power of the "D"-"C" subsystem, now the question is to what goal we want to apply that power. The answer is that we want to counter-act the real-time-changing optical power of the eye's lens, keeping the total optical power of the three-lens system always constant. (The math is easy; the Thin Lens Formula [4] states that the powers of lenses in a system, expressed in 1/meters, combine by linear addition).

By constantly anticipating what z the user will focus on, and counter-acting it in real-time, the mechanical lenses are essentially "dancing" with the biological lens. The human's lens is the lead, and the mechatronic pair is the follow. Every movement that the human's lens makes, the mechatronic system detects and obeys. By perfectly following the moves in real time, the co-focus display is able to ensure that the image from the LCD is always in focus on the retina.

In one embodiment, a real-time, symbiotic intelligent lens system is provided that serves the user by keeping the display in focus, no matter what z distance the user looks to.

At this point, we may choose to add blur to compensate for the blur we've removed (thus enhancing realism). For information about how to add the correctly blurs to each part of the scene automatically, see chapter 5: rendering.

Or we could choose not to add blur at all, allowing every glorious pixel in the user's view to shine with in-focus perfection. (For an example of what this looks like, watch the 2008 live-action+CG movie, Speed Racer.)

Rendering

There are multiple approaches to rendering for a "depth+stereo+parallax" display. Which approach to use depends on whether the objects to be rendered are originating as digital 3D models or instead as 2D and noisy data from camera sensors (e.g. in a pair of glasses with a co-focus on the inside and cameras on the front).

If we are rendering a digital 3D model through a raster pipeline, rendering is as follows:
- render from the vantage points of two virtual cameras instead of one
- update the position and orientation of each camera before each frame, to correspond in real-time to the position and orientation of each of the user's eyes.
- in the GL shader:
- for each polygon, compute the displacement from the user's vergence z according to the equation: delta_z(1/meters)=abs(1/(polygon z(meters))−1/(vergence z(meters))). Note that 1/meter=1 diopter, the unit of reciprocal distance. If we work in diopters, the equation is much simpler: delta_z (1/meters)=abs(polygon z (1/meters)−vergence z (1/meters)).
- blur (e.g. Gaussian blur) the textured polygon, where the blur magnitude is directly proportional to the delta_z in 1/meters.

If we are instead rendering mostly-verbatim from a stereo pair of physical 2D cameras:
- the cameras must have a large Depth Of Field, so that they can capture the entire scene in focus in every frame. They must also be well-mounted at a fixed and known relative position, with the ideal displacement corresponding to the average human interpupilary distance of 63 mm. [3]
- using Stereo Correspondence, calculate a low-resolution z-buffer for the image. Express the z's in 1/meters. One common technique for stereo correspondence is:
- for each of the left and right images, extra a set of around 100 "keypoint features", such as SIFT features. SIFT is a trusted algorithm because it is invariant to affine transforms of the image, which is great because with a stereo pair of cameras, one image is more-or-less an affine transform of the other, and the places where the pixels do not match are caused by ground-truth z buffer of the actual distances of the objects those pixels represent.
- by the affine transform method (homography) described above, change the perspective of both the left and right camera images so they look more-or-less like they are both coming from the one single imaginary camera located halfway between the two, in this change-of-basis, make sure you remember to transform the coordinates of the SIFT features as well as the image itself!
- for each SIFT feature in both images, assign it a partner that is its nearest neighbor in the *other* image. Heavily penalize y-distance, e.g. by a factor of 5, because the camera hardware is aligned and so y displacements of SIFT keypoints must be spurious. Additionally to compensate bar the spurious keypoints created by senor noise, do not assign a feature a partner if the would-be partner is too far away (e.g, more than ~40 pixels away in a 1080×720 image)
- for every feature that has a partner, make that a sample point in a sparse z-buffer. The z value in 1/meters corresponds proportionally to 1/(the distance from this SIFT feature to its partner, in meters).
- apply the inverses of the affine transforms that we applied to the camera images, getting us back to the camera's true vantage points. (Or just retrieve the original images from memory). Also apply these inverse transforms to the sparse z-buffer, giving us now the two original camera images as well as a left z-buffer and a right z-buffer expressed in the basis space of the two cameras themselves.
- for each of the left and right images:
- Gaussian blur every pair of the image in proportion to the delta_z (1/m)=abs((z-buffer[this x,y] in 1/m−(vergence z in 1/m)). Obtain the missing z-buffer contents by interpolating along the best-fit surface over the sparse samples.

Calibration

The calibration procedure is extremely simple:
1. The user selects how many minutes they are willing to devote to calibration (the more time, the more hyper-realistic the outcome).
2. Based on that time window, the software display's the user n many lit-up "stars" in an otherwise dark view. The software displays the stars one at a time, requesting the user to look at the star (with both eyes) and then press a button to confirm.
3. The stars' positions are randomly located in 3D (randomly so the user does not get bored by the predictability of seeing the dots in a sequential row). The more time, the higher the resolution of the calibration because more samples are taken Software Methods are device-embedded (or) available via a cloud hosted networked computer operating system used for the purpose of utilizing the advanced sensor data, further processing and enhancing or extending the human capabilities (or) perceptions of reality, comprised primarily of:

Data input and output algorithms for processing streams of incoming data from digital sensor based temporal information in the form of 3D geometric data, video data, and audio data Mobile, networked, computer processing of sensor data acquired from digital sensor systems inside or outside of a head-worn computing apparatus. In one embodiment this is for the purpose of enhancing and displaying digital information into a digital micro-display, and enhancing auditory reality through real-time computer processing of audio from microphones, into a head-worn computer and output through headphones.

Deriving Motion from stereo pairs, Acquisition and Analysis into animated parameter values and automatic "Move" type Categorization using learning algorithms:
Time-Series of facial expressions
Time-Series of body gestures
Time-Series of eye-darts and 3D ocular convergence points
Time-Series of walking and gait speeds & frequencies
User's Life & Experience Subscriptions: Freemium, user chosen premium subscriptions, the ability for a wearer of the head-worn computer to offer subscriptions to their point of view perspective.

Passive Reality Advertising: Computer vision for video based object recognition over time, used to apply software controlled logic that determines the methods for displaying advertising.

Think to click: the process and procedures for utilization of computer sensors that can measure brain activity and use the data acquired to trigger a computational event.

Function at the speed of thought: ability for brain computer interfaces, in combination with an optional plurality of eye tracking, gesture controllable software systems, and a head-worn computer containing a display system—to allow the human wearing the computer to evaluate software functions and access data in a rapidly accelerated and fluid manner.

Human Area Network: a dynamic computer network comprised of mobile head-wearable computers, such as a dynamic ad-hoc network between head worn computers or a dynamic mesh network created between head worn computers. In one embodiment, this dynamic networking capability can be used for interactive Peer to Peer Redundant Human Computing Resource Parallelization.

In one aspect of the invention, an apparatus is provided for mounting on a head of a user for digital display and computation, comprising a frame, a face-wearable near ocular optics, a micro-display for displaying data in front of the eyes, a computing device coupled to micro-display, and at least one sensor coupled to the computing device for receiving biometric human information.

The computing device can be a micro-computing device. The least one sensor can be an EEG sensor.

In one aspect of the invention, an apparatus is provided for mounting on a head of a user having a pair of eyes, comprising a support structure, a miniature camera mounted on the support structure for obtaining images, a microcomputer carried by the support structure and coupled to the miniature camera, the microcomputer being configured to manipulate the obtained images and to provide an output image, and at least one near ocular digital display carried by the support structure and coupled to the microcomputer for displaying the output image to the user.

The support structure can be a pair of viewing glasses. The at least one near ocular display can include first and second near ocular displays tor respective viewing by the eyes of the user.

In one aspect of the invention, an apparatus is provided for mounting on a head of a user having a pair of eyes, comprising a support structure, at least one lens carried by the support structure for optical viewing by the user, a power supply carried by the support structure and a controller carried by the support structure and electrically coupled to the at least one lens and the power supply for changing the amount of power supplied by the power supply to the at least one lens so as to alter properties of the lens.

The properties of the at least one lens can be selected from the group consisting of color and focus distance. The support structure can be a pair or viewing glasses. The controller can be a microcomputer.

In one aspect of the invention, an apparatus is provided for mounting on a head of a user having a pair of eyes, comprising a support structure, at least one near ocular optical element carried by the support structure for viewing by the user, and a microcomputer carried by the support structure, the microcomputer being configured to simultaneously transmit and receive data remote of the user.

The at least one near ocular optical element can be selected from the group consisting of an optical lens and a digital display. The apparatus can further include a transceiver carried by the support structure and electrically coupled to the microcomputer. The support structure can be a pair of viewing glasses.

In one aspect of the invention, an apparatus is provided for mounting on a head of a user having a pair of eyes, comprising a support structure, a microcomputer carried by the support structure, the microcomputer being configured to transmit image data across a computer network.

The apparatus can further include a miniature camera mounted on the support structure for obtaining image data, the miniature camera being electrically coupled to the microcomputer. The apparatus can further include at least one near ocular digital display carried by the support structure and electrically coupled to the microcomputer. The support structure can be a pair of viewing glasses. The apparatus can further include a biometric sensor carried by the support structure for obtaining biometric information of the user, the microcomputer being configured to transmit the biometric information across the computer network. The microcomputer can be configured to real time location of the user, the microcomputer being configured to transmit the real time location across the computer network.

In one aspect of the invention, an apparatus is provided for mounting on a head of a user having a pair of eyes, comprising a support structure, a microcomputer carried by the support structure, the microcomputer being configured to wirelessly transmit information by means of packet routing: across a network.

The network can be selected from the group consisting of a local area network, a wide area network, a dynamic mesh network, a cellular network and a peer to peer network. The support structure can be a pair of viewing glasses. The apparatus can further include a biometric sensor carried by the support structure for obtaining biometric information of the user, the microcomputer being configured to transmit the biometric information across the network. The microcomputer can be configured to real time location of the user, the microcomputer being configured to transmit the real time location across the network.

In one aspect of the invention a pair of viewing glasses is provided, comprising a frame, electronics carried by the frame, a power supply carried by the frame and electrically coupled to the electronics, the electronics including a graphics processor.

The glasses can further include a miniature camera mounted on the support structure for obtaining image data, the miniature camera being electrically coupled to the graphics processor of the microcomputer. The support structure can be a pair of viewing glasses.

In one aspect of the invention, a pair of viewing glasses is provided and includes a frame, electronics carried by the frame, and solid state storage carried within the frame and fixed to the electronics.

The electronics can include a central processing unit. The glasses can further include a computer board, the solid state storage and the central processing unit being fixed to the computer board. The glasses can further include random access memory fixed to the computer board and electrically connected to the central processing unit.

In one aspect of the invention, a pair of viewing glasses is provided and includes a frame, electronics carried by the frame, a power supply carried by the frame and electrically coupled to the electronics, the electronics including a field programmable gate array chip.

The field programmable gate array chip can include a graphics processor. The glasses can further include a miniature camera mounted on the frame, the miniature camera being electrically coupled to the field programmable gate array chip.

In one aspect of the invention, a pair of viewing glasses is provided and includes a frame, electronics carried by the frame, a power supply carried by the frame and electrically coupled to the electronics, and a coil receiver electrically coupled to the electronics, the electronics being configured to receive energy from the coil so as to wirelessly recharge the power supply.

The electronics can include a microcomputer. The glasses can further include a miniature camera mounted on the frame, the miniature camera being electrically coupled to the electronics. The glasses can further include a digital display mounted on the frame, the digital display being electrically coupled to the electronics.

In one aspect of the invention, a pair of viewing glasses is provided and includes a frame, and a central processing unit carried by the frame, the central processing unit being configured to communicate utilizing hypertext transfer protocol.

The central process unit can be configured to communicate utilizing hypertext transfer protocol secure In one aspect of the invention, a pair of viewing glasses is provided and includes a frame, and electronics carried by the frame, the electronics being configured to act as one of a web client and a web server.

The electronics can include a microcomputer configured to communicate over a network.

In one aspect of the invention, an apparatus is provided for mounting on a head of a user, comprising a support structure, and electronics mounted on the support structure, the electronics being programmable by the user while mounted on the structure.

The electronics can include a microcomputer. The microcomputer can be an operating system with an application programming interface.

In one aspect of the invention, an apparatus is provided for mounting on a head of a user, comprising a support structure, microcomputer carried by the support structure and having an operating system, storage carried by the support structure, the microcomputer being configured to communicate over a network and being configured to authenticate the operation of applications in the storage, that are obtained over the network.

The microcomputer can be configured to obtain applications over the network for storing in the storage. The microcomputer can be configured to obtain dynamic updates over the network for applications in the storage.

In one aspect of the invention, an apparatus is provided for mounting on a head of a user, comprising a support structure, microcomputer carried by the support structure and configured to execute machine language.

The machine language can be selected from the group consisting of interruptive language, compiled language, pre compiled language, and just in time compiled language. The microcomputer can be configured to compile software. The software can be selected from the group consisting of C, C++, Python, Java and Javascript.

In one aspect of the invention, an apparatus is provided for mounting on a head of a user, comprising a support structure, microcomputer carried by the support structure and configured to operate as a virtual machine.

In one aspect of the invention, an apparatus is provided for mounting on a head of a user, comprising a support structure microcomputer carried by the support structure and configured to run computer graphics or computer vision software.

The computer graphics or computer vision software can be selected from the group consisting of three dimensional graphics software, three dimensional geometry software, two-dimensional graphics software, two dimensional pixel software, objection recognition software, facial recognition software, identity recognition software, video segmentation software, image segmentation software, photogrammetry software, feature tracking software, motion stabilization software, video stabilization software, blur removal software, sharpness optimization software, color space transformation software, three dimensional camera tracking software, camera tracking software utilizing accelerometers, automatic camera tracking software and optical camera tracking software.

In one aspect of the invention, an apparatus is provided for mounting on a head of a user, comprising a support structure, electronics carried by the support structure and an audio system carried by the support structure and electrically coupled to the electronics, the audio system including at least two speakers and at least microphones.

The support structure can be a pair of glasses.

In one aspect of the invention, an apparatus is provided for mounting on a head of a user, comprising a support structure, electronics carried by the support structure and an audio system carried by the support structure and electrically coupled to the electronics, the electronics being configured to spatially render the audio during play.

The apparatus can further include an accelerometer carried by the support structure and coupled to the electronics. The electronics can include a microcomputer.

Other novel aspects of the invention include:
message passing through software interfaces in glasses
digital payment processing system using computer vision based payment recognition for monetary transactions
computer vision using glasses
photogrammetry in glasses
graphics processing unit (GPU) in glasses
networking module in glasses
object recognition in glasses
face recognition in glasses
using onboard sensors to track glasses x,y,z position and pitch,roll,yaw orientation (6-axis glasses tracking)
using computer vision to assist with multi-axis glasses tracking
using sensor fusion algorithms to assist with multi-axis glasses tracking
accessing cellular data networking (in various embodiments, including 30 and 40 networks) using glasses
using glasses computer to control properties of the eyewear glass, including without limitation: light emission, color, darkness, polarization, scattering, reflection, diffraction, refraction and refractive index
virtual machine in glasses computer
virtualization inside of glasses
State machines inside of glasses
   Finite State Machines
   Moore machines
   Mealy machines
gesture recognition using sensors and computer processing in glasses, in one embodiment tracking the user's hand motions
eye tracking using sensors and computer processing in glasses capture of the environment using sensors (in one embodiment, digital sensors) in glasses Computer software based case statements, boolean logic and conditional statements inside of glasses Computer software based iteration methods inside of glasses including in one embodiment, loop structures, in another embodiment, recursion Artificial intelligence software inside of glasses Machine learning algorithm software inside of glasses Audio analysis software algorithms inside of glasses, in one embodiment, voice processing, in another embodiment, voice recognition, in another embodiment, text to speech transmission, in another embodiment speech to text transmission computer language compiler in glasses computer computer language interpreter in glasses computer Biometric measurement systems inside of glasses System-on-a-chip inside of glasses clocks, including without restriction crystal oscillators, phase-locked loop, microcontrollers, and wireless receivers, in glasses voltage regulators in glasses distributed computation using one or more glasses coulomb counter, "batter gas gauge" (i.e. a circuit to integrate battery charge/discharge to known charge state) in glasses battery charger in glasses, in one embodiment drawing power wirelessly using resonant inductive coupling connecting to, posting to, and reading from social networks, including glasses connecting to the internet using glasses executing search algorithms from glasses (in one embodiment, running the search remotely using a computer network)

Biometric fusion software algorithms for the combination and utilization of a plurality of biometric sensor data inside of glasses 3D spatial audio rendering in glasses, utilizing the 6-axis glasses tracking and utilizing a head-related transfer function to simulate acoustics phased-array audio in glasses, in one embodiment including beamforming microphone array, and in another embodiment including beamsteering speaker arrays wireless power transmission to/from glasses computer dynamic/ad hoc wireless networking (in one embodiment, WiFi Direct) using glasses computer detachable/reattachable mechanical connectors (in one embodiment, quick-release hinges) in a glasses frame that contains a computer automatic software/firmware updating in glasses (in one embodiment, the updates are downloaded over a secure wireless protocol)

using glasses to broadcast data captured with sensors over one or more computer networks. (In one embodiment, live-streaming video from one or more image sensors and microphones to the Internet)

user authentication using computer glasses application authentication in glasses extracting metadata using data from sensors in glasses sharing recorded experiences across computer networks installing software applications onto glasses electromechanical port for connecting accessories to computer glasses magnets in computerized glasses, in one embodiment including electromagnets computer control over the visible appearance of glasses interfacing with external computers using computerized glasses power conversion in glasses, including without limitation: AC-to-DC conversion and DC-to-AC conversion detachable temples of glasses frames touch sensing in glasses, including without limitation capacitance-based touch sensing audio transducers in glasses bone conduction speakers in glasses bone conduction microphones in glasses

What is claimed is:

1. An apparatus comprising:
a support structure for mounting on the head of a user;
a display matrix;
a plurality of optical lenses retained by the support structure, and disposed between the display matrix and an eye of the user, the plurality of optical lenses including a hemispherical element that covers at least a portion of the display matrix;
a microcomputer carried by the support structure;
a sensor device for receiving biometric data;
a camera mounted on the support structure; and
a transceiver coupled with the microcomputer, wherein the microcomputer executes instructions that comprise:
capturing a set of images by the camera mounted on the support structure;
generating an image stream based on the set of images;
extracting metadata from the image stream;
generating a request that includes the metadata to a networked computer;
receiving, from the networked computer, a presentation of the image stream that includes an object rendered at a position within the image stream based on at least the metadata and the biometric data;
causing the display matrix to display the presentation of the image stream that includes the object rendered at the position within the image stream upon the hemispherical element;
detecting biometric feedback; and
presenting the object within the presentation of the image stream based on the biometric feedback.

2. The apparatus of claim 1, further comprising:
an inwardly-facing camera mounted on the support structure, the inwardly-facing camera producing eye tracking video of an eye that is processed by the microcomputer, wherein the microcomputer processes the eye tracking video to track pupil position, and wherein the generating the presentation of the image stream is based on the metadata and the eye tracking video.

3. The apparatus of claim 2, wherein the microcomputer processes the eye tracking video to detect eye corners using oriented gradient features and averages the positions of the eye corners to obtain an x,y location for the eye.

4. The apparatus of claim 2, wherein the microcomputer processes the eye tracking video to calculate a two-dimensional displacement between the center of the eye and the center of the pupil.

5. The apparatus of claim 2, wherein the microcomputer processes the eye tracking video to calculate a two-dimensional displacement between the center of the eye and the center of the pupil, and wherein the microcomputer converts the two-dimensional displacement to a three-dimensional gaze vector for the eye.

6. The apparatus of claim 2, wherein the pupil position is used to alter the position of the object rendered within the image stream.

7. The apparatus of claim 1, wherein the microcomputer performs a calibration operation by projecting a sequence of objects on a display mounted on the support structure and collecting viewed object acknowledgements from a user.

8. A method comprising:
 capturing a set of images by a camera mounted on a support structure of a head-mounted apparatus, the head-mounted apparatus comprising a display matrix, and a plurality of optical lenses retained by the support structure and disposed between the display matrix and an eye of a user;
 generating an image stream based on the set of images;
 extracting metadata from the image stream;
 accessing biometric data generated by a sensor device;
 generating a request that includes the metadata and the biometric data to a networked computer;
 receiving, from the networked computer, a presentation of the image stream that includes an object rendered at a position within the image stream based on at least the metadata and the biometric data;
 causing the display matrix to display the presentation of the image stream that includes the object rendered at the position within the image stream upon the hemispherical element;
 detecting biometric feedback; and
 presenting the object within the presentation of the image stream based on the biometric feedback.

9. The method of claim 8, further comprising:
 producing eye tracking video of the eye of the user via an inwardly-facing camera mounted on the support structure, wherein the eye tracking video is processed to track pupil position, and wherein the generating the presentation of the image stream is based on the metadata and the eye tracking video.

10. The method of claim 9, wherein a microcomputer processes the eye tracking video to detect eye corners using oriented gradient features and averages the positions of the eye corners to obtain an x,y location for the eye.

11. The apparatus of claim 9, wherein a microcomputer processes the eye tracking video to calculate a two-dimensional displacement between the center of the eye and the center of the pupil.

12. The apparatus of claim 9, wherein a microcomputer processes the eye tracking video to calculate a two-dimensional displacement between the center of the eye and the center of the pupil, and wherein the microcomputer converts the two-dimensional displacement to a three-dimensional gaze vector for the eye.

13. The apparatus of claim 9, wherein the pupil position is used to alter the position of the object rendered within the image stream.

14. The apparatus of claim 8, wherein a microcomputer performs a calibration operation by projecting a sequence of objects on a display mounted on the support structure and collecting viewed object acknowledgements from a user.

15. A non-transitory computer readable storage medium storing therein instructions that, when executed by a processor, cause an apparatus for mounting on the head of a user to perform operations comprising:
 capturing a set of images by a camera mounted on a support structure of a head-mounted apparatus, the head-mounted apparatus comprising a display matrix, and a plurality of optical lenses retained by the support structure and disposed between the display matrix and an eye of a user;
 generating an image stream based on the set of images;
 extracting metadata from the image stream;
 accessing biometric data generated by a sensor device;
 generating a request that includes the metadata and the biometric data to a networked computer;
 receiving, from the networked computer, a presentation of the image stream that includes an object rendered at a position within the image stream based on at least the metadata and the biometric data;
 causing the display matrix to display the presentation of the image stream that includes the object rendered at the position within the image stream upon the hemispherical element;
 detecting biometric feedback; and
 presenting the object within the presentation of the image stream based on the biometric feedback.

16. The non-transitory computer readable storage medium of claim 15, further comprising:
 producing eye tracking video of the eye of the user via an inwardly-facing camera mounted on the support structure, wherein the eye tracking video is processed to track pupil position, and wherein the generating the presentation of the image stream is based on the metadata and the eye tracking video.

17. The non-transitory computer readable storage medium of claim 16, wherein a microcomputer processes the eye tracking video to detect eye corners using oriented gradient features and averages the positions of the eye corners to obtain an x,y location for the eye.

18. The non-transitory computer readable storage medium of claim 16, wherein a microcomputer processes the eye tracking video to calculate a two-dimensional displacement between the center of the eye and the center of the pupil.

19. The non-transitory computer readable storage medium of claim 16, wherein a microcomputer processes the eye tracking video to calculate a two-dimensional displacement between the center of the eye and the center of the pupil, and wherein the microcomputer converts the two-dimensional displacement to a three-dimensional gaze vector for the eye.

20. The non-transitory computer readable storage medium of claim 16, wherein the pupil position is used to alter the position of the object rendered within the image stream.

* * * * *